US012638709B2

(12) United States Patent
Sato et al.

(10) Patent No.: US 12,638,709 B2
(45) **Date of Patent: *May 26, 2026**

(54) LIQUID CRYSTAL DIFFRACTION ELEMENT, OPTICAL ELEMENT, IMAGE DISPLAY UNIT, HEAD-MOUNTED DISPLAY, BEAM STEERING, AND SENSOR

(71) Applicant: FUJIFILM Corporation, Tokyo (JP)

(72) Inventors: Hiroshi Sato, Minamiashigara (JP); Yukito Saitoh, Minamiashigara (JP); Takashi Yonemoto, Minamiashigara (JP); Makoto Ishiguro, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 18/628,527

(22) Filed: Apr. 5, 2024

(65) Prior Publication Data

US 2024/0272470 A1 Aug. 15, 2024

Related U.S. Application Data

(63) Continuation of application No. 18/176,529, filed on Mar. 1, 2023, now Pat. No. 11,977,290, which is a (Continued)

(30) Foreign Application Priority Data

Sep. 2, 2020 (JP) ................................ 2020-147455
Oct. 22, 2020 (JP) ................................ 2020-177293

(Continued)

(51) Int. Cl.

| | |
|---|---|
| ***G02F 1/1335*** | (2006.01) |
| ***G02B 5/30*** | (2006.01) |
| ***G02F 1/1337*** | (2006.01) |

(52) U.S. Cl.

CPC .. *G02F 1/133504* (2013.01); *G02F 1/133541* (2021.01); *G02F 1/133761* (2021.01); *G02B 5/3083* (2013.01)

(58) Field of Classification Search

CPC ......... G02F 1/133504; G02F 1/133761; G02F 1/133541; G02B 5/3083

See application file for complete search history.

(56) References Cited

U.S. PATENT DOCUMENTS

| | | | | |
|---|---|---|---|---|
| 11,977,290 | B2 * | 5/2024 | Sato | G02F 1/133541 |
| 2019/0033634 | A1 * | 1/2019 | Katoh | G02F 1/1337 |

(Continued)

FOREIGN PATENT DOCUMENTS

| | | | |
|---|---|---|---|
| JP | 2010-525394 A | 7/2010 | |
| WO | WO 2006/092758 A2 | 9/2006 | |

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/032176, dated Mar. 16, 2023.

(Continued)

*Primary Examiner* — Nathanael R Briggs

(74) *Attorney, Agent, or Firm* — Birch, Stewart, Kolasch & Birch, LLP

(57) ABSTRACT

Provided are a liquid crystal diffraction element having a high diffraction efficiency irrespective of diffraction angles, an optical element including the liquid crystal diffraction element, and an image display unit, a head-mounted display, a beam steering, and a sensor including the liquid crystal diffraction element or the optical element. The liquid crystal diffraction element includes: an optically-anisotropic layer that is formed of a liquid crystal composition including a (Continued)

liquid crystal compound, in which the optically-anisotropic layer has a liquid crystal alignment pattern in which a direction of an optical axis derived from the liquid crystal compound changes while continuously rotating in at least one in-plane direction, in a case where a length over which the direction of the optical axis derived from the liquid crystal compound rotates by 180° in a plane is set as a single period, a length of the single period in the liquid crystal alignment pattern gradually changes in the one in-plane direction, in a cross-sectional image of the optically-anisotropic layer obtained by observing a cross-section taken in a thickness direction parallel to the one in-plane direction with a scanning electron microscope, the optically-anisotropic layer has bright portions and dark portions extending from one surface to another surface and each of the dark portions has two or more inflection points of angle, the optically-anisotropic layer has regions where tilt directions of the dark portions are different from each other in the thickness direction, and an average tilt angle of the dark portion gradually changes in the one in-plane direction.

17 Claims, 9 Drawing Sheets

Related U.S. Application Data continuation of application No. PCT/JP2021/032176, filed on Sep. 1, 2021.

(30) Foreign Application Priority Data

Mar. 5, 2021 (JP) ................................ 2021-035617
Apr. 7, 2021 (JP) ................................ 2021-065238

(56) References Cited

U.S. PATENT DOCUMENTS

| | | | |
|---|---|---|---|
| 2019/0317450 | A1 | 10/2019 | Yaroshchuk et al. |
| 2020/0409202 | A1 | 12/2020 | Kodama et al. |
| 2021/0011295 | A1 | 1/2021 | Sato et al. |
| 2021/0149248 | A1 | 5/2021 | Saitoh et al. |
| 2021/0208316 | A1 | 7/2021 | Sato et al. |
| 2024/0272470 | A1 | 8/2024 | Sato et al. |

FOREIGN PATENT DOCUMENTS

| | | | |
|---|---|---|---|
| WO | WO 2008/130555 | A1 | 10/2008 |
| WO | WO 2019/182052 | A1 | 9/2019 |
| WO | WO 2019/189852 | A1 | 10/2019 |
| WO | WO 2020/022434 | A1 | 1/2020 |
| WO | WO 2020/066429 | A1 | 4/2020 |
| WO | WO 2022/050319 | A1 | 3/2022 |

OTHER PUBLICATIONS

International Search Report (Form PCT/ISA/210) for International Application No. PCT/JP2021/032176, dated Nov. 30, 2021, with English translation.

Office Action for U.S. Appl. No. 18/176,529 mailed Jan. 8, 2024 (Notice of Allowance).

Japanese Office Action for corresponding Japanese Application No. 2024-104954, dated Sep. 16, 2025, with English translation.

* cited by examiner

LIQUID CRYSTAL DIFFRACTION ELEMENT, OPTICAL ELEMENT, IMAGE DISPLAY UNIT, HEAD-MOUNTED DISPLAY, BEAM STEERING, AND SENSOR

CROSS-REFERENCE TO RELATED APPLICATIONS

This application is a Continuation of copending application Ser. No. 18/176,529, filed on Mar. 1, 2023, which is a Continuation of PCT International Application No. PCT/JP2021/032176 filed on Sep. 1, 2021, which claims priority under 35 U.S.C. § 119(a) to Japanese Patent Application No. 2020-147455 filed on Sep. 2, 2020, Japanese Patent Application No. 2020-177293 filed on Oct. 22, 2020, Japanese Patent Application No. 2021-035617 filed on Mar. 5, 2021 and Japanese Patent Application No. 2021-065238 filed on Apr. 7, 2021. The above applications are hereby expressly incorporated by reference, in its entirety, into the present application.

BACKGROUND OF THE INVENTION

1. Field of the Invention

The present invention relates to a liquid crystal diffraction element that diffracts incidence light, an optical element including the liquid crystal diffraction element, and an image display unit, a head-mounted display, a beam steering, and a sensor including the liquid crystal diffraction element or the optical element.

2. Description of the Related Art

An optical element that controls a direction of light is used in various optical devices or systems.

For example, the optical element that controls a direction of light is used in various optical devices that display a virtual image, various information, or the like to be superimposed on a backlight unit of a liquid crystal display device and a scene that is actually being seen, for example, a head mounted display (HMD) such as Augmented Reality (AR) glasses, Virtual Reality (VR) glasses, or Mixed Reality (MR) glasses, a projector, a head up display (HUD), a beam steering device, or a sensor for detecting a thing or measuring the distance to a thing.

As the optical element that controls a direction light, a liquid crystal diffraction element including an optically-anisotropic layer that is formed of a liquid crystal composition including a liquid crystal compound is disclosed.

JP2010-525394A discloses a polarization diffraction grating including a substrate and a first polarization diffraction grating layer on the substrate. The first polarization diffraction grating layer includes a molecular structure that is twisted according to a first twist sense over a first thickness defined between opposing faces of the first polarization diffraction grating layer. JP2010-525394A describes that the polarization diffraction grating layer can align liquid crystal molecules in a predetermined alignment pattern to diffract light.

SUMMARY OF THE INVENTION

However, a liquid crystal diffraction element that changes a liquid crystal alignment pattern in a plane to diffract light is expected to be applied as an optical member for various optical devices. However, the liquid crystal diffraction element that changes a liquid crystal alignment pattern in a plane to diffract light has a problem in that, in a case where the diffraction angle increases, the diffraction efficiency decreases, that is, the intensity of diffracted light decreases.

Therefore, in an element where the diffraction angle varies depending on light incidence positions, for example, an element that exhibits a lens function by changing a liquid crystal alignment pattern in a plane to diffract light, there is a difference in diffraction efficiency between incidence positions in a plane of the element. That is, there is a problem in that there is a region where the brightness of transmitted light is low depending on incidence positions in a plane of the element.

An object of the present invention is to solve the above-described problem of the related art and to provide a liquid crystal diffraction element having a high diffraction efficiency irrespective of diffraction angles, an optical element including the liquid crystal diffraction element, and an image display unit, a head-mounted display, a beam steering, and a sensor including the liquid crystal diffraction element or the optical element.

In order to achieve the object, the present invention has the following configurations.

[1] A liquid crystal diffraction element comprising:

an optically-anisotropic layer that is formed of a liquid crystal composition including a liquid crystal compound, in which the optically-anisotropic layer has a liquid crystal alignment pattern in which a direction of an optical axis derived from the liquid crystal compound changes while continuously rotating in at least one in-plane direction, in a case where a length over which the direction of the optical axis derived from the liquid crystal compound rotates by 180° in a plane is set as a single period, a length of the single period in the liquid crystal alignment pattern gradually changes in the one in-plane direction, in a cross-sectional image of the optically-anisotropic layer obtained by observing a cross-section taken in a thickness direction parallel to the one in-plane direction with a scanning electron microscope, the optically-anisotropic layer has bright portions and dark portions extending from one surface to another surface and each of the dark portions has two or more inflection points of angle, the optically-anisotropic layer has regions where tilt directions of the dark portions are different from each other in the thickness direction, and an average tilt angle of the dark portion gradually changes in the one in-plane direction.

[2] The liquid crystal diffraction element according to [1], in which as the length of the single period in the liquid crystal alignment pattern decreases, the average tilt angle of the dark portion increases.

[3] The liquid crystal diffraction element according to [1] or [2], in which the number of inflection points where the tilt direction of the dark portion is folded is an odd number.

[4] The liquid crystal diffraction element according to any one of [1] to [3], in which the number of inflection points where the tilt direction of the dark portion is folded is one.

[5] The liquid crystal diffraction element according to any one of [1] to [3], in which the number of inflection points where the tilt direction of the dark portion is folded is three.

[6] The liquid crystal diffraction element according to any one of [1] to [5], wherein the liquid crystal alignment pattern of the optically-anisotropic layer is a concentric circular pattern having a concentric circular shape where the one in-plane direction in which the direction of the optical axis derived from the liquid crystal compound changes while continuously rotating moves from an inner side toward an outer side.

[7] The liquid crystal diffraction element according to [6], in which in the optically-anisotropic layer, shapes of the bright portions and the dark portions in a cross-section of a center portion of the concentric circular shape are symmetrical with respect to a center line of the optically-anisotropic layer in the thickness direction, and shapes of the bright portions and the dark portions in a cross-section of an end part of the concentric circular shape are asymmetrical with respect to the center line of the optically-anisotropic layer in the thickness direction.

[8] The liquid crystal diffraction element according to [6], in which in the optically-anisotropic layer, shapes of the bright portions and the dark portions in a cross-section of a center portion of the concentric circular shape are asymmetrical with respect to a center line of the optically-anisotropic layer in the thickness direction, and shapes of the bright portions and the dark portions in a cross-section of an end part of the concentric circular shape are asymmetrical with respect to the center line of the optically-anisotropic layer in the thickness direction.

[9] The liquid crystal diffraction element according to any one of [1] to [8], in which a difference $\Delta n_{550}$ in refractive index generated by refractive index anisotropy of the optically-anisotropic layer is 0.2 or more.

[10] The liquid crystal diffraction element according to any one of [1] to [9], in which a region where the length of the single period in the liquid crystal alignment pattern is 1.0 μm or less is provided in a plane.

[11] An optical element comprising:

the liquid crystal diffraction element according to any one of [1] to [10]; and a circularly polarizing plate.

[12] The optical element according to [11], in which the circularly polarizing plate consists of a retardation plate and a polarizer, and the liquid crystal diffraction element, the retardation plate, and the polarizer are disposed in this order.

[13] The optical element according to [12], in which the retardation plate is a λ/4 plate.

[14] The optical element according to or [13], in which the retardation plate has reverse wavelength dispersibility.

[15] An optical element comprising, in the following order:

the liquid crystal diffraction element according to any one of [1] to [10];

a silicon oxide layer; and a support.

[16] An optical element comprising:

at least one liquid crystal diffraction element according to any one of [1] to [10] or at least one optical element according to any one of [11] to [15]; and at least one phase modulation element.

[17] An image display unit comprising:

the liquid crystal diffraction element according to any one of [1] to [10] or the optical element according to any one of [11] to [15].

[18] A head-mounted display comprising:

the image display unit according to [17].

[19] A beam steering comprising:

the liquid crystal diffraction element according to any one of [1] to [10] or the optical element according to any one of to [15].

[20] A sensor comprising:

the liquid crystal diffraction element according to any one of [1] to [10] or the optical element according to any one of [11] to [15].

According to the present invention, the above-described problem of the related art can be solved, and a liquid crystal diffraction element having a high diffraction efficiency irrespective of diffraction angles can be provided.

DESCRIPTION OF THE PREFERRED EMBODIMENTS

Hereinafter, a liquid crystal diffraction element, an optical element, an image display unit, a head-mounted display, a beam steering, and a sensor according to the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In the present specification, Re(λ) represents an in-plane retardation at a wavelength λ. Unless specified otherwise, the wavelength λ refers to 550 nm.

In the present specification, Re(λ) is a value measured at the wavelength Δ using AxoScan (manufactured by Axometrics, Inc.). By inputting an average refractive index ((nx+ny+nz)/3) and a film thickness (d (μm)) to AxoScan, the following expressions can be calculated.

Slow Axis Direction (°)

$$Re(\lambda)=R0(\lambda)$$

R0(λ) is expressed as a numerical value calculated by AxoScan and represents Re(λ).

[Liquid Crystal Diffraction Element]

The liquid crystal diffraction element according to the embodiment of the present invention comprises:

- an optically-anisotropic layer that is formed of a liquid crystal composition including a liquid crystal compound,
- in which the optically-anisotropic layer has a liquid crystal alignment pattern in which a direction of an optical axis derived from the liquid crystal compound changes while continuously rotating in at least one in-plane direction,
- in a case where a length over which the direction of the optical axis derived from the liquid crystal compound rotates by 180° in a plane is set as a single period, a length of the single period in the liquid crystal alignment pattern gradually changes in the one in-plane direction,
- in a cross-sectional image of the optically-anisotropic layer obtained by observing a cross-section taken in a thickness direction parallel to the one in-plane direction with a scanning electron microscope, the optically-anisotropic layer has bright portions and dark portions extending from one surface to another surface and each of the dark portions has two or more inflection points of angle,
- the optically-anisotropic layer has regions where tilt directions of the dark portions are different from each other in the thickness direction, and
- an average tilt angle of the dark portion gradually changes in the one in-plane direction.

Figure 1:
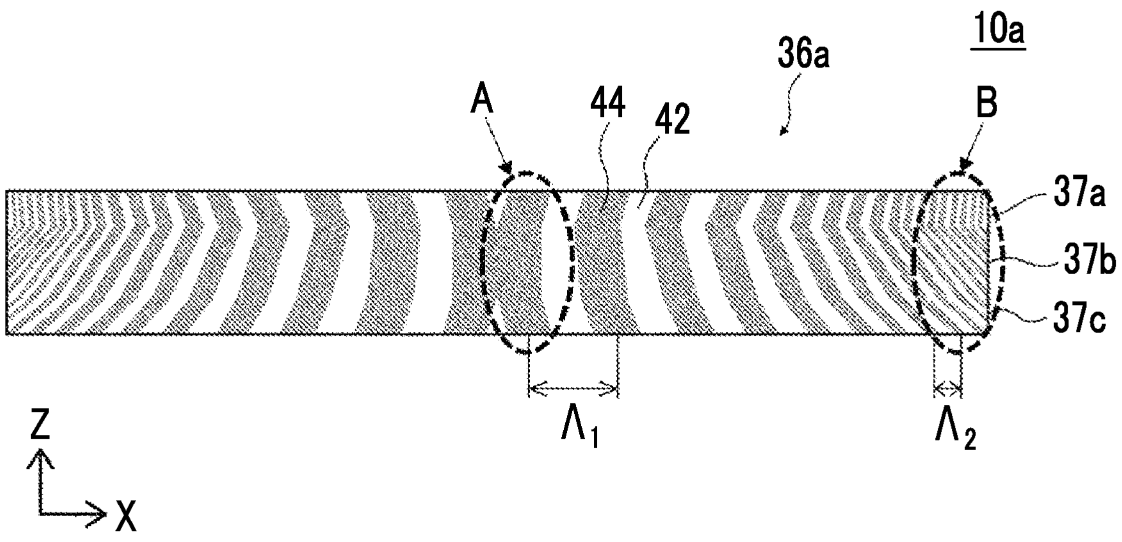
FIG. 1 is a diagram conceptually showing one example of an optically-anisotropic layer of a liquid crystal diffraction element according to the present invention.
Figure 2:
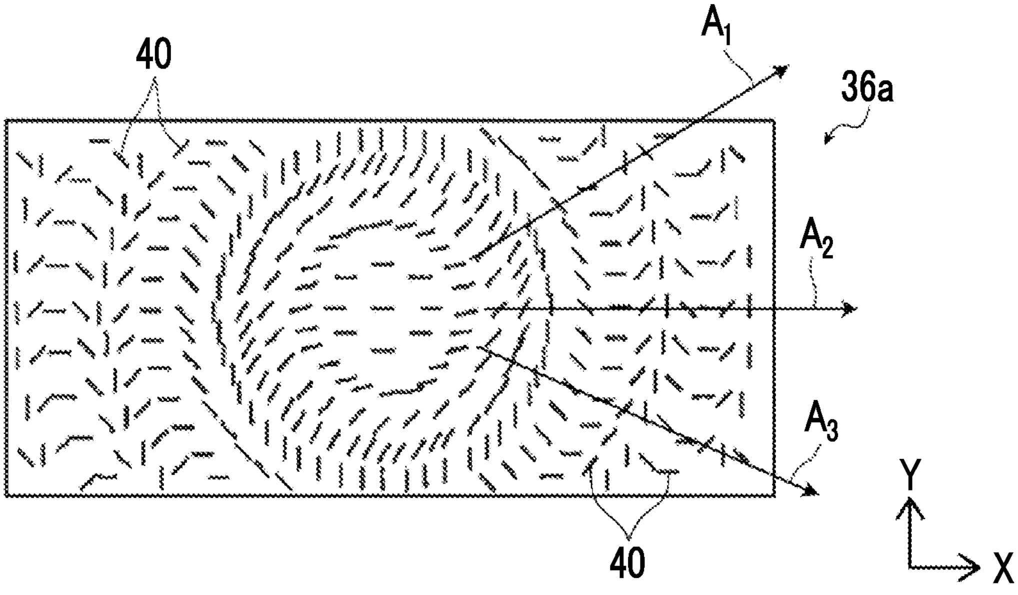
FIG. 2 is a plan view showing the optically-anisotropic layer shown in FIG. 1.

FIG. 1 conceptually shows an example of the liquid crystal diffraction element according to the present invention. FIG. 2 is a plan view in a case where the liquid crystal diffraction element (optically-anisotropic layer) of FIG. 1 is seen from the top. FIG. 1 is a diagram conceptually showing bright portions and dark portions observed due to a liquid crystal phase in a case where an optically-anisotropic layer 36*a* is observed with a scanning electron microscope (SEM).

A liquid crystal diffraction element 10*a* of FIGS. 1 and 2 includes the optically-anisotropic layer 36*a* that is formed of a composition including a liquid crystal compound. The optically-anisotropic layer 36*a* is formed of a composition including a liquid crystal compound and has a predetermined liquid crystal alignment pattern in which an optical axis derived from the liquid crystal compound changes while continuously rotating in at least one in-plane direction.

In the example shown in FIG. 2, a liquid crystal alignment pattern in a liquid crystal layer 36 is a concentric circular pattern having a concentric circular shape where the one in-plane direction (arrows $A_1$ to $A_3$) in which a direction of an optical axis of a liquid crystal compound 40 changes while continuously rotating moves from an inner side toward an outer side. The concentric circular pattern is a pattern in which a line that connects liquid crystal compounds of which optical axes face the same direction has a circular shape and circular line segments have a concentric circular shape. In other words, the liquid crystal alignment pattern of the optically-anisotropic layer 36*a* shown in FIG. 2 is a liquid crystal alignment pattern where the one in-plane direction in which the direction of the optical axis of the liquid crystal compound 40 changes while continuously rotating is provided in a radial shape from the center of the liquid crystal layer 36.

In the optically-anisotropic layer 36*a* shown in FIG. 2, the optical axis (not shown) of the liquid crystal compound 40 is a longitudinal direction of the liquid crystal compound 40.

In the optically-anisotropic layer 36*a*, the direction of the optical axis of the liquid crystal compound 40 changes while continuously rotating in a direction in which a large number of optical axes move to the outer side from the center of the optically-anisotropic layer 36*a*, for example, a direction indicated by an arrow $A_1$, a direction indicated by an arrow $A_2$, a direction indicated by an arrow $A_3$, or . . . . The arrow $A_1$, the arrow $A_2$, and the arrow $A_3$ are arrangement axes described below.

FIG. 1 is an image showing a cross-section taken along the arrow $A_1$ observed with an SEM. SEM images showing a cross-section taken along the arrow $A_2$ and a cross-section taken along the $A_3$ are also as shown in FIG. 1.

In addition, the optically-anisotropic layer 36*a* in the liquid crystal diffraction element 10*a* has regions where the single periods Λ of the liquid crystal alignment pattern are different in a plane. Here, the single period Λ of the liquid crystal alignment pattern refers to a length (distance) over which the optical axis of the liquid crystal compound 40 in the liquid crystal alignment pattern rotates by 180° in the one in-plane direction in which the direction of the optical axis changes while continuously rotating.

Specifically, FIG. 1 is, for example, a diagram showing the cross-section taken along the arrow $A_1$ in FIG. 2, and in the direction in which the direction of the optical axis derived from the liquid crystal compound 40 changes while continuously rotating, the single period Λ gradually decreases from the center toward the outer side. That is, in FIG. 1, a single period $\Lambda_2$ in the vicinity of the outer side is shorter than a single period $\Lambda_1$ in the vicinity of the center portion.

In the present invention, the single period Λ gradually changing represents both of a case where the single period Λ continuously changes and a case where the single period Λ changes stepwise.

Although described below in detail, the diffraction angle of the liquid crystal diffraction element depends on the single period Λ of the liquid crystal alignment pattern, and as the single period Λ decreases, the diffraction angle increases.

In a case where the optically-anisotropic layer 36*a* has the configuration in which the one in-plane direction in which the direction of the optical axis of the liquid crystal compound 40 in the liquid crystal alignment pattern changes while continuously rotating is provided in a radial shape from the center of the optically-anisotropic layer 36*a* and in which the single period Λ of the liquid crystal alignment pattern gradually decreases from the center toward the outer side in each of the one in-plane directions, circularly polarized light incident into the optically-anisotropic layer 36*a* having the above-described liquid crystal alignment pattern is bent (diffracted) depending on individual local regions having different directions of optical axes of the liquid crystal compound 40. In this case, the diffraction angles vary depending on the single periods in the regions where circularly polarized light is incident. In the optically-anisotropic layer 36*a* having the concentric circular liquid crystal alignment pattern, that is, the liquid crystal alignment pattern in which the optical axis changes while continuously rotating in a radial shape, transmission of incidence light can be allowed as converging light depending on the rotation direction of the optical axis of the liquid crystal compound 40 and the direction of circularly polarized light to be incident.

That is, by setting the liquid crystal alignment pattern of the optically-anisotropic layer 36*a* in a concentric circular shape, the liquid crystal diffraction element 10*a* exhibits, for example, a function as a convex lens.

Here, in the present invention, as shown in FIG. 1, in the SEM image of the optically-anisotropic layer 36*a*, the optically-anisotropic layer 36*a* has the bright portions 42 and the dark portions 44 extending from one surface to another surface, each of the dark portions 44 has two or more inflection points of angle, the optically-anisotropic layer 36*a* has the regions where the tilt directions of the dark portions 44 in the thickness direction are different from each other in the thickness direction, and an average tilt angle of the dark portion 44 gradually changes in the one in-plane direction (arrows $A_1$, $A_2$, $A_3$, and the like) in which the direction of the optical axis of the liquid crystal compound 40 changes while continuously changing.

In the example shown in FIG. 1, the optically-anisotropic layer 36*a* has the stripe pattern of the bright portions 42 and the dark portions 44, and the tilt angle of one dark portion 44 with respect to the surface changes at two positions in the thickness direction. That is, each of the dark portions 44 has two inflection points. In addition, in all of the dark portions 44, a tilt direction in the upper region in the drawing and a tilt direction in the lower region in the drawing are opposite to each other. That is, each of the dark portions 44 has regions where the tilt directions are different. Specifically, in a portion of the optically-anisotropic layer 36*a* shown in FIG. 1 on the right side from the center, the dark portion 44 is tilted in the right direction in an upper region in the drawing, and the dark portion 44 is tilted in the left direction in a lower region in the drawing. On the other hand, in a portion of the optically-anisotropic layer 36*a* shown in FIG. 1 on the left side from the center, the dark portion 44 is tilted in the left direction in an upper region in the drawing, and the dark portion 44 is tilted in the right direction in a lower region in the drawing.

In the present invention, in the optically-anisotropic layer 36*a*, in a case where an angle between a line that connects a contact between each of the dark portions 44 and one surface and a contact between the dark portion 44 and another surface and a line perpendicular to the main surface of the optically-anisotropic layer 36*a* is represented by the average tilt angle, an average tilt angle of the dark portion 44 gradually changes in the one in-plane direction (arrows $A_1$, $A_2$, $A_3$, and the like) in which the direction of the optical axis of the liquid crystal compound 40 changes while continuously changing. Specifically, in the example shown in FIG. 1, the average tilt angle of the dark portion 44 in the vicinity of the center is about 0°, and the average tilt angle gradually increases from the center toward an outer side. That is, in the optically-anisotropic layer 36*a* in the example shown in the drawing, as the single period Λ of the liquid crystal alignment pattern gradually decreases, the average tilt angle of the dark portion 44 gradually increases.

In the present invention, the average tilt angle of the dark portion gradually changing represents both of a case where the average tilt angle continuously changes and a case where the average tilt angle changes stepwise.

It can also be said that the optically-anisotropic layer 36*a* has three regions (37*a*, 37*b*, 37*c*) in the thickness direction, and the tilt angles of the dark portions 44 at the same position in the plane direction in the regions are different.

Here, the liquid crystal alignment of the optically-anisotropic layer 36*a* where the dark portion has two or more inflection points of angle and the average tilt angle of the dark portion gradually changes will be described using FIGS. 3 and 4.

Figure 3:
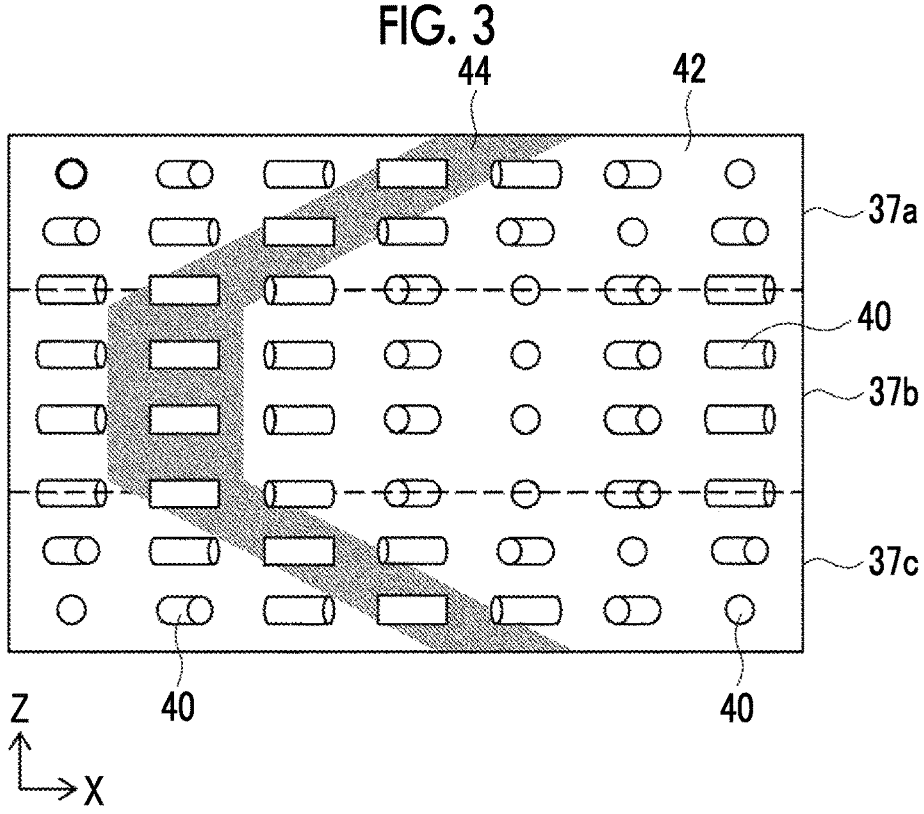
FIG. 3 is an enlarged view showing a portion indicated by A in FIG. 1.
Figure 4:
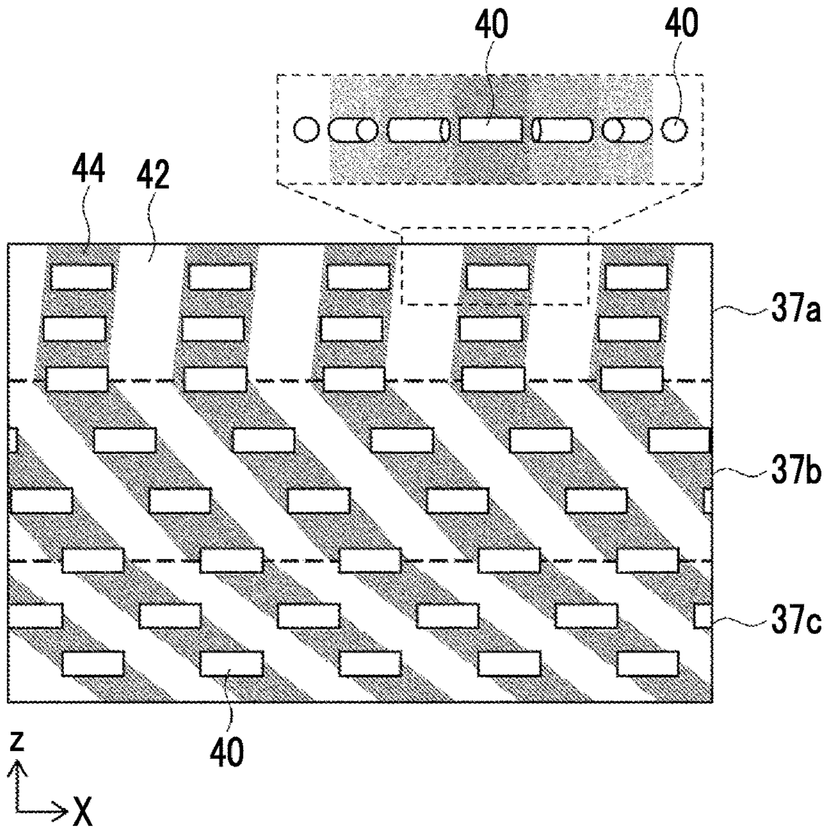
FIG. 4 is an enlarged view showing a portion indicated by B in FIG. 1.

FIG. 3 is an enlarged conceptual diagram showing a portion indicated by A in FIG. 1, and FIG. 4 is an enlarged conceptual diagram showing a portion indicated by B in FIG. 1. That is, FIG. 3 is an enlarged conceptual diagram showing the center portion of the optically-anisotropic layer 36*a*, and FIG. 4 is an enlarged conceptual diagram showing an outer side portion of the optically-anisotropic layer 36*a*. In addition, in FIGS. 3 and 4, the arrangement of the liquid crystal compounds 40 and the bright portions 42 and the dark portions 44 observed with the SEM due to the liquid crystal phase are shown to overlap each other. In FIG. 4, only the liquid crystal compounds 40 that face a direction parallel to the paper plane are shown. As in a portion surrounded by a broken line that is enlarged and shown in FIG. 4, the liquid crystal compounds 40 are arranged to rotate counterclockwise to the right side in the drawing.

As shown in FIGS. 3 and 4, in the optically-anisotropic layer 36*a*, at any position in the thickness direction, the optical axis (now shown in the drawing; the same direction as a longitudinal direction of the liquid crystal compound 40) derived from the liquid crystal compound 40 rotates counterclockwise (to the left in a view from the upper side in the drawing) from the center toward an outer side in the plane direction.

In addition, as shown in FIG. 3, in the center portion, in the lower region 37*c* in the thickness direction, the liquid crystal compound 40 is aligned to be twisted clockwise (to the right) from the upper side to the lower side in the drawing in the thickness direction.

On the other hand, in the middle region 37*b* in the thickness direction, the liquid crystal compound 40 is not twisted in the thickness direction, and the optical axes of the liquid crystal compounds 40 laminated in the thickness direction face the same direction. That is, it is preferable that the optical axes of the liquid crystal compounds 40 present at the same position in the plane direction face the same direction.

In addition, in the upper region 37*a* in the thickness direction, the liquid crystal compound 40 is aligned to be twisted counterclockwise (to the left) from the upper side to the lower side in the drawing in the thickness direction.

That is, in the region 37*a*, the region 37*b*, and the region 37*c* of the optically-anisotropic layer 36*a* shown in FIG. 3, the twisted states of the liquid crystal compounds 40 in the thickness direction are different from each other.

The bright portions 42 and the dark portions 44 in the SEM image of the optically-anisotropic layer 36*a* are observed to connect the liquid crystal compounds 40 facing the same direction. For example, in FIG. 3, the dark portions 44 are observed to connect the liquid crystal compounds 40 of which the optical axes face a direction parallel to the paper plane.

In the region 37*a*, the region 37*b*, and the region 37*c* of the optically-anisotropic layer 36*a* shown in FIG. 3, the twisted states of the liquid crystal compounds 40 in the thickness direction are different from each other. Therefore, as shown in FIG. 3, the bright portions 42 and the dark portions 44 in the SEM image are formed in a substantially C-shape.

In addition, in the example shown in FIG. 3, the thickness of the region 37*a* and the thickness of the region 37*c* are substantially the same, and the twisted angle of the thickness direction of the liquid crystal compound 40 in the region 37*a* and the twisted angle of the thickness direction of the liquid crystal compound 40 in the region 37*c* are substantially the same. Accordingly, in the dark portion 44 of the region 37*a* and the dark portion 44 of the region 37*c*, the tilt directions are opposite, and the tilt angles are the same. In the region 37*b*, the liquid crystal compounds 40 are not twisted in the thickness direction. Therefore, the dark portion 44 is not tilted. Accordingly, the average tilt angle of the dark portion 44 in the center portion of the optically-anisotropic layer 36*a* is substantially 0°.

In addition, in the outer side portion shown in FIG. 4, in the lower region 37*c* in the thickness direction, the liquid crystal compound 40 is aligned to be twisted clockwise (to the right) from the upper side to the lower side in the drawing in the thickness direction. In the outer side portion of the region 37*c*, the twisted angle of the thickness direction is larger than that of the center portion.

In addition, in the middle region 37*b* in the thickness direction, the liquid crystal compound 40 is aligned to be twisted clockwise (to the right) from the upper side to the lower side in the drawing in the thickness direction.

In addition, the twisted angle of the thickness direction in the region 37*c* and the twisted angle of the thickness direction in the region 37*b* are different. Accordingly, in the dark portion 44 of the region 37*c* and the dark portion 44 of the region 37*b*, the tilt directions are the same, and the tilt angles are different.

On the other hand, in the upper region 37*a* in the thickness direction, the liquid crystal compound 40 is aligned to be twisted counterclockwise (to the left) from the upper side to the lower side in the drawing in the thickness direction. Accordingly, the tilt direction of the region 37*a* is opposite to that of the region 37*c* and the region 37*b*. In addition, in the outer side portion of the region 37*a*, the twisted angle of the thickness direction is smaller than that of the center portion. Therefore, the absolute value of the tilt angle of the dark portion 44 in the region 37*a* is smaller than the absolute value of the tilt angle of the dark portion 44 in the region 37*c*.

Accordingly, the average tilt angle of the dark portion 44 in the outer side portion of the optically-anisotropic layer 36*a* is a value that is not 0°.

In the example shown in FIG. 1, in the region 37*a*, the region 37*b*, and the region 37*c* of the optically-anisotropic layer 36*a*, the single period Λ of the liquid crystal alignment pattern gradually decreases from the center toward the outer side. In addition, the right twist of the thickness direction in the region 37*c* increases from the center toward the outer side, the right twist of the thickness direction in the region 37*b* increases from the center toward the outer side, and the left twist of the thickness direction in the region 37*a* decreases from the center toward the outer side. As a result, it can be said that, in each of the regions, the twist of the thickness direction at the center can be imparted with the right twist toward the outer side.

By configuring the single periods Λ of the liquid crystal alignment patterns and the twisted angles of the thickness direction in the region 37*a*, the region 37*b*, and the region 37*c* as described above, the configuration in which the average tilt angle of the dark portion 44 is substantially 0° in the center portion and gradually increases toward the outer side can be adopted.

In the optically-anisotropic layer 36*a*, as shown in FIG. 1, it can be said that shapes of the bright portions 42 and the dark portions 44 in a cross-section of a center portion of the concentric circular shape are symmetrical with respect to a center line of the optically-anisotropic layer 36*a* in the thickness direction, and shapes of the bright portions 42 and the dark portions 44 in a cross-section of an end part of the concentric circular shape are asymmetrical with respect to the center line of the optically-anisotropic layer 36*a* in the thickness direction.

As described above, the liquid crystal diffraction element that changes a liquid crystal alignment pattern in a plane to diffract light has a problem in that, in a case where the diffraction angle increases, the diffraction efficiency decreases, that is, the intensity of diffracted light decreases. Specifically, in the diffraction of light by the optically-anisotropic layer having the liquid crystal alignment pattern in which the direction of the optical axis of the liquid crystal compound changes while continuously rotating in a plane, there is a problem in that, in a case where the diffraction angle increases, the diffraction efficiency decreases, that is, the intensity of diffracted light decreases. Therefore, in a case where the optically-anisotropic layer has regions having different lengths of the single periods over which the direction of the optical axis of the liquid crystal compound rotates by 180° in a plane, the diffraction angle varies depending on light incidence positions. Therefore, there is a difference in the amount of diffracted light depending on in-plane incidence positions. That is, there is a problem in that there is a region where the brightness of transmitted and diffracted light is low depending on in-plane incidence positions.

On the other hand, in the liquid crystal diffraction element according to the embodiment of the present invention, in the configuration where the diffraction angle of light in a plane changes by gradually changing the length of the single period in the liquid crystal alignment pattern of the optically-anisotropic layer in the one in-plane direction, the dark portion observed in the SEM image of the optically-anisotropic layer has two or more inflection points, the optically-anisotropic layer has regions where tilt directions of the dark portions are different from each other in the thickness direction, and the average tilt angle of the dark portion gradually changes in the direction in which the single period of the liquid crystal alignment pattern changes depending on this change direction. By configuring the optically-anisotropic layer as described above, a decrease in diffraction efficiency can be suppressed even in the region where the diffraction angle is large. As a result, the liquid crystal diffraction element where the diffraction efficiency is high irrespective of diffraction angles and the amount of transmitted light is uniform can be obtained.

In addition, in the liquid crystal diffraction element according to the embodiment of the present invention, in the optically-anisotropic layer 36*a*, that is, the cross-sectional SEM image, the optically-anisotropic layer 36*a* has the bright portions 42 and the dark portions 44 extending from one surface to another surface, each of the dark portions 44 has two or more inflection points of angle, and the optically-anisotropic layer 36*a* has the regions where the tilt directions are different in the thickness direction. As a result, the wavelength dependence of the diffraction efficiency can be reduced, and light can be diffracted with the same diffraction efficiency irrespective of wavelengths.

As described above, in the liquid crystal diffraction element including the optically-anisotropic layer having liquid crystal alignment pattern in which the direction of the optical axis derived from the liquid crystal compound continuously changes in at least one in-plane direction, incidence light in a wide wavelength range, for example, the entire wavelength range of visible light can be diffracted at different diffraction angles depending on the wavelengths.

However, according to the investigation by the present inventors, the cross-sectional SEM image of the liquid crystal diffraction element having the liquid crystal alignment pattern in the related art has dark portions that are tilted with respect to the surface (main surface) but does not have the inflection point where the angle changes or has only one inflection point as described in JP2010-525394A. Therefore, in the liquid crystal diffraction element in the related art, the wavelength dependence of the diffraction efficiency is large, for example, the diffraction efficiencies of red light and green light are high but the diffraction efficiency of blue light is lower than those of the other two colors.

On the other hand, in the liquid crystal diffraction element according to the embodiment of the present invention, the dark portion 44 observed in the cross-sectional SEM image has two or more inflection points of angle and has the regions where the tilt directions are different in the thickness direction. As a result, the wavelength dependence of the diffraction efficiency can be reduced, and light can be diffracted with the same diffraction efficiency irrespective of wavelengths. Further, light can be diffracted with high diffraction efficiency irrespective of wavelengths.

Here, in the example shown in FIG. 1, the optically-anisotropic layer 36*a* has two inflection points where the tilt angle of each of the dark portions 44 changes. However, the present invention is not limited to this example, and each of the dark portions 44 may have three or more inflection points.

In addition, in the example shown in FIG. 1, in the optically-anisotropic layer 36*a*, each of the dark portions 44 other than the dark portion 44 positioned at the center in the left-right direction has one inflection point where the tilt direction is folded in the opposite direction. Specifically, in each of the dark portions 44, the tilt direction in the region 37*a* and the tilt direction in the region 37*b* are opposite to each other. Therefore, at the inflection point positioned at the interface between the region 37*a* and the region 37*b*, the tilt direction is folded in the opposite direction.

The present invention is not limited to the configuration where each of the dark portion 44 has one inflection point where the tilt direction is folded in the opposite direction. Each of the dark portion 44 may have two or more inflection points where the tilt direction is folded in the opposite direction. It is preferable that the number of inflection points where the tilt direction is folded in the opposite direction is an odd number.

Figure 5:
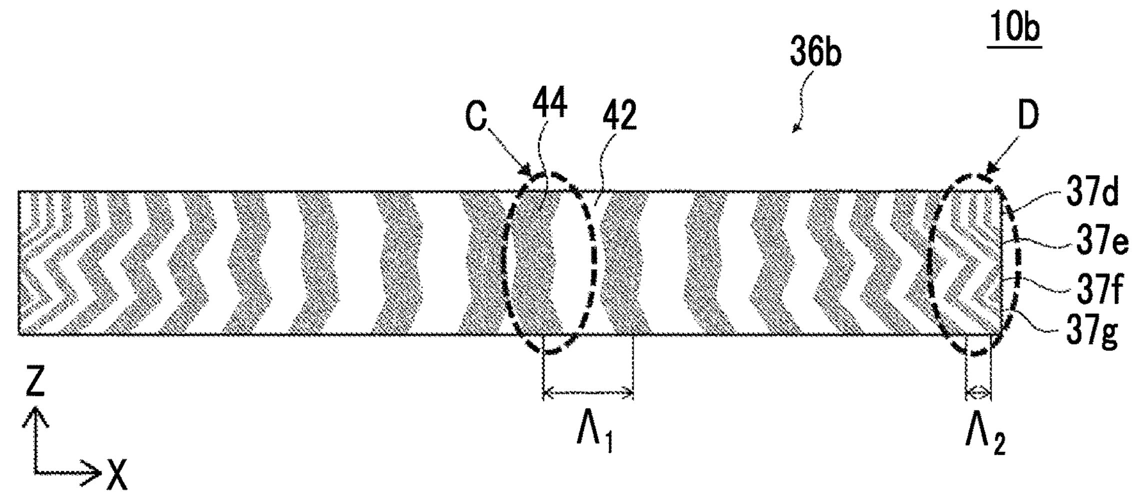
FIG. 5 is a diagram conceptually showing another example of the optically-anisotropic layer of the liquid crystal diffraction element according to the present invention.

FIG. 5 is a diagram conceptually showing another example of the liquid crystal diffraction element according to the embodiment of the present invention. FIG. 5 is a diagram conceptually showing bright portions and dark portions observed due to a liquid crystal phase in a case where an optically-anisotropic layer 36*b* is observed with a scanning electron microscope (SEM).

In the example, the liquid crystal diffraction element 10*b* shown in FIG. 5 includes the optically-anisotropic layer 36*b* where the dark portion has three inflection points where the tilt direction is folded in the opposite direction.

The liquid crystal diffraction element 10*b* shown in FIG. 5 includes the optically-anisotropic layer 36*b* that is formed of a composition including a liquid crystal compound. The optically-anisotropic layer 36*b* is formed of a composition including a liquid crystal compound and has a predetermined liquid crystal alignment pattern in which an optical axis derived from the liquid crystal compound changes while continuously rotating in at least one in-plane direction. The plan view of the optically-anisotropic layer 36*b* is the same as FIG. 2.

In addition, the optically-anisotropic layer 36*b* in the liquid crystal diffraction element 10*b* has regions where the single periods Λ of the liquid crystal alignment pattern described below are different in a plane. That is, in FIG. 5, a single period $A_2$ in the vicinity of the outer side is shorter than a single period $A_1$ in the vicinity of the center portion.

As in the optically-anisotropic layer 36*a*, the optically-anisotropic layer 36*b* has the concentric circular liquid crystal alignment pattern, and the single period Λ of the liquid crystal alignment pattern changes from the center toward the outer side. Therefore, the optically-anisotropic layer 36*b* functions as a convex lens.

Here, as shown in FIG. 5, in the SEM image of the optically-anisotropic layer 36*b*, the optically-anisotropic layer 36*b* has the bright portions 42 and the dark portions 44 extending from one surface to another surface, each of the dark portions 44 has three inflection points of angle, the optically-anisotropic layer 36*b* has the regions where the tilt directions of the dark portions 44 in the thickness direction are different from each other in the thickness direction, and an average tilt angle of the dark portion 44 gradually changes in the one in-plane direction in which the direction of the optical axis of the liquid crystal compound 40 changes while continuously changing.

In the example shown in FIG. 5, the optically-anisotropic layer 36*b* has the stripe pattern of the bright portions 42 and the dark portions 44, and the tilt angle of each of the dark portions 44 with respect to the surface changes at three positions in the thickness direction. That is, each of the dark portions 44 has three inflection points. In addition, in any dark portion 44, the tilt direction of the dark portion 44 changes alternately in a region 37*d*, a region 37*e*, a region 37*f*, and a region 37*g* disposed from above in the drawing. That is, each of the dark portions 44 has regions where the tilt directions are different. In addition, each of the dark portions 44 has three inflection points where the tilt direction is folded in the opposite direction.

Specifically, in a portion of the optically-anisotropic layer 36*b* shown in FIG. 5 on the right side from the center, the dark portion 44 is tilted in the right direction in the upper region 37*d* in the drawing, the dark portion 44 is tilted in the left direction in the region 37*e*, the dark portion 44 is tilted in the right direction in the region 37*f*, and the dark portion 44 is tilted in the left direction in the region 37*g*. On the other hand, in a portion of the optically-anisotropic layer 36*b* on the left side from the center, the dark portion 44 is tilted in the left direction in the upper region 37*d* in the drawing, the dark portion 44 is tilted in the right direction in the region 37*e*, the dark portion 44 is tilted in the left direction in the region 37*f*, and the dark portion 44 is tilted in the right direction in the region 37*g*.

In addition, in the optically-anisotropic layer 36*b*, the average tilt angle of the dark portion 44 gradually changes in the one in-plane direction in which the direction of the optical axis of the liquid crystal compound 40 changes while continuously changing. Specifically, in the example shown in FIG. 5, the average tilt angle of the dark portion 44 in the vicinity of the center is about 0°, and the average tilt angle gradually increases from the center toward an outer side. That is, in the optically-anisotropic layer 36*b* in the example shown in the drawing, as the single period Λ of the liquid crystal alignment pattern gradually increases, the average tilt angle of the dark portion 44 gradually increases.

It can also be said that the optically-anisotropic layer 36*b* has four regions (37*d*, 37*e*, 37*f*, 37*g*) in the thickness direction, and the tilt angles of the dark portions 44 at the same position in the plane direction in the regions are different.

The liquid crystal alignment of the optically-anisotropic layer 36*b* will be described using FIGS. 6 and 7.

Figure 6:
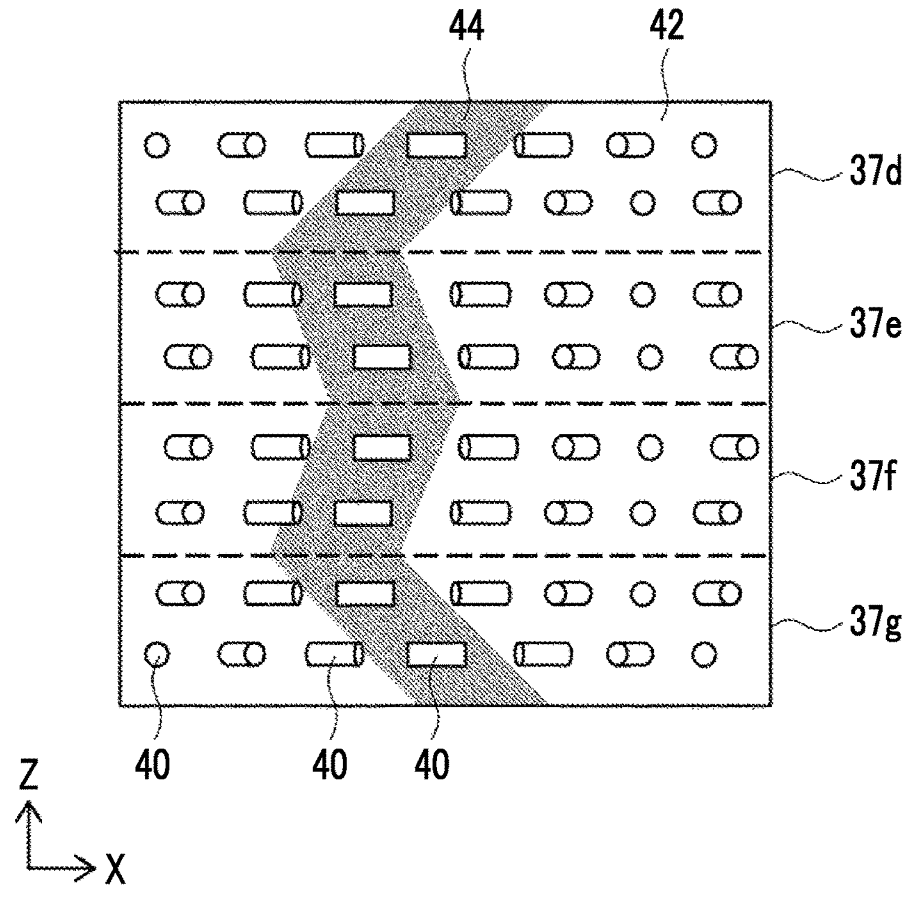
FIG. 6 is an enlarged view showing a portion indicated by C in FIG. 5.
Figure 7:
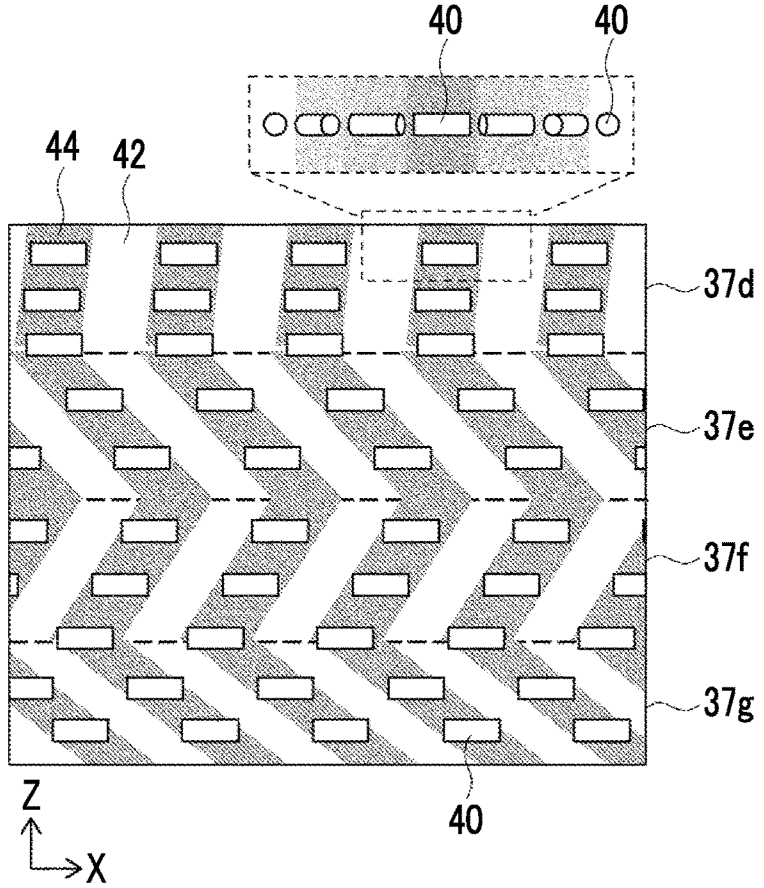
FIG. 7 is an enlarged view showing a portion indicated by D in FIG. 5.

FIG. 6 is an enlarged conceptual diagram showing a portion indicated by C in FIG. 5, and FIG. 7 is an enlarged conceptual diagram showing a portion indicated by D in FIG. 5. That is, FIG. 6 is an enlarged conceptual diagram showing the center portion of the optically-anisotropic layer 36*b*, and FIG. 7 is an enlarged conceptual diagram showing an outer side portion of the optically-anisotropic layer 36*b*. In addition, in FIGS. 6 and 7, the arrangement of the liquid crystal compounds 40 and the bright portions 42 and the dark portions 44 observed with the SEM due to the liquid crystal phase are shown to overlap each other. In FIG. 7, only the liquid crystal compounds 40 that face a direction parallel to the paper plane are shown. As in a portion surrounded by a broken line that is enlarged and shown in FIG. 7, the liquid crystal compounds 40 are arranged to rotate counterclockwise to the right side in the drawing.

As shown in FIGS. 6 and 7, in the optically-anisotropic layer 36*a*, at any position in the thickness direction, the optical axis (now shown in the drawing; the same direction as a longitudinal direction of the liquid crystal compound 40) derived from the liquid crystal compound 40 rotates counterclockwise (to the left in a view from the upper side in the drawing) from the center toward an outer side in the plane direction.

In addition, as shown in FIG. 6, in the center portion, in the lower region 37*g* in the thickness direction, the liquid crystal compound 40 is aligned to be twisted clockwise (to the right) from the upper side to the lower side in the drawing in the thickness direction.

On the other hand, in the upper region 37*f*, the liquid crystal compound 40 is aligned to be twisted counterclockwise (to the left) from the upper side to the lower side in the drawing in the thickness direction.

In addition, in the region 37*e*, the liquid crystal compound 40 is aligned to be twisted clockwise (to the right) from the upper side to the lower side in the drawing in the thickness direction.

In addition, in the upper region 37*d* in the thickness direction, the liquid crystal compound 40 is aligned to be twisted counterclockwise (to the left) from the upper side to the lower side in the drawing in the thickness direction.

That is, in the region 37*d* to the region 37*g* of the optically-anisotropic layer 36*b* shown in FIG. 6, the twisted states of the liquid crystal compounds 40 in the thickness direction are different from each other.

In the region 37*a*, the region 37*b*, and the region 37*c* of the optically-anisotropic layer 36*a* shown in FIG. 3, the twisted states of the liquid crystal compounds 40 in the thickness direction are different from each other. Therefore, as shown in FIG. 6, the bright portions 42 and the dark portions 44 in the SEM image are formed in a substantially W-shape.

In addition, in the example shown in FIG. 6, the thickness of the region 37*d* and the thickness of the region 37*g* are substantially the same, and the twisted angle of the thickness direction of the liquid crystal compound 40 in the region 37*d* and the twisted angle of the thickness direction of the liquid crystal compound 40 in the region 37*g* are substantially the same. Accordingly, in the dark portion 44 of the region 37*d* and the dark portion 44 of the region 37*g*, the tilt directions are opposite, and the tilt angles are the same. In addition, the thickness of the region 37*e* and the thickness of the region 37*f* are substantially the same, and the twisted angle of the thickness direction of the liquid crystal compound 40 in the region 37*e* and the twisted angle of the thickness direction of the liquid crystal compound 40 in the region 37*f* are substantially the same. Accordingly, in the dark portion 44 of the region 37*e* and the dark portion 44 of the region 37*f*, the tilt directions are opposite, and the tilt angles are the same. Accordingly, the average tilt angle of the dark portion 44 in the center portion of the optically-anisotropic layer 36*b* is substantially 0°.

In addition, in the outer side portion shown in FIG. 7, in the lower region 37*g* in the thickness direction, the liquid crystal compound 40 is aligned to be twisted clockwise (to the right) from the upper side to the lower side in the drawing in the thickness direction. In the outer side portion of the region 37*g*, the twisted angle of the thickness direction is larger than that of the center portion.

In addition, in the upper region 37*f*, the liquid crystal compound 40 is aligned to be twisted counterclockwise (to the left) from the upper side to the lower side in the drawing in the thickness direction. In the outer side portion of the region 37*f*, the twisted angle of the thickness direction is larger than that of the center portion.

In addition, in the region 37*e*, the liquid crystal compound 40 is aligned to be twisted clockwise (to the right) from the upper side to the lower side in the drawing in the thickness direction. In the outer side portion of the region 37*e*, the twisted angle of the thickness direction is larger than that of the center portion.

In addition, in the upper region 37*d*, the liquid crystal compound 40 is aligned to be twisted counterclockwise (to the left) from the upper side to the lower side in the drawing in the thickness direction. In the outer side portion of the region 37*d*, the twisted angle of the thickness direction is smaller than that of the center portion.

Therefore, the tilt direction of the dark portion 44 in the region 37*g* and the region 37*e* and the tilt direction of the dark portion 44 in the region 37*f* and the region 37*d* are different from each other. In addition, the absolute value of the tilt angle of the dark portion 44 in the region 37*d* is less than the absolute value of the tilt angle of the dark portion 44 in the other regions.

Accordingly, the average tilt angle of the dark portion 44 in the outer side portion of the optically-anisotropic layer 36*b* is a value that is not 0°.

By configuring the single periods Λ of the liquid crystal alignment patterns and the twisted angles of the thickness direction in the region 37*d* to the region 37*g* as described above, the configuration in which the average tilt angle of the dark portion 44 is substantially 0° in the center portion and gradually increases toward the outer side can be adopted.

In the optically-anisotropic layer 36*b*, as shown in FIG. 5, it can be said that shapes of the bright portions 42 and the dark portions 44 in a cross-section of a center portion of the concentric circular shape are symmetrical with respect to a center line of the optically-anisotropic layer 36*b* in the thickness direction, and shapes of the bright portions 42 and the dark portions 44 in a cross-section of an end part of the concentric circular shape are asymmetrical with respect to the center line of the optically-anisotropic layer 36*b* in the thickness direction.

This way, even in a case where the optically-anisotropic layer 36*b* has the configuration where the bright portions 42 and the dark portions 44 are formed in a substantially W-shape and each of the dark portions 44 has three inflection points where the tilt direction is folded in the opposite direction, in the configuration where the diffraction angle of light varies in a plane, the liquid crystal diffraction element where the diffraction efficiency is high irrespective of diffraction angles and the amount of transmitted light is uniform can be obtained.

Figure 16:
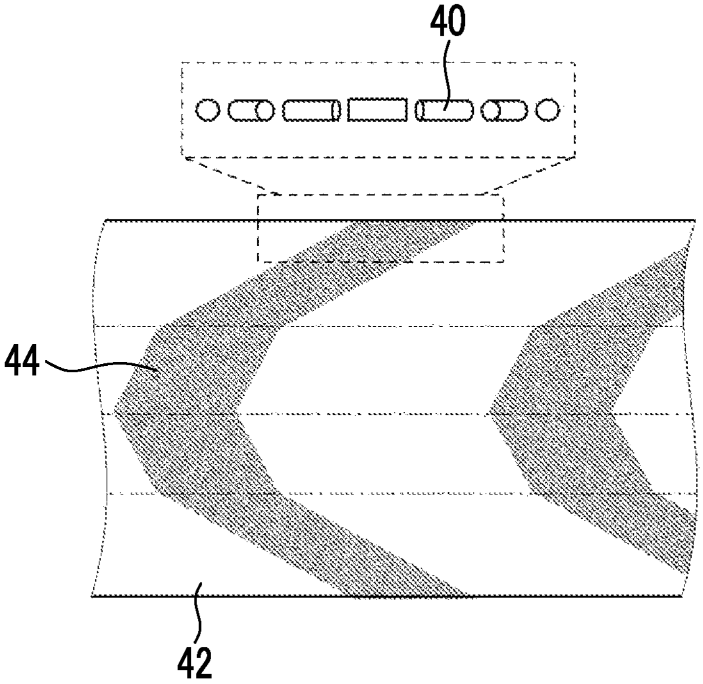
FIG. 16 is a diagram conceptually showing another example of the optically-anisotropic layer.

In another example of the center portion, as conceptually shown in FIG. 16, the optically-anisotropic layer has four regions corresponding to the inflection points of the dark portion 44 in the thickness direction.

In the example, in the lowermost region, the dark portion 44 is tilted to the upper left side in the drawing. In the second region from below, the dark portion 44 is tilted to the upper left in the drawing at a larger angle than the lowermost region with respect to the surface. In the third region from below, the dark portion 44 is tilted to the upper right side in the drawing. Further, in the uppermost region, the dark portion 44 is tilted to the upper right in the drawing at a smaller angle than the third region from below with respect to the surface.

That is, the optically-anisotropic layer shown in FIG. 16 has three inflection points of angle where the angle of the dark portion 44 changes, and the inflection point where the tilt direction of the dark portion is folded is provided at one position at the interface between the second region from below and the third region from below.

In the optically-anisotropic layer shown in FIG. 16, the thicknesses in the lowermost region and the uppermost region are the same, and the thicknesses in the second region from below and the third region from below are the same. Further, in the lowermost region and the uppermost region, the tilt directions are different, but the angles (the absolute values of the angles) between the surface of the optically-anisotropic layer and the dark portions 44 are the same. Likewise, in the second region from below and the third region from below, the tilt directions are different, but the angles between the surface of the optically-anisotropic layer and the dark portions 44 are the same.

That is, in the optically-anisotropic layer shown in FIG. 16, the bright portions 42 and the dark portions 44 in the cross-sectional SEM image are formed in a substantially C-shape. Accordingly, in the optically-anisotropic layer shown in FIG. 16, the shape of the dark portion 44 is symmetrical with respect to the center line in the thickness direction.

The angle of the dark portion 44 with respect to the surface of the optically-anisotropic layer can be adjusted depending on the length of the single period over which the optical axis rotates by 180° in the one in-plane direction and the size of the twist of the liquid crystal compound 40 that is twisted and aligned in the thickness direction described below.

Figure 17:
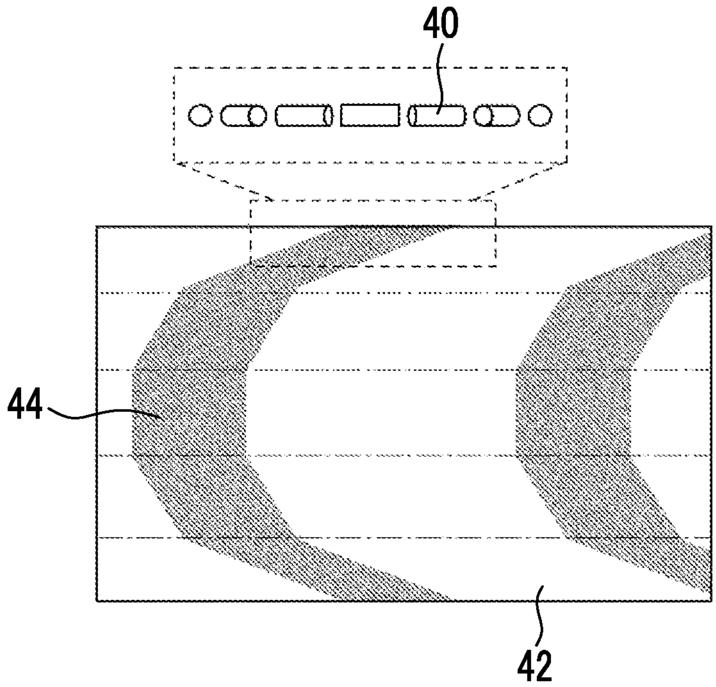
FIG. 17 is a diagram conceptually showing another example of the optically-anisotropic layer.

In another example of the center portion, as conceptually shown in FIG. 17, the optically-anisotropic layer has five regions corresponding to the inflection points of the dark portion 44 in the thickness direction.

In the example, in the lowermost region, the dark portion 44 is tilted to the upper left side in the drawing. In the second region from below, the dark portion 44 is tilted to the upper left in the drawing at a larger angle than the lowermost region with respect to the surface. In the third region from below, that is, the middle region in the thickness direction, the dark portion 44 extends in the thickness direction of the optically-anisotropic layer. In the fourth region from below, the dark portion 44 is tilted to the upper right side in the drawing. Further, in the uppermost region, the dark portion 44 is tilted to the upper right in the drawing at a smaller angle than the fourth region from below with respect to the surface.

That is, the optically-anisotropic layer shown in FIG. 17 has four inflection points of angle where the angle of the dark portion 44 changes.

In addition, the tilt directions of the dark portions 44 are opposite to each other in the lowermost region and the second region from below, and are opposite to each other in the fourth region from below and the uppermost region. Therefore, at the inflection point positioned at the interface between the second region from below and the fourth region from below, the tilt direction is folded in the opposite direction. That is, the optically-anisotropic layer shown in FIG. 16 has one inflection point where the tilt direction is folded in the opposite direction.

In the optically-anisotropic layer shown in FIG. 17, the thicknesses in the lowermost region and the uppermost region are the same, and the thicknesses in the second region from below and the second region from above are the same.

Further, in the lowermost region and the uppermost region of the optically-anisotropic layer, the tilt directions are different, but the angles between the surface of the optically-anisotropic layer and the dark portions 44 are the same. Likewise, in the second region from below and the fourth region from below, the tilt directions are different, but the angles between the surface of the optically-anisotropic layer and the dark portions 44 are the same. Further, in the third region from below that is positioned in the middle, the dark portion 44 extends in the thickness direction of the optically-anisotropic layer.

That is, in the optically-anisotropic layer shown in FIG. 17, the bright portions 42 and the dark portions 44 in the cross-sectional SEM image are formed in a substantially C-shape. Accordingly, in the optically-anisotropic layer shown in FIG. 4, the shape of the dark portion 44 is symmetrical with respect to the center line in the thickness direction.

Figure 18:
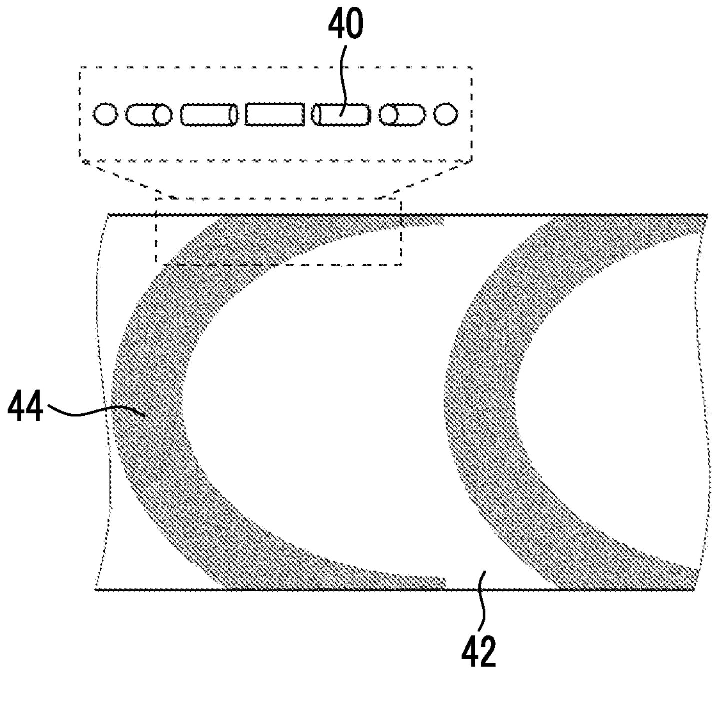
FIG. 18 is a diagram conceptually showing another example of the optically-anisotropic layer.

Further, in the optically-anisotropic layer of the liquid crystal diffraction element according to the embodiment of the present invention, as in FIG. 18 conceptually showing the configuration including the substantially C-shaped dark portion 44 shown in FIGS. 16 and 17, a configuration in which the dark portion 44 continuously changes can also be adopted by reducing the interval between the regions in the thickness direction, that is, the interval between the inflection points in the thickness direction.

As described above, in the example of FIGS. 16 to 18, the average tilt angle of the dark portion 44 in the outer side portion of the optically-anisotropic layer is a value that is not 0°.

Accordingly, in the optically-anisotropic layer, it can be said that shapes of the bright portions 42 and the dark portions 44 in a cross-section of a center portion of the concentric circular shape are symmetrical with respect to a center line of the optically-anisotropic layer in the thickness direction, and shapes of the bright portions 42 and the dark portions 44 in a cross-section of an end part of the concentric circular shape are asymmetrical with respect to the center line of the optically-anisotropic layer in the thickness direction.

In the examples shown in FIGS. 1 to 5 and FIGS. 16 to 18, shapes of the bright portions and the dark portions in a cross-section of a center portion of the concentric circular shape are symmetrical with respect to a center line of the optically-anisotropic layer in the thickness direction, and shapes of the bright portions and the dark portions in a cross-section of an end part of the concentric circular shape are asymmetrical with respect to the center line of the optically-anisotropic layer in the thickness direction. However, the present invention is not limited to this example, and shapes of the bright portions and the dark portions in a cross-section of a center portion of the concentric circular shape may be asymmetrical with respect to a center line of the optically-anisotropic layer in the thickness direction, and shapes of the bright portions and the dark portions in a cross-section of an end part of the concentric circular shape may be asymmetrical with respect to the center line of the optically-anisotropic layer in the thickness direction.

In all of the above-described optically-anisotropic layers, the rod-like liquid crystal compound is used as the liquid crystal compound. However, the present invention is not limited to this configuration, and a disk-like liquid crystal compound can also be used.

In the disk-like liquid crystal compound, the optical axis derived from the liquid crystal compound is defined as an axis perpendicular to a disk surface, that is so-called, a fast axis.

Figure 15:
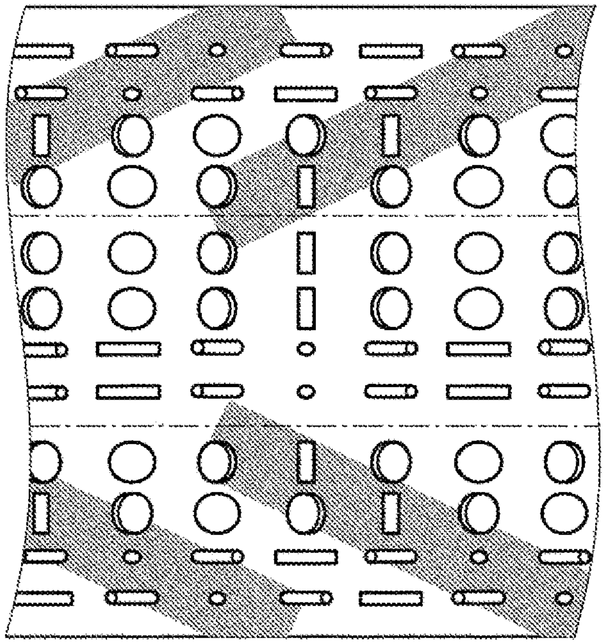
FIG. 15 is a diagram conceptually showing another example of the optically-anisotropic layer.

In addition, in the optically-anisotropic layer of the liquid crystal diffraction element according to the embodiment of the present invention, as conceptually shown in FIG. 15, the rod-like liquid crystal compound and the disk-like liquid crystal compound may be used in combination. By using the rod-like liquid crystal compound and the disk-like liquid crystal compound in combination, light components incident at different angles can be diffracted with high diffraction efficiency. The combination of the rod-like liquid crystal compound and the disk-like liquid crystal compound is not limited to the configuration conceptually shown in FIG. 15, and various configurations can be used. For example, in FIGS. 4, 6, 7, 16, 17, and 18, the rod-like liquid crystal compound and the disk-like liquid crystal compound may be used in combination instead of using the rod-like liquid crystal compound. In addition, for example, in FIG. 15, and the above-described combination, the rod-like liquid crystal compound and the disk-like liquid crystal compound may be laminated in a more segmented way in the thickness direction.

The liquid crystal diffraction elements 10*a* and 10*b* include only the optically-anisotropic layer but may include other layers. For example, the liquid crystal diffraction element may include a support and an alignment film during the formation of the optically-anisotropic layer. Hereinafter, each of the components will be described.

Figure 8:
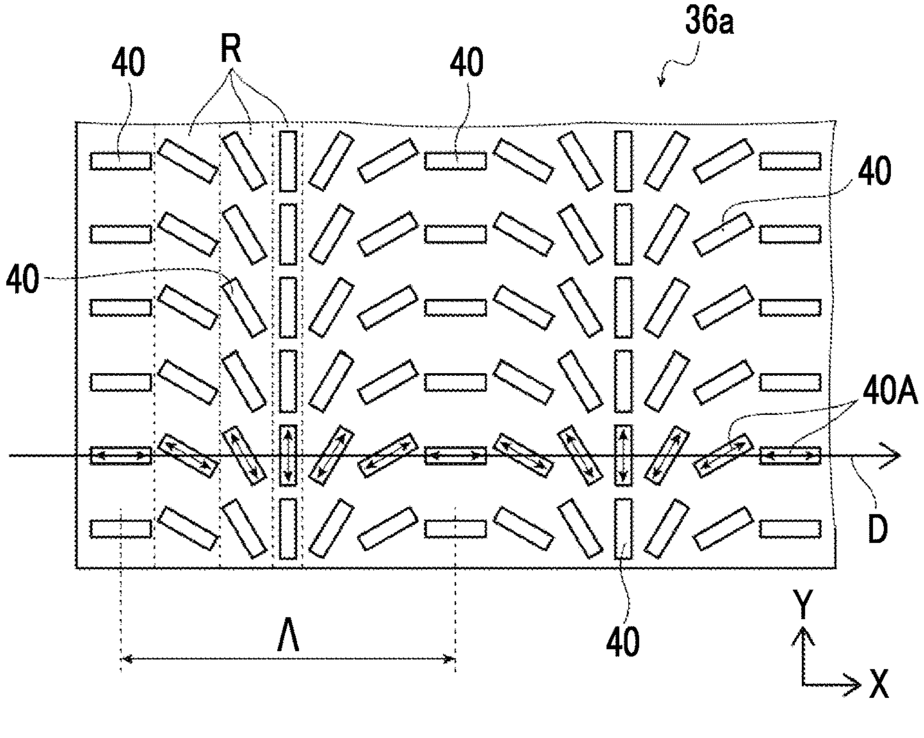
FIG. 8 is a partially enlarged view of a plan view of the optically-anisotropic layer.
Figure 9:
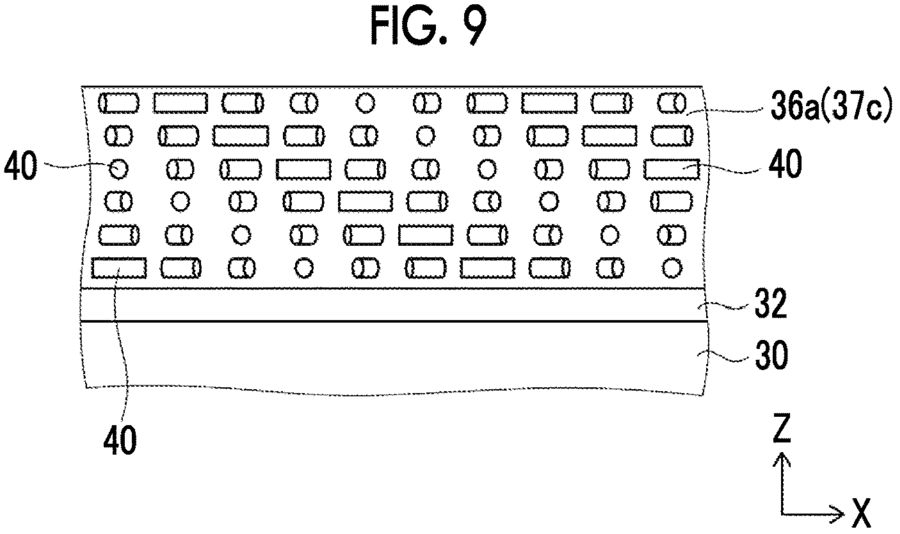
FIG. 9 is an enlarged cross-sectional view showing a partial region of the optically-anisotropic layer.

FIG. 9 is an enlarged conceptual diagram showing the fine region of the liquid crystal diffraction element including the optically-anisotropic layer 36*a* (region 37*c*). FIG. 8 is a front view showing the optically-anisotropic layer 36*a* shown in FIG. 9.

The liquid crystal diffraction element in the example shown in FIG. 9 includes a support 30, an alignment film 32, and the optically-anisotropic layer 36*a*.

<<Support>>

The support 30 supports the alignment film 32 and the optically-anisotropic layer 36*a*.

As the support 30, various sheet-shaped materials (films or plate-shaped materials) can be used as long as they can support the alignment film and the optically-anisotropic layer.

As the support 30, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride. The support is not limited to a flexible film and may be a non-flexible substrate such as a glass substrate.

In addition, the support 30 may have a multi-layer structure. Examples of the multi-layer support include a support including: one of the above-described supports having a single-layer structure that is provided as a substrate; and another layer that is provided on a surface of the substrate.

The thickness of the support 30 is not particularly limited and may be appropriately set depending on the use of the liquid crystal diffraction element, a material for forming the support 30, and the like in a range where the alignment film and the optically-anisotropic layer can be supported.

The thickness of the support 30 is preferably 1 to 1000 μm, more preferably 3 to 250 μm, and still more preferably 5 to 150 μm.

<<Alignment Film>>

The alignment film 32 is formed on the surface of the support 30.

The alignment film 32 is an alignment film for aligning the liquid crystal compound 40 to the predetermined liquid crystal alignment pattern during the formation of the optically-anisotropic layer 36*a*.

As described above, in the liquid crystal diffraction element according to the embodiment of the present invention, the optically-anisotropic layer has a liquid crystal alignment pattern in which a direction of an optical axis 40A (refer to FIG. 8) derived from the liquid crystal compound 40 changes while continuously rotating in one in-plane direction (arrow X direction described below). Accordingly, the alignment film is formed such that the optically-anisotropic layer can form the liquid crystal alignment pattern.

In addition, in the liquid crystal alignment pattern, a length over which the direction of the optical axis 40A rotates by 180° in the one in-plane direction in which the direction of the optical axis 40A changes while continuously rotating is set as a single period Λ (a rotation period of the optical axis).

In the following description, "the direction of the optical axis 40A rotates" will also be simply referred to as "the optical axis 40A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times. As the material used for the alignment film, for example, a material for forming polyimide, polyvinyl alcohol, a polymer having a polymerizable group described in JP1997-152509A (JP-H9-152509A), or an alignment film such as JP2005-97377A, JP2005-99228A, and JP2005-128503A is preferable.

In the liquid crystal diffraction element according to the embodiment of the present invention, for example, the alignment film can be suitably used as a so-called photo-alignment film obtained by irradiating a photo-alignment material with polarized light or non-polarized light. That is, in the liquid crystal diffraction element according to the embodiment of the present invention, a photo-alignment film that is formed by applying a photo-alignment material to the support 30 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the photo-alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking ester, a cinnamate compound, or a chalcone compound is suitably used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 30; drying the applied alignment film; and exposing the alignment film to laser light to form an alignment pattern can be used.

Figure 10:
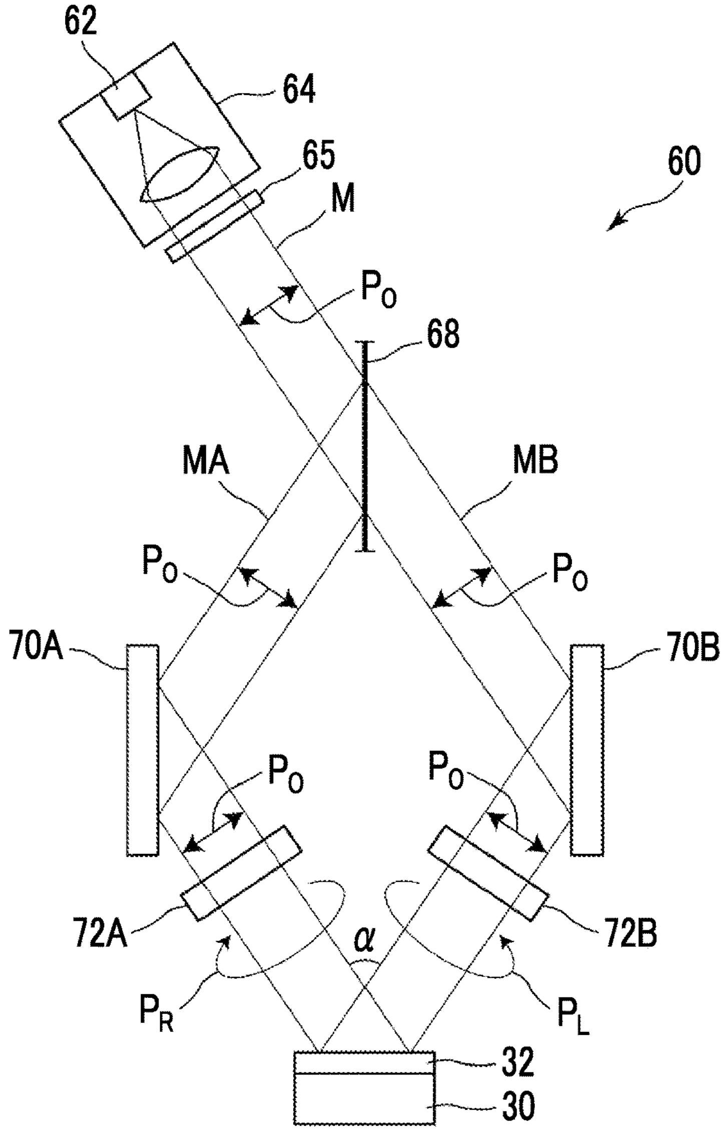
FIG. 10 is a diagram conceptually showing an example of an exposure device that exposes an alignment film.

FIG. 10 conceptually shows an example of an exposure device that exposes the alignment film to form an alignment pattern.

An exposure device 60 shown in FIG. 10 includes: a light source 64 including a laser 62; an λ/2 plate 65 that changes a polarization direction of laser light M emitted from the laser 62; a beam splitter 68 that splits the laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, in the alignment film 32, an alignment pattern in which the alignment state periodically changes can be obtained. That is, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length (single period Λ) of the single period over which the optical axis 40A rotates by 180° in the one in-plane direction in which the optical axis 40A rotates can be adjusted.

By forming the optically-anisotropic layer on the patterned alignment film having the alignment pattern in which the alignment state periodically changes, as described below, the optically-anisotropic layer 36*a* having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the optically-anisotropic layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the liquid crystal diffraction element according to the embodiment of the present invention, the alignment film is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the optically-anisotropic layer 36*a* or the like has the liquid crystal alignment pattern in which the direction of the optical axis 40A derived from the liquid crystal compound 40 changes while continuously rotating in at least one in-plane direction.

Figure 11:
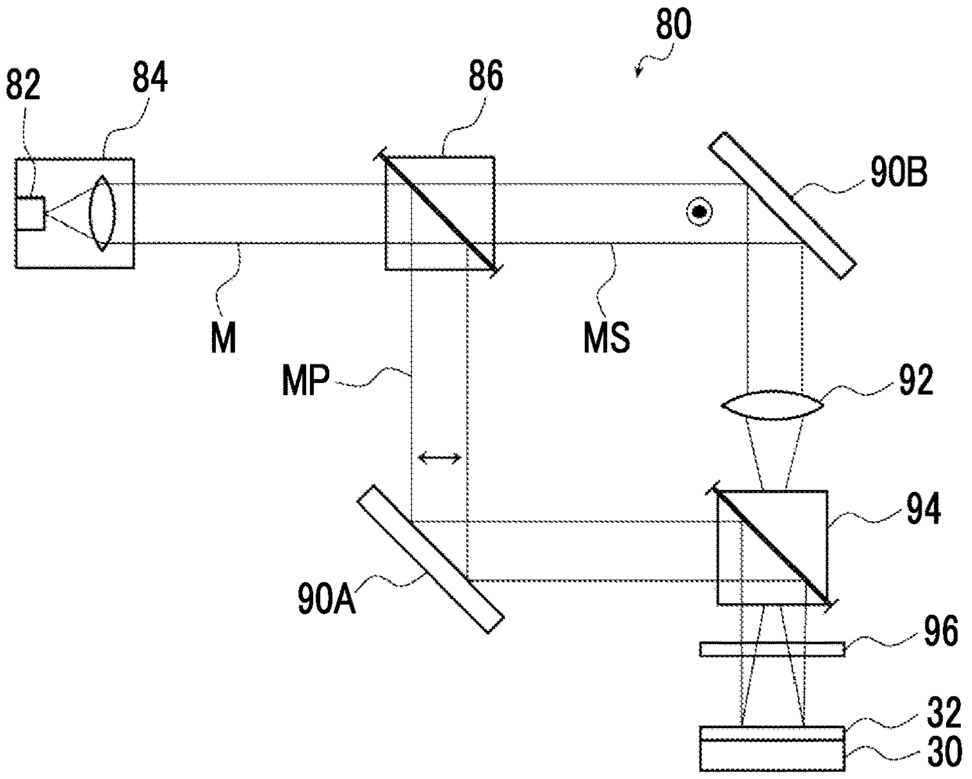
FIG. 11 is a diagram conceptually showing an example of an exposure device that exposes an alignment film forming the optically-anisotropic layer shown in FIG. 2.

The exposure device of the alignment film 32 is not limited to the example shown in FIG. 10. FIG. 11 shows another example of the exposure device that exposes the alignment film 32. The exposure device shown in FIG. 11 is used to form an alignment pattern having a concentric circular shape on the alignment film as shown in FIG. 2.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 32 on the support 30.

Here, due to interference between the right circularly polarized light and the left circularly polarized light, the polarization state of light with which the alignment film is irradiated periodically changes according to interference fringes. The intersecting angle between the right circularly polarized light and the left circularly polarized light changes from the inside to the outside of the concentric circle. Therefore, an exposure pattern in which the pitch changes from the inner side to the outer side can be obtained. As a result, in the alignment film, a concentric circular alignment pattern in which the alignment state periodically changes can be obtained.

In the exposure device 80, the single period Λ in the liquid crystal alignment pattern in which the optical axis of the liquid crystal compound 40 continuously rotates by 180° in the one in-plane direction can be controlled by changing the refractive power of the lens 92 (the F number of the lens 92), the focal length of the lens 92, the distance between the lens 92 and the alignment film 32, and the like.

In addition, by adjusting the refractive power of the lens 92 (the F number of the lens 92), the length Λ of the single period in the liquid crystal alignment pattern in the one in-plane direction in which the optical axis continuously rotates can be changed.

Specifically, In addition, the length Λ of the single period in the liquid crystal alignment pattern in the one in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inner side toward the outer side, and the F number increases. Conversely, in a case where the refractive power of the lens 92 becomes stronger, the length Λ of the single period in the liquid crystal alignment pattern rapidly decreases from the inner side toward the outer side, and the F number decreases.

Further, depending on the applications of the liquid crystal diffraction element such as a case where it is desired to provide a light amount distribution in transmitted light, a configuration in which regions having partially different lengths of the single periods Λ in the arrangement axis D direction are provided can also be used instead of the configuration in which the length of the single period Λ gradually changes in the arrangement axis D direction. For example, as a method of partially changing the single period Λ, for example, a method of scanning and exposing the photo-alignment film to be patterned while freely changing a polarization direction of laser light to be gathered can be used.

In addition, the wavelength of the laser light used for exposing the alignment film can be appropriately set depending on, for example, the kind of the alignment film to be used. For example, laser light having in a wavelength range of deep ultraviolet light to visible light to infrared light can be preferably used. For example, laser light having a wavelength of 266 nm, 325 nm, 355 nm, 370 nm, 385 nm, 405 nm, or 460 nm can be used, but the present invention is not limited to the above-described example. Laser light having various wavelengths can be used depending on the kind of the alignment film and the like.

After providing the optically-anisotropic layer on the alignment film, the optically-anisotropic layer may be peeled or transferred from the alignment film. The transfer can also be performed multiple times according to the bonding surface of the optically-anisotropic layer. The peeling or transfer method can be freely selected depending on the purposes. For example, by temporarily transferring the optically-anisotropic layer to a substrate including an adhesive layer, transferring the laminate to a thing as a transfer destination, and peeling off the substrate, the interface of the optically-anisotropic layer on the alignment film side can be caused to face the thing as the transfer destination. In addition, in order to cause a surface of the optically-anisotropic layer opposite to the alignment film to face the thing side as the transfer destination, after bonding the optically-anisotropic layer and the thing as the transfer destination through an adhesive, the optically-anisotropic layer may be peeled off from the alignment film.

In a case where the optically-anisotropic layer is peeled off from the alignment film, in order to reduce damage (for example, fracture or crack) to the optically-anisotropic layer and the alignment film, it is preferable to adjust a peeling angle, a speed, or the like.

In addition, the alignment film may be repeatedly used in a range where there is no problem in aligning properties.

Before providing the optically-anisotropic layer on the alignment film, the alignment film can be cleaned with an organic solvent or the like.

<<Optically-Anisotropic Layer>>

The optically-anisotropic layer 36*a* is formed on the surface of the alignment film 32.

In FIG. 8, in order to simplify the drawing and to clarify the configuration of the optically-anisotropic layer 36*a*, only the liquid crystal compound 40 (liquid crystal compound molecules) on the surface of the alignment film in the first optically-anisotropic layer 36*a* is shown. However, as conceptually shown in FIG. 9 showing the optically-anisotropic layer 36*a*, the optically-anisotropic layer 36*a* has a structure in which the aligned liquid crystal compounds 40 are laminated as in an optically-anisotropic layer that is formed using a composition including a typical liquid crystal compound.

As described above, in the liquid crystal diffraction element according to the embodiment of the present invention, the optically-anisotropic layer 36*a* is formed of the composition including the liquid crystal compound.

In a case where an in-plane retardation value is set as λ/2, the optically-anisotropic layer has a function of a general λ/2 plate, that is, a function of imparting a phase difference of a half wavelength, that is, 180° to two linearly polarized light components in light incident into the optically-anisotropic layer and are perpendicular to each other.

Here, since the liquid crystal compound rotates to be aligned in a plane direction, the optically-anisotropic layer diffracts (refracts) incident circularly polarized light to be transmitted in a direction in which the direction of the optical axis continuously rotates. At this time, the diffraction direction varies depending on the turning direction of incident circularly polarized light.

That is, the optically-anisotropic layer allows transmission of circularly polarized light and diffracts this transmitted light.

In addition, the optically-anisotropic layer changes a turning direction of the transmitted circularly polarized light into an opposite direction.

The optically-anisotropic layer has the liquid crystal alignment pattern in which the direction of the optical axis derived from the liquid crystal compound changes while continuously rotating in the one in-plane direction indicated by arrow D (hereinafter, also referred to as the arrangement axis D) in a plane of the optically-anisotropic layer. In the example shown in FIG. 8, it is assumed that the direction of the arrangement axis D is the X direction and a direction perpendicular to the direction of the arrangement axis D is the Y direction.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is parallel to a rod-like major axis direction.

In the following description, the optical axis 40A derived from the liquid crystal compound 40 will also be referred to as "the optical axis 40A of the liquid crystal compound 40" or "the optical axis 40A".

In the optically-anisotropic layer, the liquid crystal compound 40 is two-dimensionally aligned in a plane parallel to the arrow X direction and a Y direction perpendicular to the arrow X direction. In FIG. 1, FIGS. 3 and 4, and FIGS. 5 to 7, the Y direction is a direction perpendicular to the paper plane.

FIG. 8 conceptually shows a plan view of the optically-anisotropic layer 36*a*.

The plan view is a view in a case where the liquid crystal diffraction element is seen from the top in FIG. 9, that is, a view in a case where the liquid crystal diffraction element is seen from a thickness direction (laminating direction of the respective layers (films)). In other words, the plan view is a view in a case where the optically-anisotropic layer 36*a* is seen from a direction perpendicular to the main surface.

In addition, in FIG. 8, in order to clarify the configuration of the liquid crystal diffraction element according to the embodiment of the present invention, only the liquid crystal compound 40 on the surface of the alignment film 32 is shown. However, as described above, in the thickness direction, as shown in FIG. 9, the optically-anisotropic layer 36*a* has the structure in which the liquid crystal compound 40 on the surface of the alignment film 32 is laminated.

In FIG. 8, a part in a plane of the optically-anisotropic layer 36*a* will be described as a representative example. However, basically, the optically-anisotropic layer also has the same configuration and the same effects as those of the optically-anisotropic layer 36*a*, except that the lengths (single periods Λ) of the single periods of the liquid crystal alignment patterns at in-plane positions of the optically-anisotropic layer are different from each other.

The optically-anisotropic layer 36*a* has the liquid crystal alignment pattern in which the direction of the optical axis 40A derived from the liquid crystal compound 40 changes while continuously rotating in the arrangement axis D direction in a plane of the optically-anisotropic layer 36*a*.

Specifically, "the direction of the optical axis 40A of the liquid crystal compound 40 changes while continuously rotating in the arrangement axis D direction (the predetermined one in-plane direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the liquid crystal compounds 40 adjacent to each other in the arrangement axis D direction is preferably 45° or less, more preferably 15° or less, and still more preferably less than 15°.

On the other hand, regarding the liquid crystal compound 40 forming the optically-anisotropic layer 36*a*, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the optically-anisotropic layer 36*a*, in the liquid crystal compounds 40 arranged in the Y direction, angles between the directions of the optical axes 40A and the arrangement axis D direction are the same.

In the liquid crystal diffraction element according to the embodiment of the present invention, in the liquid crystal alignment pattern of the liquid crystal compound 40, the length (distance) over which the direction of the optical axis 40A of the liquid crystal compound 40 rotates by 180° in the arrangement axis D direction in which the optical axis 40A changes while continuously rotating in a plane is the length Λ of the single period in the liquid crystal alignment pattern. In other words, the length of the single period in the liquid crystal alignment pattern is defined as the distance between θ and θ+180° that is a range of the angle between the optical axis 40A of the liquid crystal compound 40 and the arrangement axis D direction.

That is, a distance between centers of two liquid crystal compounds 40 in the arrangement axis D direction is the length Λ of the single period, the two liquid crystal compounds having the same angle in the arrangement axis D direction. Specifically, as shown in FIG. 8, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal diffraction element according to the embodiment of the present invention, in the liquid crystal alignment pattern of the optically-anisotropic layer, the single period Λ is repeated in the arrangement axis D direction, that is, in the one in-plane direction in which the direction of the optical axis 40A changes while continuously rotating.

As described above, in the liquid crystal compounds arranged in the Y direction in the optically-anisotropic layer, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound.

In a case where circularly polarized light is incident into the above-described optically-anisotropic layer 36*a*, the light is refracted such that the direction of the circularly polarized light is converted.

Figure 12:
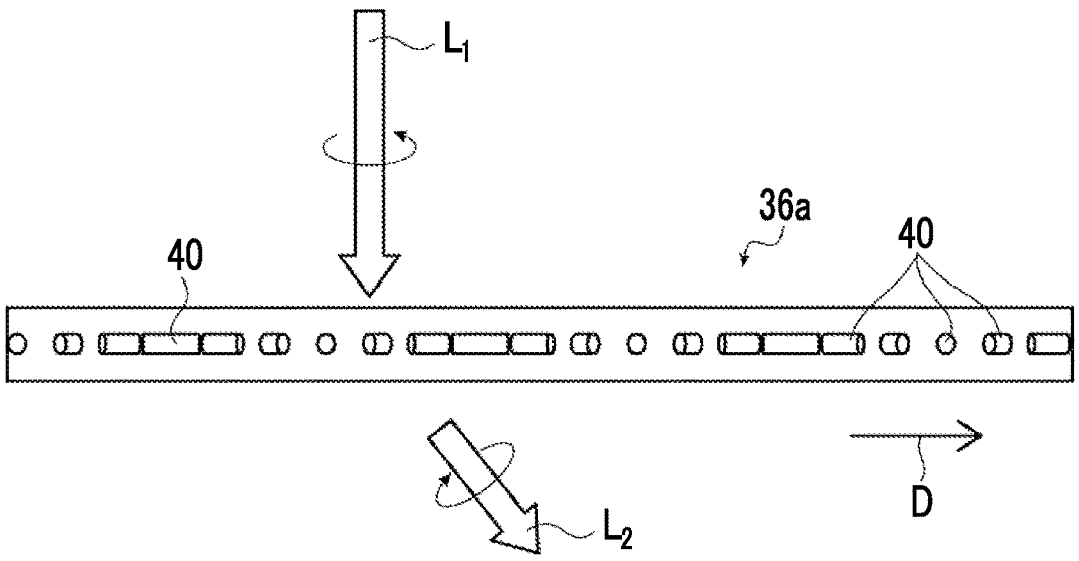
FIG. 12 is a conceptual diagram showing an action of the optically-anisotropic layer.
Figure 13:
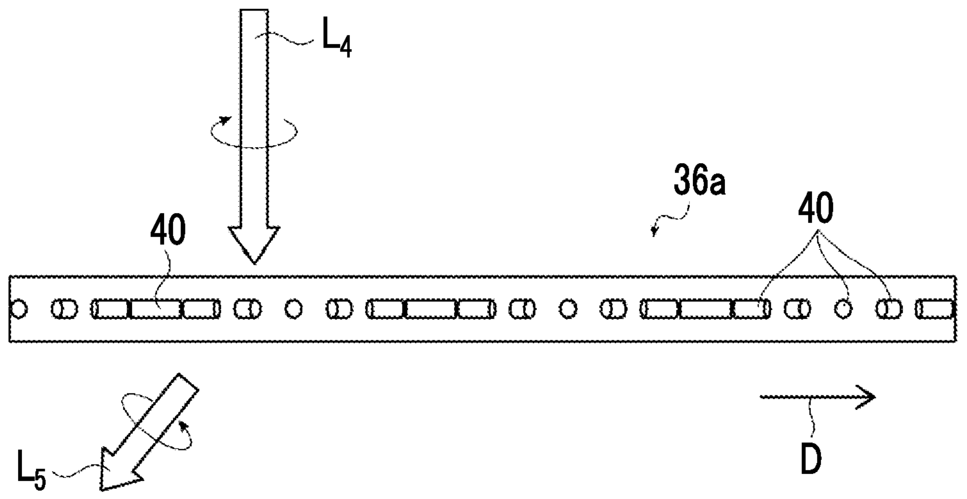
FIG. 13 is a conceptual diagram showing the action of the optically-anisotropic layer.

This action is conceptually shown in FIG. 12 using the optically-anisotropic layer 36*a*. In FIG. 12 and FIG. 13, in order to simplify the drawing and to clarify the configuration of the liquid crystal diffraction element, only the liquid crystal compound 40 (liquid crystal compound molecules) on the surface of the alignment film in the optically-anisotropic layer 36*a* is shown.

In addition, in the optically-anisotropic layer 36*a*, the value of the product of the difference in refractive index of the liquid crystal compound and the thickness of the optically-anisotropic layer is λ/2.

As shown in FIG. 12, in a case where the value of the product of the difference in refractive index of the liquid crystal compound and the thickness of the optically-anisotropic layer in the optically-anisotropic layer 36*a* is λ/2 and incidence light $L_1$ as left circularly polarized light is incident into the optically-anisotropic layer 36*a*, the incidence light $L_1$ transmits through the optically-anisotropic layer 36*a* to be imparted with a retardation of 180°, and the transmitted light $L_2$ is converted into right circularly polarized light.

In addition, the liquid crystal alignment pattern formed in the optically-anisotropic layer 36*a* is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 13, in a case where the value of the product of the difference in refractive index of the liquid crystal compound and the thickness of the optically-anisotropic layer in the optically-anisotropic layer 36*a* is λ/2 and incidence light $L_4$ as right circularly polarized light is incident into the optically-anisotropic layer 36*a*, the incidence light $L_4$ transmits through the optically-anisotropic layer 36*a* to be imparted with a retardation of 180° and is converted into transmitted light $L_5$ of left circularly polarized light.

In addition, the liquid crystal alignment pattern formed in the optically-anisotropic layer 36*a* is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

By changing the single period Λ of the liquid crystal alignment pattern formed in the optically-anisotropic layer 36*a*, refraction angles of the transmitted light components $L_2$ and $L_5$ can be adjusted. Specifically, even in the optically-anisotropic layer 36*a*, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 12 and 13, the rotation direction of the optical axis 40A toward the arrangement axis D direction is clockwise. By setting this rotation direction to be counterclockwise, the refraction direction of transmitted light can be reversed.

Further, as described above, the optically-anisotropic layer 36*a* has regions in which the optical axis is twisted in a thickness direction of the optically-anisotropic layer and rotates, the regions having different twisted angles in the thickness direction and/or twisted directions.

In the optically-anisotropic layer 36*a*, it is preferable that the in-plane retardation value of the plurality of regions R is a half wavelength. It is preferable that an in-plane retardation $Re(550)=\Delta n_{550}\times d$ of the plurality of regions R of the optically-anisotropic layer 36*a* with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer 36*a*.

$$200\ \text{nm} \leq \Delta n_{550} \times d \leq 350\ \text{nm}. \qquad (1)$$

That is, in a case where the in-plane retardation $Re(550)=\Delta n_{550}\times d$ of the plurality of regions R of the optically-anisotropic layer 36*a* satisfies Expression (1), a sufficient amount of a circularly polarized light component in light incident into the optically-anisotropic layer 36*a* can be converted into circularly polarized light that travels in a direction tilted in a forward direction or reverse direction with respect to the arrangement axis D direction. It is more preferable that the in-plane retardation $Re(550)=\Delta n_{550}\times d$ satisfies 225 nm$\leq\Delta n_{550}\times d\leq$340 nm, and it is still more preferable that the in-plane retardation $Re(550)=\Delta n_{550}\times d$ satisfies 250 nm$\leq\Delta n_{550}\times d\leq$330 nm.

Expression (1) is a range with respect to incidence light having a wavelength of 550 nm. However, an in-plane retardation $Re(\lambda)=\Delta n_{\lambda}\times d$ of the plurality of regions R of the optically-anisotropic layer with respect to incidence light having a wavelength of λ nm is preferably in a range defined by the following Expression (1-2) and can be appropriately set.

$$0.7 \times (\lambda/2)\ \text{nm} \leq \Delta n_{\lambda} \times d \leq 1.3 \times (\lambda/2)\ \text{nm} \qquad (1-2)$$

In addition, the value of the in-plane retardation of the plurality of regions R of the optically-anisotropic layer 36*a* in a range outside the range of Expression (1) can also be used. Specifically, by satisfying $\Delta n_{550}\times d<200$ nm or 350 nm$<\Delta n_{550}\times d$, the light can be classified into light that travels in the same direction as a traveling direction of the incidence light and light that travels in a direction different from a traveling direction of the incidence light. In a case where $\Delta n_{550}\times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450)=\Delta n_{450}\times d$ of each of the plurality of regions R of the optically-anisotropic layer 36*a* with respect to incidence light having a wavelength of 450 nm and an in-plane retardation $Re(550)=\Delta n_{550}\times d$ of each of the plurality of regions R of the optically-anisotropic layer 36*a* with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \qquad (2)$$

Expression (2) represents that the liquid crystal compound 40 in the optically-anisotropic layer 36*a* has reverse dispersibility. That is, by satisfying Expression (2), the optically-anisotropic layer 36*a* can correspond to incidence light having a wide range of wavelength.

The optically-anisotropic layer is formed of a cured layer of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

The optically-anisotropic layer is formed by forming the alignment film having the above-described alignment pattern on the support and applying the liquid crystal composition to the alignment film, and curing the applied liquid crystal composition. The structure of the optically-anisotropic layer where the optical axis of the liquid crystal compound is twisted in the thickness direction of the optically-anisotropic layer and rotates can be formed by adding the above-described chiral agent to the liquid crystal composition. In addition, the configuration where the twisted angle of the thickness direction varies depending on in-plane regions can be formed by adding a photoreactive chiral agent to the liquid crystal composition, applying the liquid crystal composition to the alignment film, and irradiating the regions with light at different irradiation doses such that the helical twisting power (HTP) of the photoreactive chiral agent varies depending on the regions.

Specifically, the configuration of the optically-anisotropic layer where the twisted angle of the thickness direction varies depending on in-plane regions can be formed by using the chiral agent in which back isomerization, dimerization, isomerization, dimerization or the like occurs due to light irradiation such that the helical twisting power (HTP) changes and irradiating the liquid crystal composition for forming the optically-anisotropic layer with light having a wavelength at which the HTP of the chiral agent changes before or during the curing of the liquid crystal composition while changing the irradiation dose depending on the regions.

For example, by using a chiral agent in which the HTP decreases during light irradiation, the HTP of the chiral agent decreases during light irradiation. Here, by changing the irradiation dose of light for each of the regions, for example, in a region that is irradiated with the light at a high irradiation dose, the decrease in HTP is large, the induction of helix is small, and thus the twisted angle of the twisted structure decreases. On the other hand, in a region that is irradiated with the light at a low irradiation dose, a decrease in HTP is small, and thus the twisted angle of the twisted structure is large.

The method of changing the irradiation dose of light for each of the regions is not particularly limited, and a method of irradiating light through a gradation mask, a method of changing the irradiation time for each of the regions, or a method of changing the irradiation intensity for each of the regions can be used.

The gradation mask refers to a mask in which a transmittance with respect to light for irradiation changes in a plane.

Further in order to allow the optically-anisotropic layer to adopt the configuration where the dark portion has two or more inflection points, the optically-anisotropic layer has regions where tilt directions of the dark portions are different from each other in the thickness direction, and the average tilt angle of the dark portion gradually changes in the direction in which the single period of the liquid crystal alignment pattern changes depending on this change direction, optically-anisotropic layers having different configurations depending on the regions in the thickness direction may be formed.

For example, in a case where the optically-anisotropic layer 36*a* shown in FIG. 1 is formed, first, a liquid crystal composition including a photoreactive chiral agent that induces right-twisting in the thickness direction is applied to the patterned alignment film that is formed on the support, the regions are irradiated with light at different irradiation doses such that the helical twisting power (HTP) of the photoreactive chiral agent varies depending on the regions, and the liquid crystal composition is cured to form the region 37*c*. Next, the liquid crystal composition including the photoreactive chiral agent is applied to the formed region 37*c*, the regions are irradiated with light at different irradiation doses such that the HTP of the photoreactive chiral agent varies depending on the regions, and the liquid crystal composition is cured to form the region 37*b*. In this case, in order to allow the region 37*b* to have a structure different from that of the region 37*c*, the kind, content, or the like of each of the components in the liquid crystal composition may be different from that of the region 37*c*, or the irradiation dose or the like of light for changing the HTP of the photoreactive chiral agent may be different from that of the region 37*c*. In addition, in a case where the liquid crystal composition is applied to the region 37*c*, the liquid crystal compounds 40 in the liquid crystal composition are arranged according to the arrangement of the liquid crystal compounds 40 present in the surface of the region 37*c*. Therefore, even in the region 37*b*, the liquid crystal alignment pattern where the single period Λ gradually changes in the arrangement axis D direction is formed.

Further, the liquid crystal composition including the photoreactive chiral agent is applied to the formed region 37*b*, the regions are irradiated with light at different irradiation doses such that the HTP of the photoreactive chiral agent varies depending on the regions, and the liquid crystal composition is cured to form the region 37*a*. In this case, the region 37*a* is formed of a liquid crystal composition including a photoreactive chiral agent that induces left-twisting in the thickness direction. In addition, in a case where the liquid crystal composition is applied to the region 37*b*, the liquid crystal compounds 40 in the liquid crystal composition are arranged according to the arrangement of the liquid crystal compounds 40 present in the surface of the region 37*b*. Therefore, even in the region 37*a*, the liquid crystal alignment pattern where the single period Λ gradually changes in the arrangement axis D direction is formed.

By forming the region 37*a*, the region 37*b*, and the region 37*c* where the twisted states of the liquid crystal compounds 40 the thickness direction are different from each other as described above, the optically-anisotropic layer having the configuration where each of the dark portions 44 has two or more inflection points of angle, the optically-anisotropic layer has regions where tilt directions of the dark portions 44 are different from each other in the thickness direction, and the average tilt angle of the dark portion 44 gradually changes in the one in-plane direction can be formed.

In addition, in the example shown in FIG. 3, in the optically-anisotropic layer according to the embodiment of the present invention, the optical axis derived from the liquid crystal compound is not tilted with respect to the interface of the optically-anisotropic layer. In the optically-anisotropic layer according to the embodiment of the present invention, the optical axis derived from the liquid crystal compound may be tilted. For example, as described in WO2019/189586A, the optical axis derived from the liquid crystal compound may have a pretilt angle with respect to the interface of the optically-anisotropic layer. In addition, as described in WO2020/122127A, the tilt angle of the optical axis derived from the liquid crystal compound may change from one interface to another interface of the optically-anisotropic layer in the thickness direction. By tilting the optical axis derived from the liquid crystal compound with respect to the interface of the optically-anisotropic layer, the retardation of the optically-anisotropic layer can be appropriately adjusted to obtain a high diffraction efficiency.

In addition, in the optically-anisotropic layer according to the embodiment of the present invention, the film thickness of the optically-anisotropic layer may change in a plane. The film thickness of the optically-anisotropic layer in a plane can be appropriately adjusted such that a high diffraction efficiency can be obtained with respect to light components incident from different incidence positions.

In addition, as shown in the examples of FIGS. 3 and 4, in each of the region 37*a*, the region 37*b*, and the region 37*c* of the optically-anisotropic layer, the thicknesses of the center portion and the outer side portion may be the same as or different from each other. The present invention is not limited to the above-described example, and in the liquid crystal diffraction element according to the embodiment of the present invention, the thickness of each of the regions of the optically-anisotropic layer may be the same or change. The thickness of each of the regions of the optically-anisotropic layer may be appropriately set depending on the desired performance.

Although the optically-anisotropic layer functions as a so-called λ/2 plate, the present invention also includes an aspect where a laminate including the support and the alignment film that are integrated functions as a so-called λ/2 plate.

In addition, the liquid crystal composition for forming the optically-anisotropic layer includes a rod-like liquid crystal compound or a disk-like liquid crystal compound and may further include other components such as a leveling agent, an alignment control agent, a polymerization initiator, or an alignment assistant.

—Rod-Like Liquid Crystal Compound—

As the rod-like liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-like liquid crystal compound, not only the above-described low molecular weight liquid crystal molecules but also high molecular weight liquid crystal molecules can be used.

It is preferable that the alignment of the rod-like liquid crystal compound is immobilized by polymerization. Examples of the polymerizable rod-like liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-64627. Further, as the rod-like liquid crystal compound, for example, compounds described in JP1999-513019A (JP-H11-513019A) and JP2007-279688A can also be preferably used.

—Disk-Like Liquid Crystal Compound—

As the disk-like liquid crystal compound, for example, compounds described in JP2007-108732A and JP2010-244038A can be preferably used.

In a case where the disk-like liquid crystal compound is used in the optically-anisotropic layer, the liquid crystal compound 40 rises in the thickness direction in the optically-anisotropic layer, and the optical axis 40A derived from the liquid crystal compound is defined as an axis perpendicular to a disk surface, that is so-called, a fast axis.

In order to obtain a high diffraction efficiency, it is preferable that a liquid crystal compound having high refractive index anisotropy Δn is used as the liquid crystal compound. By increasing the refractive index anisotropy, a high diffraction efficiency can be maintained in a case where the incidence angle changes. The liquid crystal compound having high refractive index anisotropy Δn is not particularly limited. For example, a compound described in WO2019/182129A or a compound represented by Formula (I) can be preferably used.

(I)

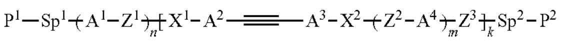

In Formula (I), $P^1$ and $P^2$ each independently represent a hydrogen atom, —CN, —NCS, or a polymerizable group.

$Sp^1$ and $Sp^2$ each independently represent a single bond or a divalent linking group. Here, $Sp^1$ and $Sp^2$ do not represent a divalent linking group including at least one group selected from the group consisting of an aromatic hydrocarbon ring group, an aromatic heterocyclic group, and an aliphatic hydrocarbon ring group.

$Z^1$, $Z^2$, and $Z^3$ each independently represents a single bond, —O—, —S—, —CHR—, —CHRCHR—, —OCHR—, —CHRO—, —SO—, —$SO_2$—, —COO—, —OCO—, —CO—S—, —S—CO—, —O—CO—O—, —CO—NR—, —NR—CO—, —SCHR—, —CHRS—, —SO—CHR—, —CHR—SO—, —$SO_2$—CHR—, —CHR—$SO_2$—, —$CF_2$O—, —O$CF_2$—, —$CF_2$S—, —S$CF_2$—, —OCHRCHRO—, —SCHRCHRS—, —SO—CHRCHR—SO—, —$SO_2$—CHRCHR—$SO_2$—, —CH═CH—COO—, —CH═CH—OCO—, —COO—CH═CH—, —OCO—CH═CH—, —COO—CHRCHR—, —OCO—CHRCHR—, —CHRCHR—COO—, —CHRCHR—OCO—, —COO—CHR—, —OCO—CHR—, —CHR—COO—, —CHR—OCO—, —CR═CR—, —CR═N—, —N═CR—, —N═N—, —CR═N—N═CR—, —CF═CF—, or —C≡C—. R represents a hydrogen atom or an alkyl group having 1 to 10 carbon atoms. In a case where a plurality of R's are present, R's may be the same as or different from each other. In a case where a plurality of $Z^1$'s and a plurality of $Z^2$'s are present, $Z^1$'s and $Z^2$'s may be the same as or different from each other. In a case where a plurality of $Z^3$'s are present, $Z^3$'s may be the same as or different from each other. Here, $Z^3$ connected to $SP^2$ represents a single bond.

$X^1$ and $X^2$ each independently represents a single bond or —S—. In a case where a plurality of $X^1$'s and a plurality of $X^2$'s are present, $X^1$'s and $X^2$'s may be the same as or different from each other. Here, among the plurality of $X^1$'s and a plurality of $X^2$'s, at least one represents —S—.

k represents an integer of 2 to 4.

m and n each independently represent an integer of 0 to 3. In a case where a plurality of m's are present, m's may be the same as or different from each other.

$A^1$, $A^2$, $A^3$, and $A^4$ each independently represent a group represented by any one of Formulas (B-1) to (B-7) or a group where two or three groups among the groups represented by Formulas (B-1) to (B-7) are linked. In a case where a plurality of $A_2$'s and a plurality of $A_3$'s are present, $A^2$'s and $A^3$'s may be the same as or different from each other. In a case where a plurality of $A^1$'s and a plurality of $A^4$'s are present, $A^1$'s and $A^4$'s may be the same as or different from each other.

(B-1)

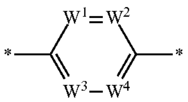

(B-2)

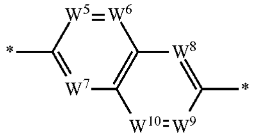

(B-3)

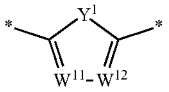

(B-4)

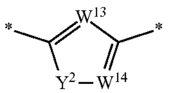

(B-5)

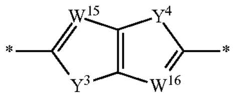

(B-6)

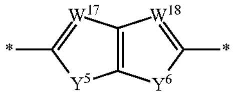

(B-7)

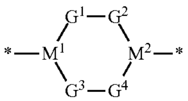

In Formulas (B-1) to (B-7), $W^1$ to $W^{18}$ each independently represent $CR^1$ or N, and $R^1$ represents a hydrogen atom or the following substituent L.

$Y^1$ to $Y^6$ each independently represent $NR^2$, O, or S, and $R^2$ represents a hydrogen atom or the following substituent L.

$G^1$ to $G^4$ each independently represent $CR^3R^4$, $NR^5$, O, or S, and $R^3$ to $R^5$ each independently represent a hydrogen atom or the following substituent L.

$M^1$ and $M^2$ each independently represent $CR^6$ or N, and $R^6$ represents a hydrogen atom or the following substituent L.

* represents a bonding position.

The substituent L represents an alkyl group having 1 to 10 carbon atoms, an alkoxy group having 1 to 10 carbon atoms, an alkylamino group having 1 to 10 carbon atoms, an alkylthio group having 1 to 10 carbon atoms, an alkanoyl group having 1 to 10 carbon atoms, an alkanoyloxy group having 1 to 10 carbon atoms, an alkanoylamino group having 1 to 10 carbon atoms, an alkanoylthio group having 1 to 10 carbon atoms, an alkyloxycarbonyl group having 2 to 10 carbon atoms, an alkylaminocarbonyl group having 2 to 10 carbon atoms, an alkylthiocarbonyl group having 2 to 10 carbon atoms, a hydroxy group, an amino group, a mercapto group, a carboxy group, a sulfo group, an amide group, a cyano group, a nitro group, a halogen atom, or a polymerizable group. Here, in a case where the group described as the substituent L has $—CH_2—$, a group in which at least one $—CH_2—$ in the group is substituted with —O—, —CO—, —CH═CH—, or —C≡C— is also included in the substituent L. Here, in a case where the group described as the substituent L has a hydrogen atom, a group in which at least one hydrogen atom—in the group is substituted with at least one selected from the group consisting of a fluorine atom and a polymerizable group is also included in the substituent L.

In order to maintain a high diffraction efficiency in a case where the incidence angle changes, the refractive index anisotropy $\Delta n_{550}$ of the liquid crystal compound is preferably 0.15 or more, more preferably 0.2 or more, still more preferably 0.25 or more, and most preferably 0.3 or more.

In addition, in the liquid crystal diffraction element according to the embodiment of the present invention, the refractive index anisotropy Δn or the average refractive index of the optically-anisotropic layer may change in a plane. By changing the refractive index anisotropy Δn or the average refractive index of the optically-anisotropic layer in a plane, the diffraction efficiency can be appropriately adjusted with respect to light components incident from different incidence positions.

—Photoreactive Chiral Agent—

The photoreactive chiral agent is formed of, for example, a compound represented by the following Formula (I) and has properties capable of controlling an aligned structure of the liquid crystal compound and changing a helical pitch of the liquid crystal compound, that is, a helical twisting power (HTP) of a helical structure during light irradiation. That is, the photoreactive chiral agent is a compound that causes a helical twisting power of a helical structure derived from a liquid crystal compound, preferably, a nematic liquid crystal compound to change during light irradiation (ultraviolet light to visible light to infrared light), and includes a portion including a chiral portion and a portion in which a structural change occurs during light irradiation as necessary portions (molecular structural units). However, the photoreactive chiral agent represented by the following Formula (I) can significantly change the HTP of liquid crystal molecules.

The above-described HTP represents the helical twisting power of a helical structure of liquid crystal, that is, HTP=1/(Pitch×Chiral Agent Concentration [Mass Fraction]). For example, the HTP can be obtained by measuring a helical pitch (single period of the helical structure; μm) of a liquid crystal molecule at a given temperature and converting the measured value into a value [$\mu m^{-1}$] in terms of the concentration of the chiral agent. In a case where a selective reflection color is formed by the photoreactive chiral agent depending on the illuminance of light, a change ratio in HTP (HTP before irradiation/HTP after irradiation) is preferably 1.5 or higher and more preferably 2.5 or higher in a case where the HTP decreases after irradiation, and is preferably 0.7 or lower and more preferably 0.4 or lower in a case where the HTP increases after irradiation.

Next, the compound represented by Formula (I) will be described.

Formula (I)

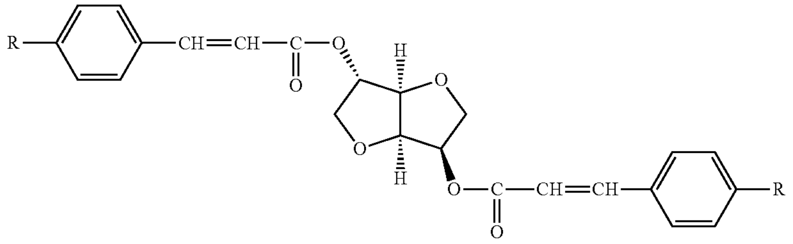

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, and a dodecyloxy group. In particular, an alkoxy group having 1 to 12 carbon atoms is preferable, and an alkoxy group having 1 to 8 carbon atoms is more preferable.

Examples of the acryloyloxyalkyloxy group having 3 to 15 carbon atoms in total include an acryloyloxyethyloxy group, an acryloyloxybutyloxy group, and an acryloyloxydecyloxy group. In particular, an acryloyloxyalkyloxy group having 5 to 13 carbon atoms is preferable, and an acryloyloxyalkyloxy group having 5 to 11 carbon atoms is more preferable.

Examples of the methacryloyloxyalkyloxy group having 4 to 15 carbon atoms in total include a methacryloyloxyethyloxy group, a methacryloyloxybutyloxy group, and a methacryloyloxydecyloxy group. In particular, a methacryloyloxyalkyloxy group having 6 to 14 carbon atoms is preferable, and a methacryloyloxyalkyloxy group having 6 to 12 carbon atoms is more preferable.

The molecular weight of the photoreactive chiral agent represented by Formula (I) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (1) to (15)) of the compound represented by Formula (I) will be shown, but the present invention is not limited thereto.

(1)
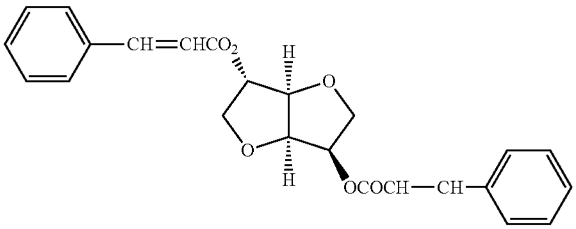
Right-Twisted
Mw = 406.43
(2)
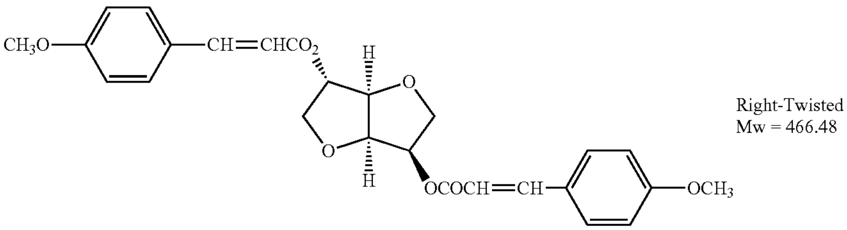
Right-Twisted
Mw = 466.48
(3)
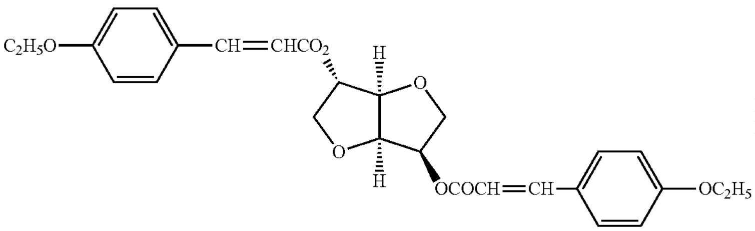
Right-Twisted
Mw = 494.53
(4)
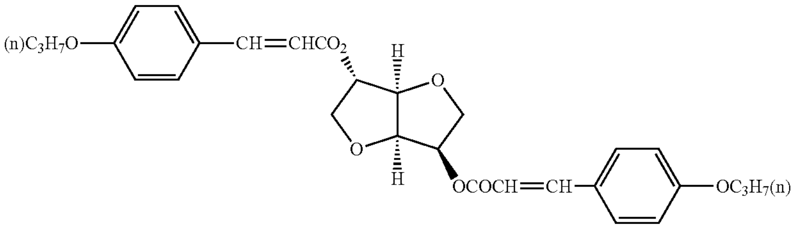
Right-Twisted
Mw = 522.59
(5)
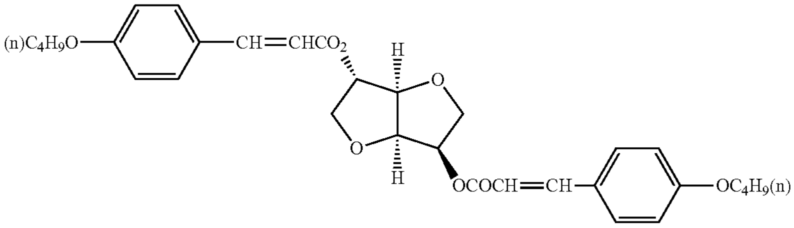
Right-Twisted
Mw = 550.64
(6)
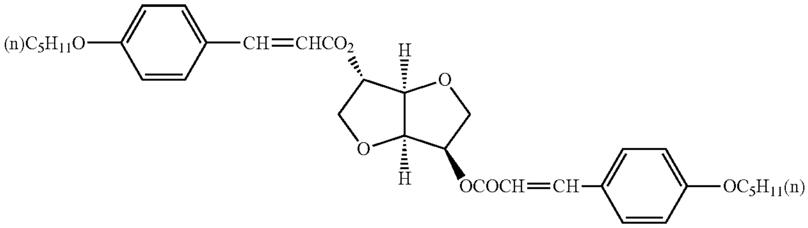
Right-Twisted
Mw = 578.69

-continued
(7)
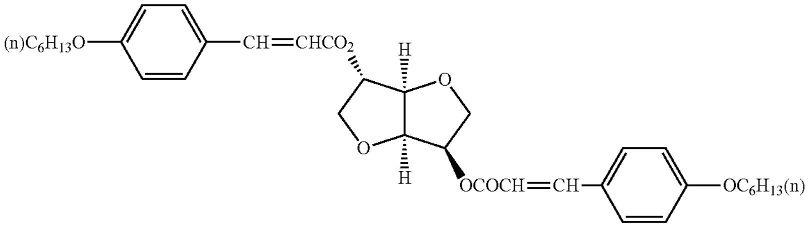
Right-Twisted
Mw = 606.75
(8)
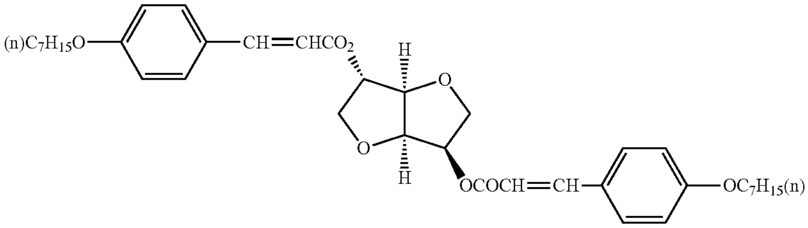
Right-Twisted
Mw = 634.80
(9)
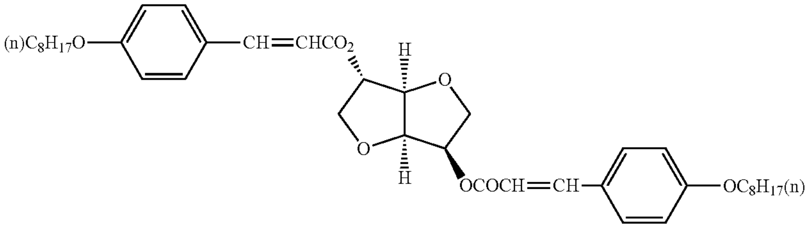
Right-Twisted
Mw = 662.85
(10)
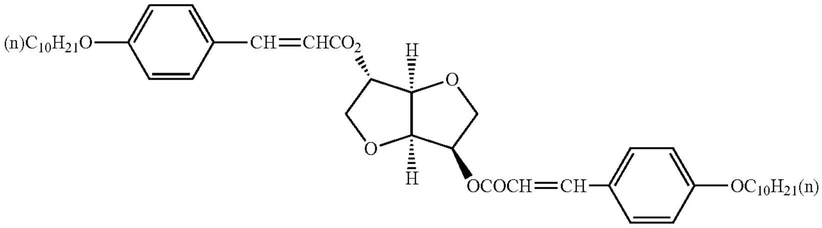
Right-Twisted
Mw = 718.96
(11)
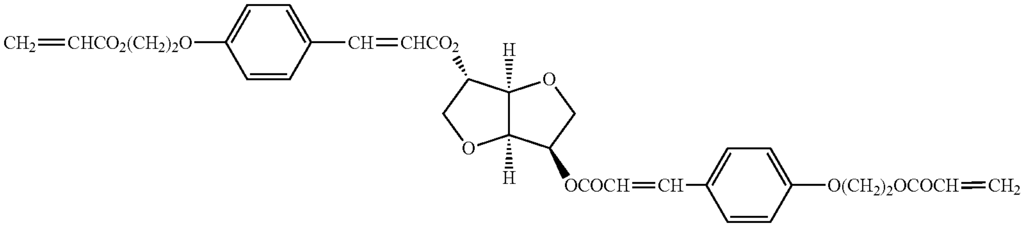
(12)
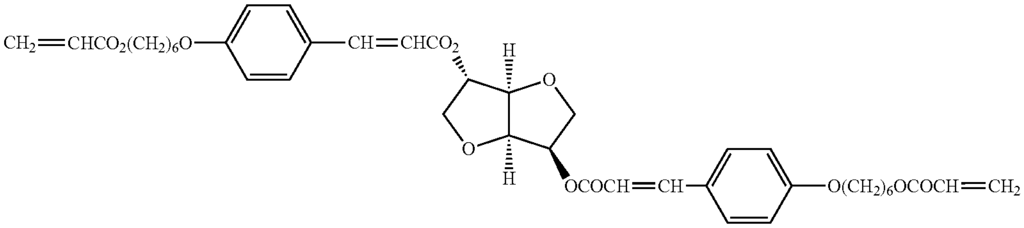

-continued (13)

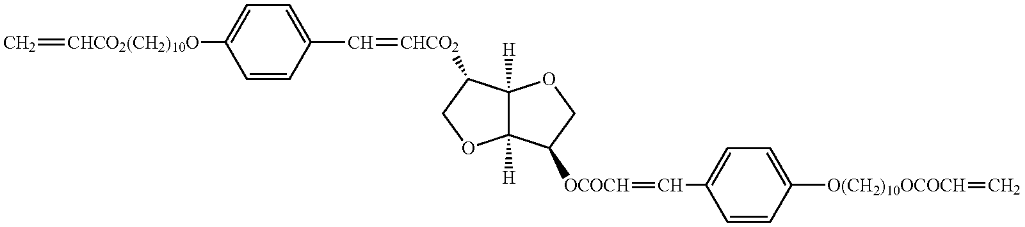

(14)

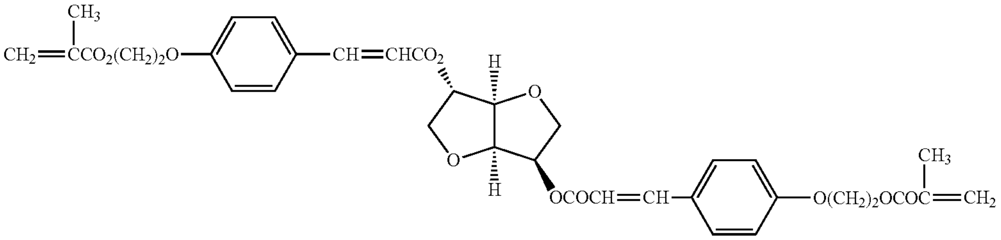

(15)

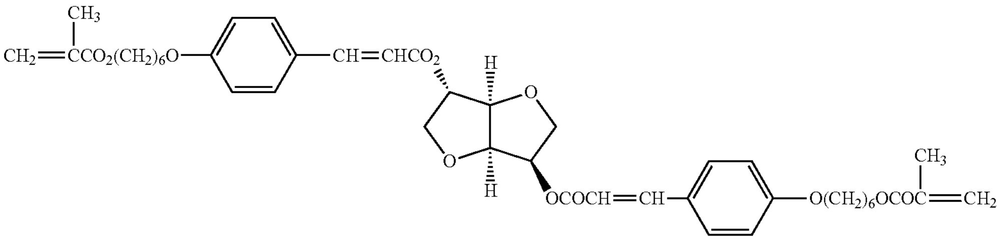

In the present invention, as the photoreactive chiral agent, for example, a photoreactive optically active compound represented by the following Formula (II) is also used.

Formula (II)

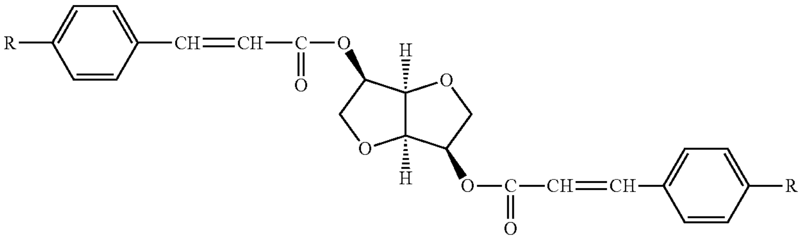

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, an octyloxy group, and a dodecyloxy group. In particular, an alkoxy group having 1 to 10 carbon atoms is preferable, and an alkoxy group having 1 to 8 carbon atoms is more preferable.

Examples of the acryloyloxyalkyloxy group having 3 to 15 carbon atoms in total include an acryloyloxy group, an acryloyloxyethyloxy group, an acryloyloxypropyloxy group, an acryloyloxyhexyloxy group, an acryloyloxybutyloxy group, and an acryloyloxydecyloxy group. In particular, an acryloyloxyalkyloxy group having 3 to 13 carbon atoms is preferable, and an acryloyloxyalkyloxy group having 3 to 11 carbon atoms is more preferable.

Examples of the methacryloyloxyalkyloxy group having 4 to 15 carbon atoms in total include a methacryloyloxy group, a methacryloyloxyethyloxy group, and a methacryloyloxyhexyloxy group. In particular, a methacryloyloxyalkyloxy group having 4 to 14 carbon atoms is preferable, and a methacryloyloxyalkyloxy group having 4 to 12 carbon atoms is more preferable.

The molecular weight of the photoreactive optically active compound represented by Formula (II) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (21) to (32)) of the photoreactive optically active compound represented by Formula (II) will be shown, but the present invention is not limited thereto.

(21)
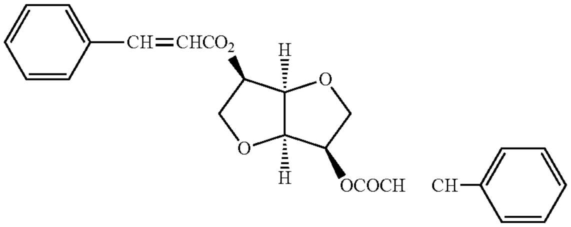
Left-Twisted
Mw = 406.43
(22)
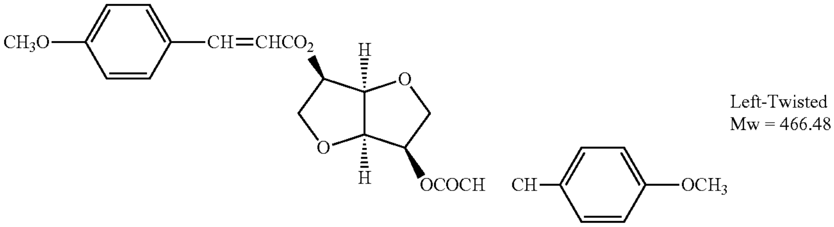
Left-Twisted
Mw = 466.48
(23)
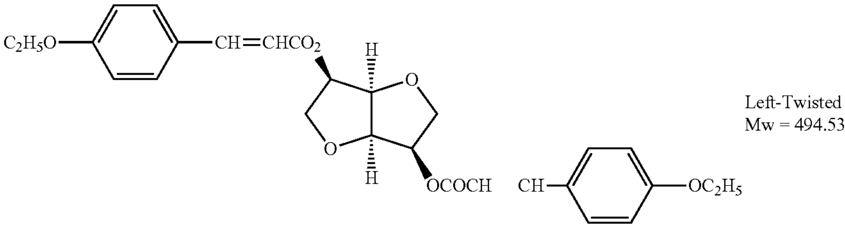
Left-Twisted
Mw = 494.53
(24)
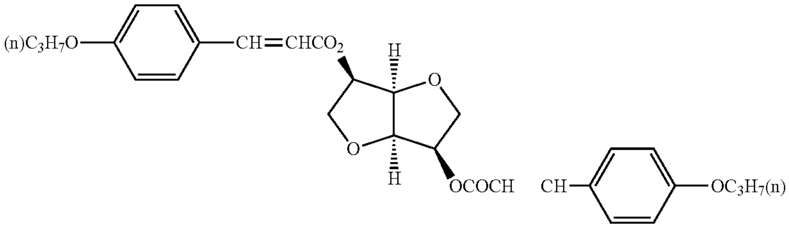
Left-Twisted
Mw = 522.59
(25)
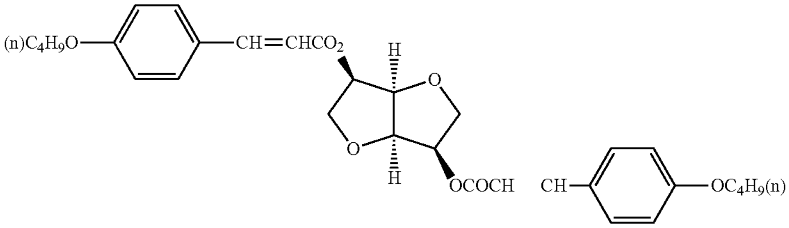
Left-Twisted
Mw = 550.64
(26)
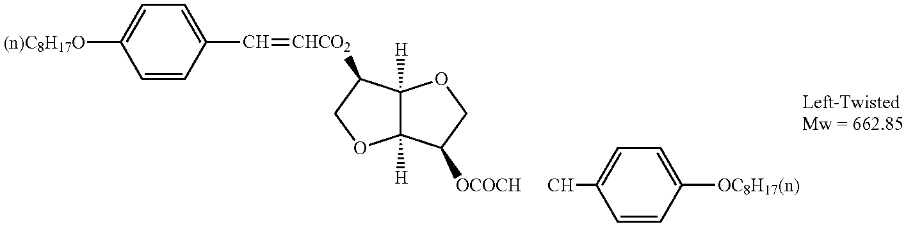
Left-Twisted
Mw = 662.85

-continued (27)

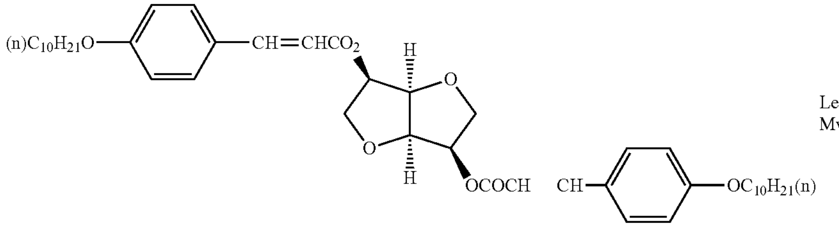

Left-Twisted
Mw = 718.96

(28)

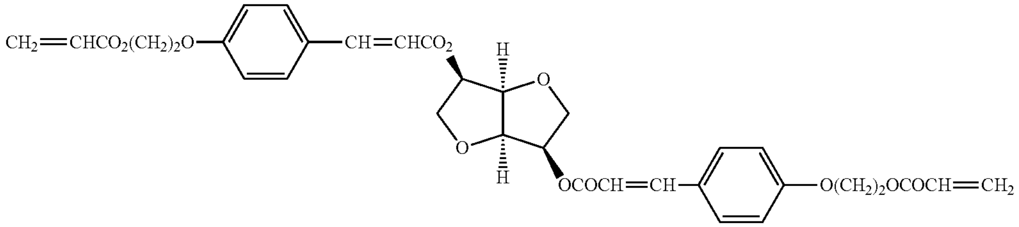

(29)

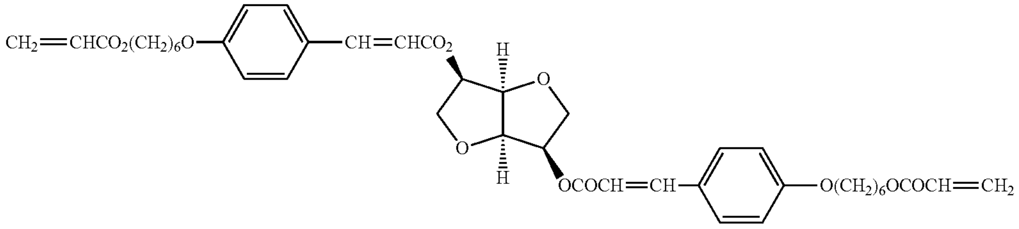

(30)

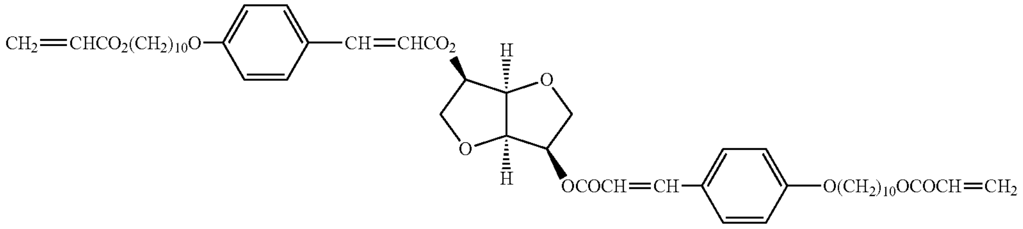

(31)

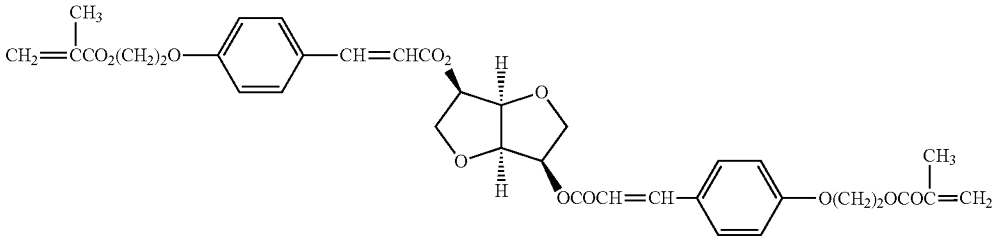

(32)

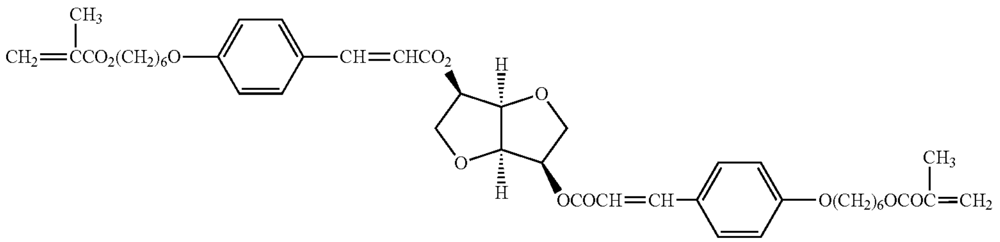

In addition, the photoreactive chiral agent can also be used in combination with a chiral agent having no photoreactivity such as a chiral compound having a large temperature dependence of the helical twisting power. Examples of the well-known chiral agent having no photoreactivity include chiral agents described in JP2000-44451A, JP1998-509726A (JP-H10-509726A), WO1998/00428A, JP2000-506873A, JP1997-506088A (JP-H9-506088A), Liquid Crystals (1996, 21, 327), and Liquid Crystals (1998, 24, 219).

<Action of Liquid Crystal Diffraction Element>

As described above, the optically-anisotropic layer that is formed using the composition including the liquid crystal compound and has the liquid crystal alignment pattern in which the direction of the optical axis 40A rotates in the arrangement axis D direction refracts circularly polarized light, in which as the single periods Λ of the liquid crystal alignment pattern decreases, the refraction angle is large.

Figure 14:
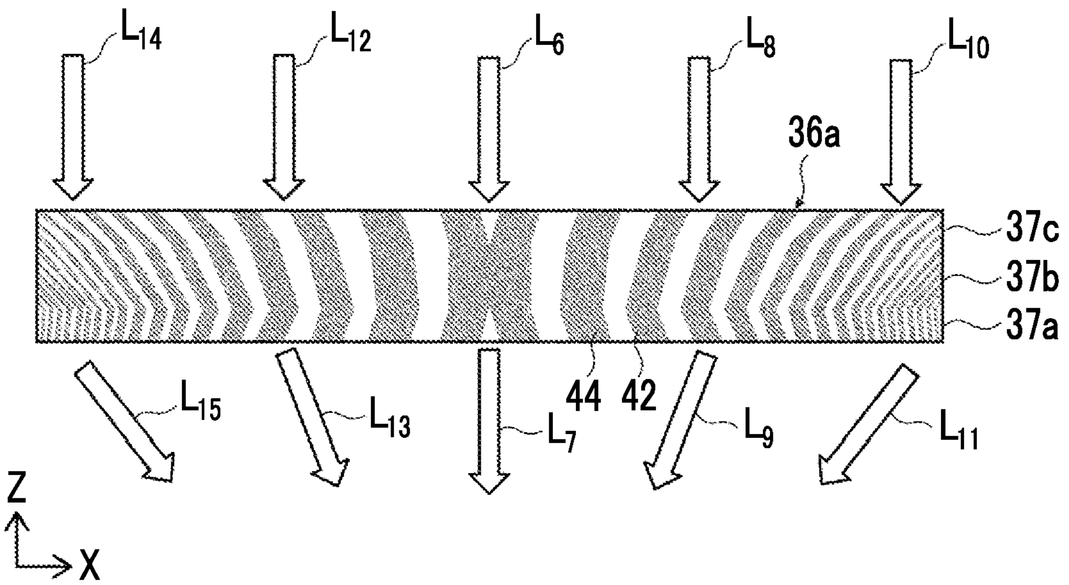
FIG. 14 is a conceptual diagram showing an action of the liquid crystal diffraction element shown in FIG. 1.

Therefore, as in the example shown in FIG. 1, in a case where the optically-anisotropic layer that has a concentric circular shape where the one in-plane direction (arrangement axis D direction) in which the direction of the optical axis derived the liquid crystal compound changes while continuously rotating moves from an inner side toward an outer side and where the single period Λ decreases from the center toward an outer side is formed, as shown in FIG. 14, light $L_6$ incident into the vicinity of the center in a plane of the optically-anisotropic layer 36*a* transmits through the optically-anisotropic layer 36*a* as light $L_7$ without being substantially diffracted. In addition, light $L_8$ incident into a middle region between the center and an outer region on the right side in the drawing is diffracted to the center side and transmits through the optically-anisotropic layer 36*a* as light $L_9$. In addition, light $L_{10}$ incident into the outer region on the right side in the drawing is diffracted to the center side at a larger angle and transmits through the optically-anisotropic layer 36*a* as light $L_{11}$. In addition, light $L_{12}$ incident into a middle region between the center and an outer region on the left side in the drawing is diffracted to the center side and transmits through the optically-anisotropic layer 36*a* as light $L_{13}$. In addition, light $L_{14}$ incident into the outer region on the left side in the drawing is diffracted to the center side at a larger angle and transmits through the optically-anisotropic layer 36*a* as light $L_{15}$.

Therefore, as shown in FIG. 14, the optically-anisotropic layer 36*a* functions as a condenser lens that collects transmitted light.

In the liquid crystal diffraction element according to the embodiment of the present invention, the twisted angle of the liquid crystal compound in the thickness direction in the optically-anisotropic layer may be appropriately set according to the single period Λ of the liquid crystal alignment pattern in a plane.

In addition, in the example shown in FIG. 1 or the like, the optically-anisotropic layer has the concentric circular liquid crystal alignment pattern having a concentric circular shape where the one in-plane direction in which the direction of the optical axis derived the liquid crystal compound changes while continuously rotating moves from an inner side toward an outer side. However, the present invention is not limited to this configuration.

For example, a configuration may be adopted in which the arrangement axis D of the liquid crystal alignment pattern of the optically-anisotropic layer has one in-plane direction, and the single period Λ gradually changes in the one in-plane direction, and the average tilt angle of the dark portion gradually changes in the one in-plane direction.

In addition, the liquid crystal alignment pattern may be a symmetrical concentric circular shape or an asymmetrical liquid crystal alignment pattern from an inner side toward an outer side. In this case, the center of the liquid crystal alignment pattern may be different from the center of the liquid crystal diffraction element. The liquid crystal alignment pattern is not limited to the above-described configuration and may be appropriately set depending on the function required for the liquid crystal diffraction element.

The liquid crystal diffraction element according to the embodiment of the present invention can be used for various uses where transmission of light in a direction different from an incidence direction is allowed, for example, an optical path changing member, a light collecting element, a light diffusing element to a predetermined direction, a diffraction element, or the like in an optical device.

The liquid crystal diffraction element according to the embodiment of the present invention may allow transmission of visible light and refract the transmitted light, or may refract infrared light and/or ultraviolet light and allow the refracted light.

The optical element according to the embodiment of the present invention includes the above-described liquid crystal diffraction element and a circularly polarizing plate.

A part of circularly polarized light incident into the liquid crystal diffraction element may transmit through the liquid crystal diffraction element (zero-order light) without being diffracted. The circularly polarized light that is not diffracted by the liquid crystal diffraction element may decrease the performance depending on applications. On the other hand, by using the liquid crystal diffraction element and the circularly polarizing plate in combination, the light (zero-order light) transmitted through the liquid crystal diffraction element without being diffracted can be reduced.

For example, the liquid crystal diffraction element and the circularly polarizing plate (where a retardation plate and a linearly polarizing plate (polarizer) are disposed in this order) will be described. In a case where right circularly polarized light is incident into the liquid crystal diffraction element, the incident right circularly polarized light is diffracted and emitted from the liquid crystal diffraction element. In addition, during the diffraction, the right circularly polarized light is converted into left circularly polarized light. The left circularly polarized light (that is, first-order light) that is diffracted by the liquid crystal diffraction element is converted into linearly polarized light by the retardation plate (¼ wave plate) of the circularly polarizing plate. The linearly polarized light converted by the retardation plate transmits through the linearly polarizing plate and is emitted.

Here, in a case where a part of light is not diffracted by the liquid crystal diffraction element, a part of right circularly polarized light incident into the liquid crystal diffraction element transmits through the liquid crystal diffraction element without being diffracted. In a case where the circularly polarizing plate is not provided, the right circularly polarized light that is not diffracted by the liquid crystal diffraction element linearly travels as it is. The right circularly polarized light that linearly travels is unnecessary depending on applications, which decreases the performance.

On the other hand, as described above, a configuration where the optical element includes the circularly polarizing plate can also be preferably used. In a case where the circularly polarizing plate is provided, right circularly polarized light (that is, zero-order light) that is not diffracted by the liquid crystal diffraction element is incident into and diffracted by the retardation plate of the circularly polarizing plate, is converted into linearly polarized light having a direction perpendicular to the above-described direction, and is incident into the linearly polarizing plate and absorbed. That is, the right circularly polarized light that is not diffracted by the liquid crystal diffraction element is absorbed by the circularly polarizing plate. Accordingly, transmission of the desired first-order light of left circularly polarized light is allowed, and the right circularly polarized light that is not diffracted can be reduced. Therefore, a decrease in performance by unnecessary light (zero-order light) can be suppressed.

<Polarizing Plate>

The linearly polarizing plate used in the present invention is not particularly limited as long as they are linearly polarizing plates having a function of allowing transmission of linearly polarized light in one polarization direction and absorbing linearly polarized light in another polarization direction. For example, a well-known linearly polarizing plate in the related art can be used. The linearly polarizing plate may be an absorptive linearly polarizing plate or a reflective linearly polarizing plate.

As the absorptive linearly polarizing plate, for example, an iodine-based polarizer, a dye-based polarizer using a dichroic dye, or a polyene polarizer that is an absorptive polarizer can be used. As the iodine-based polarizer and the dye-based polarizer, any one of a coating type polarizer or a stretching type polarizer can be used. In particular, a polarizer prepared by absorbing iodine or a dichroic dye on polyvinyl alcohol and performing stretching is preferable.

In addition, examples of a method of obtaining a polarizer by performing stretching and dyeing on a laminated film in which a polyvinyl alcohol layer is formed on the substrate include methods described in JP5143918B, JP5048120B, JP4691205B, JP4751481B, and JP4751486B, and well-known techniques relating to the polarizers can be used.

As the absorptive polarizer, for example, a polarizer obtained by aligning a dichroic coloring agent using the aligning properties of liquid crystal without performing stretching is more preferable. The polarizer has many advantages in that, for example, the thickness can be significantly reduced to about 0.1 μm to 5 μm, cracks are not likely to initiate or thermal deformation is small during folding as described in JP2019-194685A, and even a polarizing plate having a high transmittance of higher than 50% has excellent durability as described in JP6483486B, and thermoformability is excellent.

By utilizing these advantages, the polarizer is applicable to an application that requires high brightness or small size and light weight, an application of a fine optical system, or an application of forming into a portion having a curved surface, or an application of a flexible portion. In addition, a polarizer that is transferred after peeling a support can also be used.

In an on-board display optical system such as a head-up display, an optical system such as AR glasses or VR glasses, an optical sensor such as LiDAR, a face recognition system, or polarization imaging, or the like, it is also preferable that an absorptive polarizer is incorporated in order to prevent stray light.

As the reflective linearly polarizing plate, for example, a film obtained by stretching a layer including two polymers or a wire grid polarizer described in JP2011-053705A can be used. From the viewpoint of brightness, the film obtained by stretching the layer including polymers is preferable. As the commercially available product, for example, a reflective polarizer (trade name: APF) manufactured by 3M or a wire grid polarizer (trade name: WGF) manufactured by Asahi Kasei Corporation can be suitably used. Alternatively, a reflective linearly polarizing plate including a combination of a cholesteric liquid crystal film and a λ/4 plate may be used.

It is preferable that the polarizing plate used in the present invention has a smooth surface. In particular, in a case where the polarizing plate is applied to a lens or the like, due to the image enlargement effect of the lens, small surface unevenness may lead to distortion of the image. Therefore, it is desirable that the surface does not have unevenness. Specifically, an arithmetic average roughness Ra of the surface is preferably 50 nm or less, more preferably 30 nm or less, still more preferably 10 nm or less, and most preferably 5 nm or less. In addition, on the surface of the polarizing plate, a difference in height of the surface unevenness in a range of 1 square millimeter is preferably 100 nm or less, more preferably 50 nm or less, and most preferably 20 nm or less.

The surface unevenness and the arithmetic average roughness can be measured using a roughness meter or an interferometer. For example, the surface unevenness and the arithmetic average roughness can be measured using an interferometer "Vertscan" (manufactured by Mitsubishi Chemical Systems Inc.).

<Retardation Plate>

The retardation plate used in the present invention is a retardation plate that converts the phase of incident polarized light. The retardation plate is disposed such that a direction of a slow axis is adjusted depending on whether to convert incident polarized light into light similar to linearly polarized light or circularly polarized light. Specifically, the retardation plate may be disposed such that an angle of a slow axis with respect to an absorption axis of a linearly polarizing plate disposed adjacent thereto is +45° or −45°.

The retardation plate used in the present invention may be a monolayer type including one optically-anisotropic layer or a multilayer type including two or more optically-anisotropic layers having different slow axes. Examples of the multilayer type retardation plate include those described in WO13/137464A, WO2016/158300A, JP2014-209219A, JP2014-209220A, WO14/157079A, JP2019-215416A, and WO2019/160044A. However, the present invention is not limited to this example.

From the viewpoint of converting linearly polarized light into circularly polarized light or converting circularly polarized light into linearly polarized light, it is preferable that the retardation plate is a λ/4 plate.

The λ/4 plate is not particularly limited, and various well-known plates having a λ/4 function can be used. Specific examples of the λ/4 plate include those described in US2015/0277006A.

Specific examples of an aspect where the λ/4 plate has a monolayer structure include a stretched polymer film and a retardation film where an optically-anisotropic layer having a λ/4 function is provided on a support. Examples of an aspect in which the λ/4 plate has a multi-layer structure include a broadband λ/4 plate in which a λ/4 plate and a λ/2 wave plate are laminated.

The thickness of the λ/4 plate is not particularly limited and is preferably 1 to 500 μm, more preferably 1 to 50 μm, and still more preferably 1 to 5 μm.

It is preferable that the retardation plate used in the present invention has reverse wavelength dispersibility. By having reverse wavelength dispersibility, a phase change in the retardation plate is ideal, and conversion between linearly polarized light and circularly polarized light is ideal.

In the configuration where the liquid crystal diffraction element according to the embodiment of the present invention and the circularly polarizing plate are used in combination, another optical element that is provided downstream of the circularly polarizing plate may also be used in combination.

For example, a retardation plate may be disposed downstream of the circularly polarizing plate. Specifically, a configuration where linearly polarized light transmitted through the circularly polarizing plate (where the retardation plate and the linearly polarizing plate are disposed in this order) is converted into circularly polarized light, elliptically polarized light, and linearly polarized light having a different polarization direction by the retardation plate that is disposed downstream of the circularly polarizing plate can also be preferably used. In addition, instead of the retardation plate, a depolarization layer that depolarizes the polarization state of light in at least a part of a wavelength range may be used. As the depolarization layer, for example, a high retardation film (having an in-plane retardation of 3000 nm or more) or a light scattering layer can be used. By controlling the polarization state of the light emitted from the circularly polarizing plate, the polarization state can be adjusted depending on applications.

In another example, an optical element that is provided downstream of the circularly polarizing plate to deflect light may be used. For example, by disposing the optical element such as a lens that deflects light downstream of the circularly polarizing plate, the traveling direction of light emitted from the circularly polarizing plate can be changed. By controlling the deflection direction of the light emitted from the circularly polarizing plate, the emission direction of light can be adjusted depending on applications.

<Adhesive Layer (Pressure Sensitive Adhesive Layer), Adhesive>

The optical film may include an adhesive layer for adhesion of the respective layers. In the present specification, "adhesive" is used as a concept including "pressure-sensitive adhesive".

Examples of the adhesive include a water-soluble adhesive, an ultraviolet curable adhesive, an emulsion type adhesive, a latex type adhesive, a mastic adhesive, a multi-layered adhesive, a paste-like adhesive, a foaming adhesive, a supported film adhesive, a thermoplastic adhesive, a hot-melt adhesive, a thermally solidified adhesive, a thermally activated adhesive, a heat-seal adhesive, a thermosetting adhesive, a contact type adhesive, a pressure-sensitive adhesive, a polymerizable adhesive, a solvent type adhesive, a solvent-activated adhesive, and a ceramic adhesive. Specifically, for example, a boron compound aqueous solution, a curable adhesive of an epoxy compound not having an aromatic ring in a molecule as disclosed in JP2004-245925A, an active energy ray-curable adhesive having a molar absorption coefficient of 400 or higher at a wavelength of 360 to 450 nm and including a photopolymerization initiator and an ultraviolet curable compound as essential components as described in JP2008-174667A, or an active energy ray-curable adhesive including (a) a (meth)acrylic compound having two or more (meth)acryloyl groups in a molecule, (b) a (meth)acrylic compound having a hydroxyl group and only one polymerizable double bond in a molecule, and (c) a phenol ethylene oxide modified acrylate or a nonyl phenol ethylene oxide modified acrylate with respect to 100 parts by mass of the total amount of the (meth)acrylic compounds as described in JP2008-174667A can be used. Optionally, various adhesives can be used alone or as a mixture of two or more kinds.

In the laminated optical film, from the viewpoint of reducing unnecessary reflection, it is preferable that a difference in refractive index between the adhesive layer and a layer adjacent thereto is small. Specifically, the difference in refractive index from the adjacent layer is preferably 0.05 or less and more preferably 0.01 or less. A method of adjusting the refractive index of the adhesive layer is not particularly limited. For example, an existing method such as a method of adding of fine particles of zirconia, silica, acryl, acrylic-styrene, melamine, or the like, a method of adjusting the refractive index of a resin, or a method described in JP1999-223712A (JP-H11-223712A) can be used.

In addition, in a case where the adjacent layer has refractive index anisotropy in a plane, it is preferable that the difference in refractive index from the adjacent layer in all of the in-plane directions is 0.05 or less. Therefore, the adhesive layer may have refractive index anisotropy in a plane.

In a case where a difference in refractive index between adhesion interfaces is large, the interface reflectivity can be reduced by generating a refractive index distribution in the thickness direction of the adhesive layer. Examples of a method of generating a refractive index distribution in the thickness direction include a method of providing a plurality of adhesive layers, a method of mixing interfaces between a plurality adhesive layers that are provided, and a method of controlling an uneven distribution state of a material in the adhesive layer to generate a refractive index distribution.

In addition, the adhesive layer can be provided on one member or both members to be bonded using any method such as application, vapor deposition, or transfer. From the viewpoint of increasing the adhesion strength, a post-treatment such as a heating treatment or ultraviolet irradiation can be performed according to the kind of the adhesive. The thickness of the adhesive layer can be freely adjusted and is preferably 20 μm or less and more preferably 0.1 μm or less. Examples of a method of forming the adhesive layer having a thickness of 0.1 μm or less include a method of vapor-depositing a ceramic adhesive such as silicon oxide (SiOx layer) on a bonding surface. For the bonding surface of the bonding member, before the bonding, for example, a surface reforming treatment such as a plasma treatment, a corona treatment, or a saponification treatment can be performed, and a primer layer can be applied. In addition, in a case where a plurality of bonding surfaces are present, the kind, thickness, and the like of the adhesive layer can be adjusted for each of the bonding surfaces.

<Cutting of Laminate>

The prepared laminate can be cut into a predetermined size. A method of cutting the laminate is not particularly limited. For example, various well-known methods such as a method of physically cutting the laminate using a blade such as a Thomson blade or a method of cutting the laminate by laser irradiation can be used. In a case where laser light is used, it is preferable to select a pulse duration (nanosecond, picosecond, or femtosecond) and a wavelength in consideration of damage to cutting properties and a material. In addition, after processing the laminate in a predetermined shape, for example, edge surface polishing may be performed.

From the viewpoint of, for example, improving the workability during the cutting or suppressing dust emission, the cutting can also be performed in a state where a peelable protective film is attached. In addition, by performing the cutting while observing the liquid crystal alignment pattern, for example, using a method described in JP2004-141889A, a cutting position can be freely determined. In this case, in order to easily see the liquid crystal alignment pattern, the liquid crystal alignment pattern can also be observed through a polarizing plate, a retardation film, or the like. In addition, in a case where a plurality of optical elements are provided on one substrate, it is preferable that the plurality of optical elements are cut at the same time.

<Other Treatments>

For example, on order to accurately provide the laminate in a device or to improve the accuracy of an axis or a cutting position during the cutting, a mark having a given shape can be optionally formed. The kind of the mark can be freely selected, and a method of physically forming the mark using a laser, an ink jet method, or the like, a method of partially changing the liquid crystal alignment state, or a method of forming a region that is partially decolored or colored can be selected.

In addition, in order to protect the liquid crystal layer, optionally, a protective layer (for example, a gas barrier layer, a layer for blocking moisture or the like, an ultraviolet absorbing layer, or a scratch resistance layer) can be provided. The protective layer can be formed on the liquid crystal layer directly or through a pressure sensitive adhesive layer or another optical film. In order to reduce the reflectivity of the surface, an antireflection layer (for example, an LR layer, an AR layer, or a moth eye layer) may be provided. Various protective layers can be appropriately selected from well-known protective layers. In a case where the gas barrier layer is provided polyvinyl alcohol is preferable. The polyvinyl alcohol can also have a function as a polarizer. In addition, the ultraviolet absorbing layer is a layer including an ultraviolet absorber. As the ultraviolet absorber, from the viewpoints of excellent capability to absorb ultraviolet light having a wavelength of 370 nm or less and excellent display properties, an ultraviolet absorber having small absorption of visible light having a wavelength of 400 nm or more is preferably used. As the ultraviolet absorber, one kind may be used alone, or two or more kinds may be used in combination. Examples of the ultraviolet absorber include ultraviolet absorbers described in JP2001-72782A and JP2002-543265A. Specific examples of the ultraviolet absorber include an oxybenzophenone compound, a benzotriazole compound, a salicylic acid ester compound, a benzophenone compound, a cyanoacrylate compound, and a nickel complex salt compound.

<Combination of Plurality of Liquid Crystal Diffraction Elements>

The liquid crystal diffraction element according to the embodiment of the present invention can be used as a combination of a plurality of liquid crystal diffraction elements.

For example, by combining a plurality of liquid crystal diffraction elements and changing the polarization states incident into liquid crystal diffraction elements as disclosed in Optics Express, Vol. 28, No 16/3 August 2020, the collecting properties/diverging properties of emitted light can be switched between a plurality of combinations.

By combining the plurality of liquid crystal diffraction elements, display (foveated display) corresponding to fovea centralis can be performed in an HMD such as AR glasses or VR glasses.

<Combination with Phase Modulation Element>

A configuration where the liquid crystal diffraction element according to the embodiment of the present invention is used in combination with a phase modulation element can also be preferably used.

For example, by using a switchable λ/2 plate (half waveplate) that can modulate a retardation with a voltage as disclosed in U.S. Ser. No. 10/379,419B and the liquid crystal diffraction element according to the embodiment of the present invention (used as a passive element) in combination, a focus tunable lens having a high diffraction efficiency irrespective of light incidence positions in a plane of the element can be realized. In addition, by using plural sets of the phase modulation elements and the liquid crystal diffraction elements in combination, a plurality of adjustable focal lengths can increase.

By using this focus tunable lens for AR glasses or VR glasses, the focal position of a display image of an HMD can be freely changed.

<Combination with Lens>

A configuration where the liquid crystal diffraction element according to the embodiment of the present invention is used in combination with another lens element can also be preferably used.

For example, by using the liquid crystal diffraction element according to the embodiment of the present invention in combination with a Fresnel lens disclosed in SID 2020 DIGEST, 40-4, pp. 579-582, chromatic aberration of the lens can be improved with a high diffraction efficiency irrespective of light incidence positions in a plane of the element. The lens to be used in combination is not particularly limited, and a combination with a refractive index lens or a pancake lens disclosed in U.S. Pat. No. 3,443,858A, Optics Express, Vol. 29, No 4/15 February 2021, or the like can also be suitably used.

By using an optical system including the lens and the liquid crystal diffraction element in combination for AR glasses or VR glasses, color shift (chromatic aberration of the lens) of a display image of the HMD can be improved.

<Combination with Light Guide Plate>

A configuration where the liquid crystal diffraction element according to the embodiment of the present invention is used in combination with a light guide plate can also be preferably used.

For example, in a combination of a light guide plate and a lens disclosed in Proc. of SPIE Vol. 11062, Digital Optical Technologies 2019, 110620J (16 Jul. 2019), by using the liquid crystal diffraction element according to the embodiment of the present invention as the lens, the focal position of a display image emitted from the light guide plate can be changed.

This way, by using the liquid crystal diffraction element in combination with the light guide plate, the focal position of a display image of an HMD such as AR glasses or VR glasses can be adjusted. For use in AR glasses, by using the liquid crystal diffraction element according to the embodiment of the present invention as positive and negative lenses between which a light guide plate is interposed as disclosed in Proc. of SPIE Vol. 11062, Digital Optical Technologies 2019, 110620J (16 Jul. 2019), both of an actual scene and a display image output from the light guide plate can be observed without distortion.

<Combination with Image Display Apparatus>

A combination of the liquid crystal diffraction element according to the embodiment of the present invention with an image display apparatus can also be preferably used.

For example, by using the liquid crystal diffraction element (used as a diffractive deflection film) and an image display apparatus disclosed in Crystals 2021, 11, 107 in combination, a brightness distribution of emitted light from the image display apparatus can be adjusted.

By using the image display unit combined with the image display apparatus, a brightness distribution of an HMD such as AR glasses or VR glasses can be suitably adjusted.

<Combination with Beam Steering>

A combination of the liquid crystal diffraction element according to the embodiment of the present invention with a light deflection element (beam steering) can also be preferably used.

For example, by using the liquid crystal diffraction element according to the embodiment of the present invention as a diffraction element of a light deflection element disclosed in WO2019/189675A, the deflection angle of emitted light can be increased with a high diffraction efficiency.

By using the liquid crystal diffraction element in combination with the light deflection element (beam steering), a light irradiation angle of a distance-measuring sensor such as light detection and ranging (LIDAR) can be suitably widened.

Hereinabove, the liquid crystal diffraction element, the optical element, the image display unit, the head-mounted display, the beam steering, and the sensor according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Liquid Crystal Diffraction Element>

(Support)

A glass substrate was used as the support.

(Formation of Alignment Film)

The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

| Coating Liquid for Forming Alignment Film | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

-Material A for Photo-Alignment-

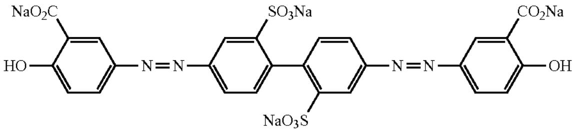

(Exposure of Alignment Film)

The concentric circular alignment film was exposed using the exposure device shown in FIG. 11 to form an alignment film P-1 having an alignment pattern.

In the exposure device, a laser that emits laser light having a wavelength (325 nm) was used as the laser. The exposure amount of the interference light was 1000 $mJ/cm^2$. By using the exposure device shown in FIG. 11, the single period of the alignment pattern gradually decreased from the center toward the outer direction.

(Formation of Optically-Anisotropic Layer)

As a liquid crystal composition forming a first optically-anisotropic layer, the following composition A-1 was prepared.

| Composition A-1 | |
|---|---|
| Liquid crystal compound L-1 | 100.00 parts by mass |
| Chiral agent C-1 | 0.32 parts by mass |
| Polymerization initiator (IRGACURE-OXE 01, manufactured by BASF SE) | 1.00 part by mass |
| Leveling agent T-1 | 0.08 parts by mass |
| Methyl ethyl ketone | 1050.00 parts by mass |

Liquid Crystal Compound L-1

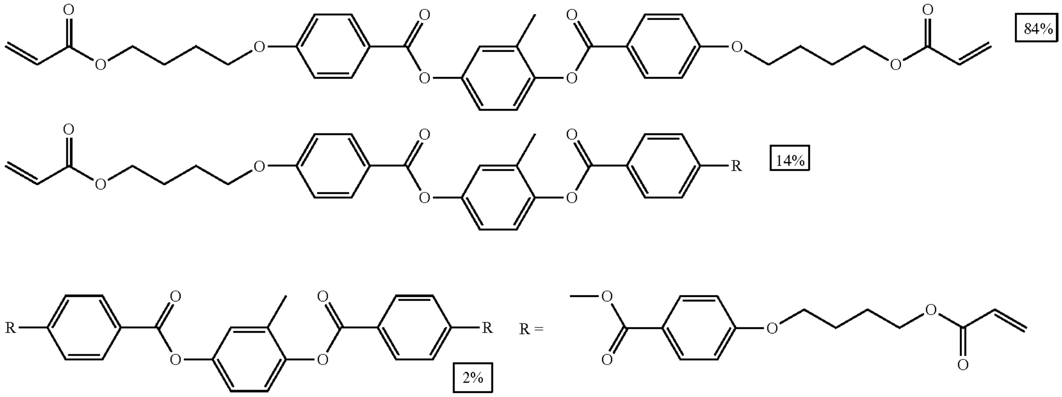

Chiral Agent C-1

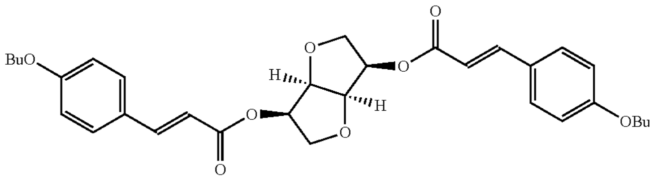

-continued

Composition A-1

Leveling Agent T-1

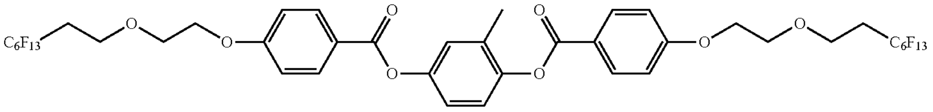

The optically-anisotropic layer was formed by applying multiple layers of the composition A-1 to the alignment film P-1. The application of the multiple layers refers to repetition of the following processes including: preparing a first liquid crystal immobilized layer by applying the composition A-1 for forming the first layer to the alignment film, heating the composition A-1, and irradiating the composition A-1 with ultraviolet light for curing; and preparing a second or subsequent liquid crystal immobilized layer by applying the composition A-1 for forming the second or subsequent layer to the formed liquid crystal immobilized layer, heating the composition A-1, and irradiating the composition A-1 with ultraviolet light for curing as described above. Even in a case where the liquid crystal layer was formed by the application of the multiple layers such that the total thickness of the optically-anisotropic layer was large, the alignment direction of the alignment film was reflected from a lower surface of the optically-anisotropic layer to an upper surface thereof.

Regarding the first liquid crystal layer, the following composition A-1 was applied to the alignment film P-1 to form a coating film, the coating film was heated to 80° C. using a hot plate, the coating film was irradiated with ultraviolet light having a wavelength of 365 nm at an irradiation dose of 300 $mJ/cm^2$ using a high-pressure mercury lamp in a nitrogen atmosphere. As a result, the alignment of the liquid crystal compound was immobilized.

Regarding the second or subsequent liquid crystal immobilized layer, the composition was applied to the first liquid crystal layer, and the applied composition was heated and irradiated with ultraviolet light for curing under the same conditions as described above. As a result, a liquid crystal immobilized layer was prepared. This way, by repeating the application multiple times until the total thickness reached a desired film thickness, an optically-anisotropic layer was obtained, and a liquid crystal diffraction element was prepared.

A complex refractive index of the cured layer of a liquid crystal composition A-1 was obtained by applying the liquid crystal composition A-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value and the film thickness of the liquid crystal immobilized layer. Δn can be calculated by dividing the retardation value by the film thickness. The retardation value was measured at a desired wavelength using Axoscan (manufactured by Axometrix Inc.), and the film thickness was measured using a scanning electron microscope (SEM).

Finally, in the optically-anisotropic layer, $\Delta n_{550}\times$Thickness (Re(550)) of the liquid crystals was 275 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. In addition, the twisted angle in the thickness direction of the optically-anisotropic layer was left-twisted and 70° (−70°) over the entire in-plane region. Hereinafter, unless specified otherwise, "$\Delta n_{550}\times d$" and the like were measured as described above.

As a liquid crystal composition forming a second optically-anisotropic layer, the following composition A-2 was prepared.

| Composition A-2 | |
|---|---|
| Liquid crystal compound L-1 | 100.00 parts by mass |
| Chiral agent C-2 | 0.18 parts by mass |
| Polymerization initiator (IRGACURE-OXE 01, manufactured by BASF SE) | 1.00 part by mass |
| Leveling agent T-1 | 0.08 parts by mass |
| Methyl ethyl ketone | 1050.00 parts by mass |

Chiral Agent C-2

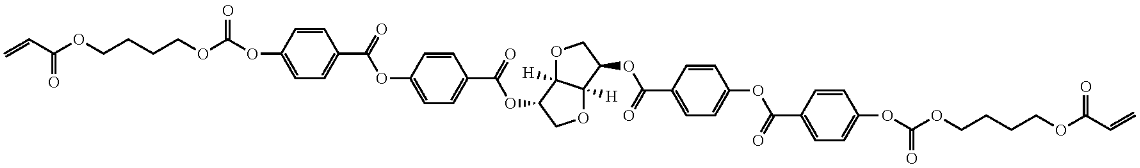 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

A second optically-anisotropic layer was formed using the same method as that of the first optically-anisotropic layer, except that the film thickness of the optically-anisotropic layer was adjusted using the composition A-2.

Finally, in the optically-anisotropic layer, $\Delta n_{550}\times$Thickness (Re(550)) of the liquid crystals was 275 nm, and it was verified using a polarization microscope that concentric circular (radial) periodic alignment occurred on the surface as shown in FIG. 2. In the liquid crystal alignment pattern of the optically-anisotropic layer, the period decreased toward the outer direction. The twisted angle in the thickness direction of the optically-anisotropic layer was right-twisted and 70° in a plane.

Example 1

(Formation of Optically-Anisotropic Layer)

As a liquid crystal composition forming an optically-anisotropic layer, the following compositions B-1, B-2, and B-3 were prepared.

| Composition B1 | |
|---|---|
| Liquid crystal compound L-1 | 100.00 parts by mass |
| Chiral agent C-3 | 0.23 parts by mass |
| Chiral agent C-4 | 0.82 parts by mass |
| Polymerization initiator (IRGACURE-OXE 01, manufactured by BASF SE) | 1.00 part by mass |
| Leveling agent T-1 | 0.08 parts by mass |
| Methyl ethyl ketone | 1050.00 parts by mass |

Chiral Agent C-3

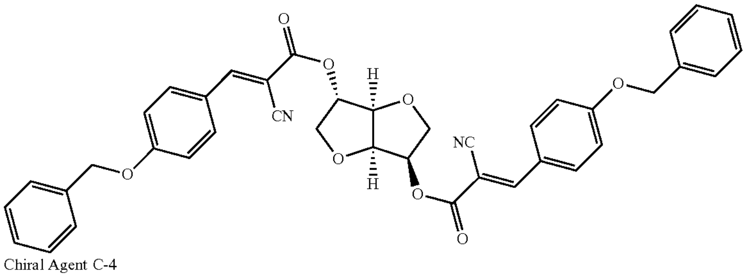

Chiral Agent C-4

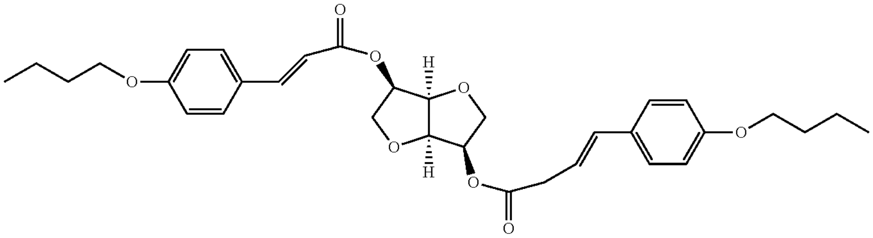 [SMILES: CCCCOc1ccc(/C=C/CC(=O)O[C@@H]2CO[C@H]3[C@@H]2OC[C@H]3OC(=O)/C=C/c2ccc(OCCCC)cc2)cc1]

As the liquid crystal composition for forming the second optically-anisotropic layer, a composition B-2 was prepared using the same method as that of the composition B-1 according to Example 1, except that the amount of chiral agent C-3 was changed to 0.54 parts by mass and the amount of the chiral agent C-4 was changed to 0.62 parts by mass.

As the liquid crystal composition for forming the third optically-anisotropic layer, a composition B-3 was prepared using the same method as that of the composition B-1 according to Example 1, except that the amount of chiral agent C-3 was changed to 0.48 parts by mass and the chiral agent C-4 was not added.

First, a first region was formed by applying multiple layers of the composition B-1 to the alignment film P-1. The application of the multiple layers refers to repetition of the following processes including: preparing a first liquid crystal immobilized layer by applying the first layer-forming composition B-1 to the alignment film, heating the composition B-1, cooling the composition B-1, and irradiating the composition B-1 with ultraviolet light for curing; and preparing a second or subsequent liquid crystal immobilized layer by applying the second or subsequent layer-forming composition B-1 to the formed liquid crystal immobilized layer, heating the composition B-1, cooling the composition B-1, and irradiating the composition B-1 with ultraviolet light for curing as described above. Even in a case where the liquid crystal layer was formed by the application of the multiple layers such that the total thickness of the optically-anisotropic layer was large, the alignment direction of the alignment film was reflected from a lower surface of the optically-anisotropic layer to an upper surface thereof.

First, in order to form the first layer, the composition B-1 was applied to the alignment film P-1, and the coating film was heated to 80° C. on a hot plate. Next, the coating film was irradiated with ultraviolet light having a wavelength of 365 nm using a LED-UV exposure device. At this time, the coating film was irradiated while changing the irradiation dose of ultraviolet light in a plane. Specifically, the coating film was irradiated by changing the irradiation dose in a plane such that the irradiation dose increased from the center portion toward an end part. Next, the coating film heated on a hot plate at 80° C. was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized.

Regarding the second or subsequent liquid crystal layer, the composition was applied to the liquid crystal immobilized layer, and then a liquid crystal immobilized layer was prepared under the same conditions as described above. This way, by repeating the application multiple times until the film thickness reached a desired thickness, the first region of the optically-anisotropic layer was obtained.

Finally, in the first region, $\Delta n_{550}$×Thickness (Re(550)) of the liquid crystals was 160 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. Regarding the twisted angle in the thickness direction of the optically-anisotropic layer, the twisted angle at the position at a distance of about 2 mm from the center was left-twisted and 80° (−80°), the single period at the position at a distance of about 25 mm from the center was left-twisted and 115° (−115°), and the twisted angle increased toward the outer direction.

As a result, the optically-anisotropic layer where the twisted angle changed in a plane was formed.

Next, a second region was formed by applying multiple layers of the composition B-2 to the first region.

The composition B-2 was applied to the first region, and the optically-anisotropic layer was formed using the same method as that of the first region according to Example 1, except that the irradiation dose of ultraviolet light with which the coating film was irradiated changed from the center portion toward the end part (the irradiation dose increased from the center portion toward the end part) such that the total thickness was a desired film thickness.

Regarding the second or subsequent liquid crystal layer, the composition was applied to the liquid crystal immobilized layer, and then a liquid crystal immobilized layer was prepared under the same conditions as described above. This way, by repeating the application multiple times until the film thickness reached a desired thickness, the second region of the optically-anisotropic layer was obtained.

Finally, in the second region, $\Delta n_{550}$×Thickness (Re(550)) of the liquid crystals was 335 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. Regarding the twisted angle in the thickness direction of the optically-anisotropic layer, the twisted angle at the position at a distance of about 2 mm from the center was 0°, the single period at the position at a distance of about 25 mm from the center was left-twisted and 76° (−76°), and the twisted angle increased toward the outer direction.

As a result, the optically-anisotropic layer where the twisted angle changed in a plane was formed.

Next, a third region was formed by applying multiple layers of the composition B-3 to the second region.

The composition B-3 was applied to the second region, and the optically-anisotropic layer was formed using the same method as that of the first region according to Example 1, except that the irradiation dose of ultraviolet light with which the coating film was irradiated changed from the center portion toward the end part (the irradiation dose increased from the center portion toward the end part) such that the total thickness was a desired film thickness.

Regarding the second or subsequent liquid crystal layer, the composition was applied to the liquid crystal immobilized layer, and then a liquid crystal immobilized layer was prepared under the same conditions as described above. This way, by repeating the application multiple times until the film thickness reached a desired thickness, the third region of the optically-anisotropic layer was obtained.

Finally, in the third region, $\Delta n_{550}$×Thickness (Re(550)) of the liquid crystals was 160 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. Regarding the twisted angle in the thickness direction of the optically-anisotropic layer, the twisted angle at the position at a distance of about 2 mm from the center was right-twisted and 80° (twisted angle: 80°), the twisted angle at the position at a distance of about 25 mm from the center was left-twisted and 48° (twisted angle: 48°), and the twisted angle decreased toward the outer direction.

As a result, the optically-anisotropic layer including the three regions was formed.

In a case where a cross-section of the prepared optically-anisotropic layer was observed with an SEM, bright portions and dark portions had a shape shown in FIG. 1. That is, the dark portion had two inflection points and the average tilt angle was substantially 0° at the center and increased from the center toward the outer direction.

Example 2

(Formation of Optically-Anisotropic Layer)

As the liquid crystal composition for forming the optically-anisotropic layer, compositions C-1, C-2, C-3, and C-4 were prepared using the same method as that of the composition B-1 according to Example 1, except that the addition amounts of the chiral agent C-3 and the chiral agent C-4 were appropriately changed.

First, a first region was formed by applying multiple layers of the composition C-1 to the alignment film P-1.

The composition C-1 was applied to the alignment film P-1, and a first region of the optically-anisotropic layer was formed using the same method as that of the first optically-anisotropic layer according to Example 1, except that the irradiation dose of ultraviolet light with which the coating film was irradiated changed from the center portion toward the end part such that the total thickness was a desired film thickness.

Finally, in this region, $\Delta n_{550}$×Thickness (Re(550)) of the liquid crystals was 190 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. Regarding the twisted angle in the thickness direction of the first region of the optically-anisotropic layer, the twisted angle at the position at a distance of about 2 mm from the center was left-twisted and 87° (−87°), the single period at the position at a distance of about 25 mm from the center was left-twisted and 115° (−115°), and the twisted angle increased toward the outer direction.

Next, a second region was formed by applying multiple layers of the composition C-2 to the first region.

The composition C-2 was applied to the first region, and the second region was formed using the same method as that of the first region according to Example 1, except that the irradiation dose of ultraviolet light with which the coating film was irradiated changed from the center portion toward the end part such that the total thickness was a desired film thickness.

Finally, in this region, $\Delta n_{550}$×Thickness (Re(550)) of the liquid crystals was 150 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. Regarding the twisted angle in the thickness direction of the second region of the optically-anisotropic layer, the twisted angle at the position at a distance of about 2 mm from the center was right-twisted and 14° (−14°), the single period at the position at a distance of about 25 mm from the center was left-twisted and 18° (−18°), and the twisted angle changed toward the outer direction.

Next, a third region was formed by applying multiple layers of the composition C-3 to the second region.

The composition C-3 was applied to the second region, and a third region was formed using the same method as that of the first region according to Example 1, except that the irradiation dose of ultraviolet light with which the coating film was irradiated changed from the center portion toward the end part such that the total thickness was a desired film thickness.

Finally, in this region, $\Delta n_{550}$×Thickness (Re(550)) of the liquid crystals was 150 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. Regarding the twisted angle in the thickness direction of the third region of the optically-anisotropic layer, the twisted angle at the position at a distance of about 2 mm from the center was left-twisted and 14° (−14°), the single period at the position at a distance of about 25 mm from the center was left-twisted and 8° (−8°), and the twisted angle decreased toward the outer direction.

Next, a fourth region was formed by applying multiple layers of the composition C-4 to the third region.

The composition C-4 was applied to the third region, and the fourth region was formed using the same method as that of the first region according to Example 1, except that the irradiation dose of ultraviolet light with which the coating film was irradiated changed from the center portion toward the end part such that the total thickness was a desired film thickness.

Finally, in this region, $\Delta n_{550}$×Thickness (Re(550)) of the liquid crystals was 190 nm, and it was verified using a polarization microscope that concentric circular (radial) periodic alignment occurred on the surface as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. Regarding the twisted angle in the thickness direction of the fourth region of the optically-anisotropic layer, the twisted angle at the position at a distance of about 2 mm from the center was right-twisted and 87°, the single period at the position at a distance of about 25 mm from the center was right-twisted and 237°, and the twisted angle increased toward the outer direction.

As a result, the optically-anisotropic layer including the four regions was formed.

In a case where a cross-section of the prepared optically-anisotropic layer was observed with an SEM, bright portions and dark portions had a shape shown in FIG. 5. That is, the dark portion had three inflection points and the average tilt angle was substantially 0° at the center and increased from the center toward the outer direction.

Example 3

(Formation of Optically-Anisotropic Layer)

As the liquid crystal composition for forming the optically-anisotropic layer, compositions D-1, D-2, and D-3 were prepared using the same method as that of the composition B-1 according to Example 1, except that the addition amounts of the chiral agent C-3 and the chiral agent C-4 were appropriately changed.

First, a first region was formed by applying multiple layers of the composition D-1 to the alignment film P-1. Next, a second region was formed by applying multiple layers of the composition D-2 to the first region. Next, a third region was formed by applying multiple layers of the composition D-3 to the second region.

Each of the regions was formed, and the optically-anisotropic layer was formed using the same method as that of the first region according to Example 1, except that the irradiation dose of ultraviolet light with which the coating film was irradiated changed from the center portion toward the end part such that the total thickness was a desired film thickness.

It was verified using a polarization microscope that the prepared optically-anisotropic layer had a periodically aligned surface having a concentric circular shape (radial shape) as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction.

In the first region of the optically-anisotropic layer, finally, $\Delta n_{550}$×Thickness (Re(550)) of the liquid crystal was 150 nm, and Regarding the twisted angle in the thickness direction, the twisted angle at the position at a distance of about 2 mm from the center was left-twisted and 83° (−83°), the twisted angle at the position at a distance of about 25 mm from the center was left-twisted and 114° (−114°), the twisted angle at the position at a distance of about 30 mm from the center was left-twisted and 161° (−161°), and the twisted angle increased toward the outer direction.

In the second region of the optically-anisotropic layer, finally, $\Delta n_{550}$×Thickness (Re(550)) of the liquid crystal was 335 nm, and Regarding the twisted angle in the thickness direction, the twisted angle at the position at a distance of about 2 mm from the center was left-twisted and 8° (−8°), the twisted angle at the position at a distance of about 25 mm from the center was left-twisted and 85° (−85°), the twisted angle at the position at a distance of about 30 mm from the center was left-twisted and 137° (−137°), and the twisted angle increased toward the outer direction.

In the third region of the optically-anisotropic layer, finally, $\Delta n_{550}$×Thickness (Re(550)) of the liquid crystal was 170 nm, and Regarding the twisted angle in the thickness direction, the twisted angle at the position at a distance of about 2 mm from the center was right-twisted and 78°, the twisted angle at the position at a distance of about 25 mm from the center was right-twisted and 41°, the twisted angle at the position at a distance of about 30 mm from the center was right-twisted and 19°, and the twisted angle decreased toward the outer direction.

As a result, the optically-anisotropic layer including the three regions was formed.

In a case where a cross-section of the prepared optically-anisotropic layer was observed with an SEM, bright portions and dark portions had a shape shown in FIG. 1. That is, the dark portion had two inflection points and the average tilt angle increased from the center toward the outer direction.

Example 4

(Formation of Optically-Anisotropic Layer)

As the liquid crystal composition forming the optically-anisotropic layer, compositions E-1, E-2, and E-3 were prepared using the same method as that of the composition B-1 according to Example 1, except that the amount of the liquid crystal compound L-1 was changed to 10 parts by mass, the amount of the liquid crystal compound L-2 was changed to 90 parts by mass, and the addition amounts of the chiral agents C-3, the chiral agent C-4, and the leveling agent T-1 were appropriately changed.

Liquid Crystal Compound L-2

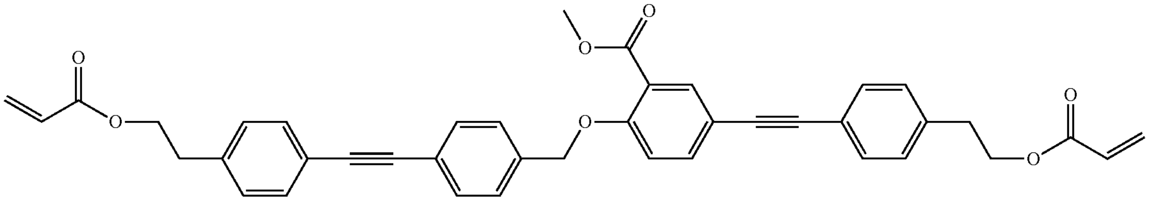

First, a first region was formed by applying multiple layers of the composition E-1 to the alignment film P-1. Next, a second region was formed by applying multiple layers of the composition E-2 to the first region. Next, a third region was formed by applying multiple layers of the composition E-3 to the second region.

Each of the regions was formed, and the optically-anisotropic layer was formed using the same method as that of the first region according to Example 1, except that the irradiation dose of ultraviolet light with which the coating film was irradiated changed from the center portion toward the end part such that the total thickness was a desired film thickness.

It was verified using a polarization microscope that the prepared optically-anisotropic layer had a periodically aligned surface having a concentric circular shape (radial shape) as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction.

In the first region of the optically-anisotropic layer, finally, $\Delta n_{550}$×Thickness (Re(550)) of the liquid crystal was 150 nm, and Regarding the twisted angle in the thickness direction, the twisted angle at the position at a distance of about 2 mm from the center was left-twisted and 83° (—83°), the twisted angle at the position at a distance of about 25 mm from the center was left-twisted and 114° (−114°), the twisted angle at the position at a distance of about 30 mm from the center was left-twisted and 161°(−161°), and the twisted angle increased toward the outer direction.

In the second region of the optically-anisotropic layer, finally, $\Delta n_{550}$×Thickness (Re(550)) of the liquid crystal was 335 nm, and Regarding the twisted angle in the thickness direction, the twisted angle at the position at a distance of about 2 mm from the center was left-twisted and 8° (−8°), the twisted angle at the position at a distance of about 25 mm from the center was left-twisted and 85° (−85°), the twisted angle at the position at a distance of about 30 mm from the center was left-twisted and 137° (−137°), and the twisted angle increased toward the outer direction.

In the third region of the optically-anisotropic layer, finally, $\Delta n_{550}$×Thickness (Re(550)) of the liquid crystal was 170 nm, and Regarding the twisted angle in the thickness direction, the twisted angle at the position at a distance of about 2 mm from the center was right-twisted and 78°, the twisted angle at the position at a distance of about 25 mm from the center was right-twisted and 41°, the twisted angle at the position at a distance of about 30 mm from the center was right-twisted and 19°, and the twisted angle decreased toward the outer direction.

As a result, the optically-anisotropic layer including the three regions was formed.

In a case where a cross-section of the prepared optically-anisotropic layer was observed with an SEM, bright portions and dark portions had a shape shown in FIG. 1. That is, the dark portion had two inflection points and the average tilt angle increased from the center toward the outer direction.

Example 5

(Formation of Optically-Anisotropic Layer)

As a liquid crystal composition forming an optically-anisotropic layer, the following compositions F-1, F-2, and F-3 were prepared.

| Composition F-1 | |
|---|---|
| Liquid crystal compound L-1 | 10.00 parts by mass |
| Liquid crystal compound L-2 | 90.00 parts by mass |
| Chiral agent C-1 | 0.78 parts by mass |
| Polymerization initiator (IRGACURE-OXE 01, manufactured by BASF SE) | 1.00 part by mass |
| Leveling agent T-1 | 0.22 parts by mass |
| Methyl ethyl ketone | 1050.00 parts by mass |

A composition F-2 was prepared as a liquid crystal composition for forming a second optically-anisotropic layer by changing the amount of the chiral agent C-1 in the composition F-1 according to Example 5 to 0.01 parts by mass.

A composition F-3 was prepared as a liquid crystal composition for forming a third optically-anisotropic layer by changing the chiral agent in the composition F-1 according to Example 5 to the following chiral agent C-5 and the addition amount of the chiral agent C-5 to 0.55 parts by mass.

Chiral Agent C-5

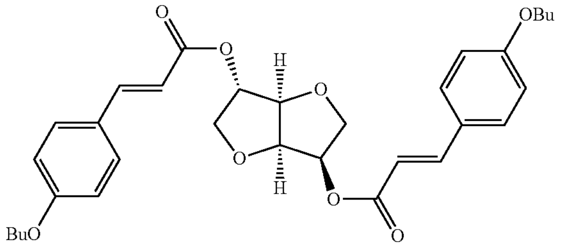

First, a first region was formed by applying multiple layers of the composition F-1 to the alignment film P-1. Next, a second region was formed by applying multiple layers of the composition F-2 to the first region. Next, a third region was formed by applying multiple layers of the composition F-3 to the second region.

Each of the regions was formed, and the optically-anisotropic layer was formed using the same method as that of the first region according to Example 1, except that the irradiation dose of ultraviolet light with which the coating film was irradiated changed from the center portion toward the end part such that the total thickness was a desired film thickness.

It was verified using a polarization microscope that the prepared optically-anisotropic layer had a periodically aligned surface having a concentric circular shape (radial shape) as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction.

Finally, in the first region of the optically-anisotropic layer, finally, $\Delta n_{550}$×Thickness (Re(550)) of the liquid crystal was 197 nm, and regarding the twisted angle in the thickness direction, the twisted angle at the position at a distance of about 2 mm from the center was left-twisted and 91° (−91°), the twisted angle at the position at a distance of about 25 mm from the center was left-twisted and 82° (−82°), and the twisted angle changed toward the outer direction.

Finally, in the second region of the optically-anisotropic layer, finally, $\Delta n_{550}$×Thickness (Re(550)) of the liquid crystal was 347 nm, and regarding the twisted angle in the thickness direction, the twisted angle at the position at a distance of about 2 mm from the center was left-twisted and 19° (−19°), the twisted angle at the position at a distance of about 25 mm from the center was left-twisted and 13° (−13°), and the twisted angle changed toward the outer direction.

Finally, in the third region of the optically-anisotropic layer, finally, $\Delta n_{550}$×Thickness (Re(550)) of the liquid crystal was 195 nm, and regarding the twisted angle in the thickness direction, the twisted angle at the position at a distance of about 2 mm from the center was right-twisted and 69°, the twisted angle at the position at a distance of about 25 mm from the center was right-twisted and 77°, and the twisted angle changed toward the outer direction.

As a result, the optically-anisotropic layer including the three regions was formed.

In a case where a cross-section of the prepared optically-anisotropic layer was observed with an SEM, the dark portion had two inflection points, and the average tilt angle changed from the center toward the outer direction.

Example 6

(Formation of Optically-Anisotropic Layer)

As a liquid crystal composition forming an optically-anisotropic layer, the following compositions G-1, G-2, and G-3 were prepared.

A composition G-1 was prepared as a liquid crystal composition for forming a first optically-anisotropic layer by appropriately changing the addition amount of the chiral agent C-5 in the composition F-3 according to Example 5.

A composition G-2 was prepared as a liquid crystal composition for forming a second optically-anisotropic layer by appropriately changing the addition amount of the chiral agent C-5 in the composition F-3 according to Example 5.

A composition G-3 was prepared as a liquid crystal composition for forming a third optically-anisotropic layer by appropriately changing the addition amount of the chiral agent C-1 in the composition F-1 according to Example 5.

First, a first region was formed by applying multiple layers of the composition G-1 to the alignment film P-1. Next, a second region was formed by applying multiple layers of the composition G-2 to the first region. Next, a third region was formed by applying multiple layers of the composition G-3 to the second region.

Each of the regions was formed, and the optically-anisotropic layer was formed using the same method as that of the first region according to Example 1, except that the irradiation dose of ultraviolet light with which the coating film was irradiated changed from the center portion toward the end part such that the total thickness was a desired film thickness.

It was verified using a polarization microscope that the prepared optically-anisotropic layer had a periodically aligned surface having a concentric circular shape (radial shape) as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction.

Finally, in the first region of the optically-anisotropic layer, finally, $\Delta n_{550}$×Thickness (Re(550)) of the liquid crystal was 157 nm, and regarding the twisted angle in the thickness direction, the twisted angle at the position at a distance of about 2 mm from the center was right-twisted and 88°, the twisted angle at the position at a distance of about 25 mm from the center was right-twisted and 96°, and the twisted angle changed toward the outer direction.

Finally, in the second region of the optically-anisotropic layer, finally, $\Delta n_{550}$×Thickness (Re(550)) of the liquid crystal was 355 nm, and regarding the twisted angle in the thickness direction, the twisted angle at the position at a distance of about 2 mm from the center was right-twisted and 16°, the twisted angle at the position at a distance of about 25 mm from the center was right-twisted and 40°, and the twisted angle changed toward the outer direction.

Finally, in the third region of the optically-anisotropic layer, finally, $\Delta n_{550}$×Thickness (Re(550)) of the liquid crystal was 187 nm, and regarding the twisted angle in the thickness direction, the twisted angle at the position at a distance of about 2 mm from the center was left-twisted and 76° (−76°), the twisted angle at the position at a distance of about 25 mm from the center was left-twisted and 62° (−62°), and the twisted angle changed toward the outer direction.

As a result, the optically-anisotropic layer including the three regions was formed.

In a case where a cross-section of the prepared optically-anisotropic layer was observed with an SEM, the dark portion had two inflection points, and the average tilt angle changed from the center toward the outer direction.

Example 7

(Formation of Optically-Anisotropic Layer)

As a liquid crystal composition forming an optically-anisotropic layer, the following compositions H-1, H-2, and H-3 were prepared.

As a liquid crystal composition forming a first optically-anisotropic layer, a composition H-1 was prepared by changing the chiral agent in the composition F-1 according to Example 5 to the chiral agent C-1 and the chiral agent C-2 and appropriately changing the addition amounts of the chiral agent C-1 and the chiral agent C-2.

As a liquid crystal composition forming a second optically-anisotropic layer, a composition H-2 was prepared by changing the chiral agent in the composition F-2 according to Example 5 to the chiral agent C-1 and the chiral agent C-2 and appropriately changing the addition amounts of the chiral agent C-1 and the chiral agent C-2.

A composition H-3 was prepared as a liquid crystal composition for forming a third optically-anisotropic layer by appropriately changing the addition amount of the chiral agent C-5 in the composition F-3 according to Example 5.

First, a first region was formed by applying multiple layers of the composition H-1 to the alignment film P-1. Next, a second region was formed by applying multiple layers of the composition H-2 to the first region. Next, a third region was formed by applying multiple layers of the composition H-3 to the second region.

Each of the regions was formed, and the optically-anisotropic layer was formed using the same method as that of the first region according to Example 1, except that the irradiation dose of ultraviolet light with which the coating film was irradiated changed from the center portion toward the end part such that the total thickness was a desired film thickness.

It was verified using a polarization microscope that the prepared optically-anisotropic layer had a periodically aligned surface having a concentric circular shape (radial shape) as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction.

Finally, in the first region of the optically-anisotropic layer, finally, $\Delta n_{550}$×Thickness (Re(550)) of the liquid crystal was 176 nm, and regarding the twisted angle in the thickness direction, the twisted angle at the position at a distance of about 2 mm from the center was left-twisted and 76° (−76°), the twisted angle at the position at a distance of about 25 mm from the center was left-twisted and 14° (−14°), and the twisted angle changed toward the outer direction.

Finally, in the second region of the optically-anisotropic layer, finally, $\Delta n_{550}$×Thickness (Re(550)) of the liquid crystal was 344 nm, and regarding the twisted angle in the thickness direction, the twisted angle at the position at a distance of about 2 mm from the center was right-twisted and 10°, the twisted angle at the position at a distance of about 25 mm from the center was right-twisted and 126°, and the twisted angle changed toward the outer direction.

Finally, in the third region of the optically-anisotropic layer, finally, $\Delta n_{550}$×Thickness (Re(550)) of the liquid crystal was 154 nm, and regarding the twisted angle in the thickness direction, the twisted angle at the position at a distance of about 2 mm from the center was right-twisted and 84°, the twisted angle at the position at a distance of about 25 mm from the center was right-twisted and 133°, and the twisted angle changed toward the outer direction.

As a result, the optically-anisotropic layer including the three regions was formed.

In a case where a cross-section of the prepared optically-anisotropic layer was observed with an SEM, the dark portion had two inflection points, and the average tilt angle changed from the center toward the outer direction.

Example 8

As the liquid crystal composition forming the optically-anisotropic layer, compositions I-1, I-2, and I-3 were prepared using the same method as that of the composition B-1 according to Example 1, except that the amount of the liquid crystal compound L-3 was changed to 100 parts by mass, and the addition amounts of the chiral agents C-3, the chiral agent C-4, and the leveling agent T-1 were appropriately changed.

Liquid Crystal Compound L-3

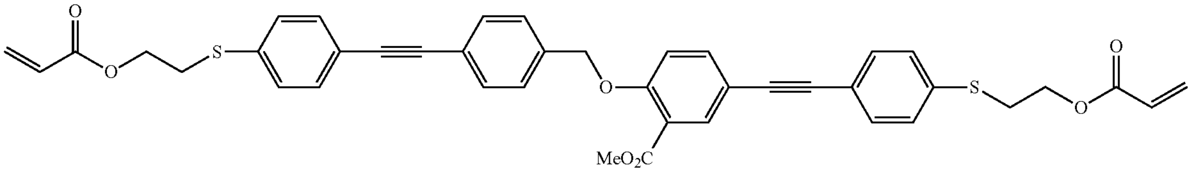

First, a first region was formed by applying multiple layers of the composition I-1 to the alignment film P-1. Next, a second region was formed by applying multiple layers of the composition I-2 to the first region. Next, a third region was formed by applying multiple layers of the composition I-3 to the second region.

Each of the regions was formed, and the optically-anisotropic layer was formed using the same method as that of the first region according to Example 1, except that the irradiation dose of ultraviolet light with which the coating film was irradiated changed from the center portion toward the end part and the heating temperature of the coating film during the formation of the optically-anisotropic layer was changed to 55° C. such that the total thickness was a desired film thickness.

It was verified using a polarization microscope that the prepared optically-anisotropic layer had a periodically aligned surface having a concentric circular shape (radial shape) as shown in FIG. 2. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction.

In the first region of the optically-anisotropic layer, finally, $\Delta n_{550}$×Thickness (Re(550)) of the liquid crystal was 150 nm, and Regarding the twisted angle in the thickness direction, the twisted angle at the position at a distance of about 2 mm from the center was left-twisted and 83° (−83°), the twisted angle at the position at a distance of about 25 mm from the center was left-twisted and 114° (−114°), the twisted angle at the position at a distance of about 30 mm from the center was left-twisted and 161°(−161°), and the twisted angle increased toward the outer direction.

In the second region of the optically-anisotropic layer, finally, $\Delta n_{550}$×Thickness (Re(550)) of the liquid crystal was 335 nm, and Regarding the twisted angle in the thickness direction, the twisted angle at the position at a distance of about 2 mm from the center was left-twisted and 8° (−8°), the twisted angle at the position at a distance of about 25 mm from the center was left-twisted and 85° (−85°), the twisted angle at the position at a distance of about 30 mm from the center was left-twisted and 137° (−137°), and the twisted angle increased toward the outer direction.

In the third region of the optically-anisotropic layer, finally, $\Delta n_{550}$×Thickness (Re(550)) of the liquid crystal was 170 nm, and Regarding the twisted angle in the thickness direction, the twisted angle at the position at a distance of about 2 mm from the center was right-twisted and 78°, the twisted angle at the position at a distance of about 25 mm from the center was right-twisted and 41°, the twisted angle at the position at a distance of about 30 mm from the center was right-twisted and 19°, and the twisted angle decreased toward the outer direction.

As a result, the optically-anisotropic layer including the three regions was formed.

In a case where a cross-section of the prepared optically-anisotropic layer was observed with an SEM, bright portions and dark portions had a shape shown in FIG. 1. That is, the dark portion had two inflection points and the average tilt angle increased from the center toward the outer direction.

$\Delta n_{550}$ of the liquid crystal layers (liquid crystal compounds) in Example 3 was 0.15, $\Delta n_{550}$ of the liquid crystal layers in Example 4 was 0.25, and $\Delta n_{550}$ of the liquid crystal layers in Example 8 was 0.32.

Evaluation

<Evaluation of Diffraction Efficiency>

In a case where light was incident into the prepared liquid crystal diffraction element from the front (direction with an angle of 0° with respect to the normal line), the diffraction efficiency of emitted light was evaluated.

Specifically, each of laser light components having output central wavelengths of 405 nm, 450 nm, 532 nm, and 650 nm was irradiated to be vertically incident into the prepared liquid crystal diffraction element from a light source. In the emitted light from the liquid crystal diffraction element, the intensities of diffracted light (first-order light) diffracted in a desired direction, zero-order light (emitted in the same direction as incidence light) emitted in the other directions, and negative first-order light (light diffracted in a −θ direction in a case where the diffraction angle of first-order light with respect to zero-order light was represented by θ) were measured using a photodetector, and the diffraction efficiency at each of the wavelengths was calculated from the following expression.

Diffraction Efficiency=First-Order Light/(First-Order Light+Zero-Order Light+(Negative First-Order Light))

The average value of the diffraction efficiencies was obtained from the measured values at the wavelengths of 405 nm, 450 nm, 532 nm, and 650 nm, and the wavelength dependence of the diffraction efficiency was evaluated based on the following standards.

Laser light was caused to be vertically incident into the circularly polarizing plate corresponding to the wavelength of the laser light to be converted into circularly polarized light, the circularly polarized light was incident into the prepared liquid crystal diffraction element, and the evaluation was performed.

In addition, in the liquid crystal alignment pattern of the prepared liquid crystal diffraction element, the evaluation was performed at two positions including the center portion of the concentric circle and the vicinity of the concentric circle (the single period was 10 μm) and the vicinity of an end part (the single period was 1 μm).

A: the average value of the diffraction efficiencies was 95% or more.

B: the average value of the diffraction efficiencies was 90% or more and less than 95%.

C: the average value of the diffraction efficiencies was less than 90%.

The results are shown in Tables 1 and 2. In Tables 1 and 2, the diffraction angle with respect to light having a wavelength of 532 nm is shown as Diffraction Angle (532).

TABLE 1

| | | | Comparative Example 1 | Example 1 | Example 2 | Example 3 |
|---|---|---|---|---|---|---|
| Vicinity of center | Liquid crystal alignment pattern | Single period [μm] | 10 | 10 | 10 | 10 |
| | First region | Re(550) [nm] | 275 | 160 | 190 | 150 |
| | | Twisted angle [°] | −70 | −80 | −87 | −83 |
| | Second region | Re(550) [nm] | 275 | 335 | 150 | 335 |
| | | Twisted angle [°] | 70 | 0 | 14 | −8 |
| | Third region | Re(550) [nm] | — | 160 | 150 | 170 |
| | | Twisted angle [°] | — | 80 | −14 | 78 |
| | Fourth region | Re(550) [nm] | — | — | 190 | — |
| | | Twisted angle [°] | — | — | 87 | — |
| | Evaluation | Number of inflection points of angle | 1 | 2 | 3 | 2 |
| | | Number of inflection points where tilt direction is folded | 1 | 1 | 3 | 1 |
| | | Diffraction angle (532) [°] | 3 | 3 | 3 | 3 |
| | | Wavelength dependency of diffraction efficiency | C | A | A | A |
| Vicinity of end part | Liquid crystal alignment pattern | Single period [μm] | 1 | 1 | 1 | 1 |
| | First region | Re(550) [nm] | 275 | 160 | 190 | 150 |
| | | Twisted angle [°] | −70 | −115 | −115 | −114 |
| | Second region | Re(550) [nm] | 275 | 335 | 150 | 335 |
| | | Twisted angle [°] | 70 | −76 | −18 | −85 |
| | Third region | Re(550) [nm] | — | 160 | 150 | 170 |
| | | Twisted angle [°] | — | 48 | −8 | 41 |
| | Fourth region | Re(550) [nm] | — | — | 190 | — |
| | | Twisted angle [°] | — | — | 237 | — |
| | Evaluation | Number of inflection points of angle | 1 | 2 | 3 | 2 |
| | | Number of inflection points where tilt direction is folded | 1 | 1 | 1 | 1 |
| | | Diffraction angle (532) [°] | 32 | 32 | 32 | 32 |
| | | Wavelength dependency of diffraction efficiency | C | A | A | A |

In Examples 5 to 7, as compared to Examples 1 to 4, circularly polarized light having the opposite direction was used as the incident polarized light to perform the evaluation. In this case, in Examples 5 to 7, as compared to Examples 1 to 4, the diffraction direction of first-order light and negative first-order light was reversed (diffracted in a direction in which the sign of the light diffracted in the θ direction is reversed). In addition, in Example 7, in the vicinity of the end part (the single period was 1 μm), the incidence angle of light into the liquid crystal diffraction element was 25° to perform the evaluation. In Comparative Examples of Examples 5 to 7, the same evaluation was performed using the liquid crystal diffraction element prepared in Comparative Example 1. The results were the same as that of Comparative Example 1 shown in Table 1.

TABLE 2

| | | | Example 4 | Example 5 | Example 6 | Example 7 |
|---|---|---|---|---|---|---|
| Vicinity of center | Liquid crystal alignment pattern | Single period [μm] | 10 | 10 | 10 | 10 |
| | First region | Re(550) [nm] | 150 | 197 | 157 | 176 |
| | | Twisted angle [°] | −83 | −91 | 88 | −76 |
| | Second region | Re(550) [nm] | 335 | 347 | 355 | 344 |
| | | Twisted angle [°] | −8 | −19 | 16 | 10 |
| | Third region | Re(550) [nm] | 170 | 195 | 187 | 154 |
| | | Twisted angle [°] | 78 | 69 | −76 | 84 |
| | Fourth region | Re(550) [nm] | — | — | — | — |
| | | Twisted angle [°] | — | — | — | — |
| | Evaluation | Number of inflection points of angle | 2 | 2 | 2 | 2 |
| | | Number of inflection points where tilt direction is folded | 1 | 1 | 1 | 1 |
| | | Diffraction angle (532) [°] | 3 | 3 | 3 | 3 |
| | | Wavelength dependency of diffraction efficiency | A | A | A | A |
| Vicinity of end part | Liquid crystal alignment pattern | Single period [μm] | 1 | 1 | 1 | 1 |
| | First region | Re(550) [nm] | 150 | 197 | 157 | 176 |
| | | Twisted angle [°] | −114 | −82 | 96 | −14 |
| | Second region | Re(550) [nm] | 335 | 347 | 355 | 344 |
| | | Twisted angle [°] | −85 | −13 | 40 | 126 |

TABLE 2-continued

| | | Example 4 | Example 5 | Example 6 | Example 7 |
|---|---|---|---|---|---|
| Third region | Re(550) [nm] | 170 | 195 | 187 | 154 |
| | Twisted angle [°] | 41 | 77 | −62 | 133 |
| Fourth region | Re(550) [nm] | — | — | — | — |
| | Twisted angle [°] | — | — | — | — |
| Evaluation | Number of inflection points of angle | 2 | 2 | 2 | 2 |
| | Number of inflection points where tilt direction is folded | 1 | 1 | 1 | 1 |
| | Diffraction angle (532) [°] | 32 | 32 | 32 | 32 |
| | Wavelength dependency of diffraction efficiency | A | A | A | A |

Evaluation

<Evaluation of Diffraction Efficiency>

In a case where light was incident into the prepared liquid crystal diffraction element prepared in Comparative Example 1 and Examples 3, 4, and 8 while changing an incidence angle in a range of ±40° (at an interval of 10°) from the front (direction with an angle of 0° with respect to the normal line), the diffraction efficiency of emitted light was evaluated.

Specifically, each of laser light components having output central wavelengths of 405 nm, 450 nm, 532 nm, and 650 nm was irradiated to be incident into the prepared liquid crystal diffraction element from a light source. In the emitted light from the liquid crystal diffraction element, the intensities of diffracted light (first-order light) diffracted in a desired direction, zero-order light (emitted in the same direction as incidence light) emitted in the other directions, and negative first-order light (light diffracted in a −θ direction in a case where the diffraction angle of first-order light with respect to zero-order light was represented by θ) were measured using a photodetector, and the diffraction efficiency at each of the wavelengths was calculated from the following expression.

$$\text{Diffraction Efficiency} = \text{First-Order Light}/(\text{First-Order Light} + \text{Zero-Order Light} + (\text{Negative First-Order Light}))$$

The average value of the diffraction efficiencies was obtained from the measured values at the wavelengths of 405 nm, 450 nm, 532 nm, and 650 nm that were measured at different incidence angles, and the wavelength dependence of the diffraction efficiency was evaluated.

Laser light was caused to be vertically incident into the circularly polarizing plate corresponding to the wavelength of the laser light to be converted into circularly polarized light, the circularly polarized light was incident into the prepared liquid crystal diffraction element, and the evaluation was performed.

In addition, in the liquid crystal alignment pattern of the prepared liquid crystal diffraction element, the evaluation was performed at three positions including the center portion of the concentric circle and the vicinity of the concentric circle (the single period was 10 μm), the vicinity of an end part (the single period was 1 μm), and the end part (the single period was 0.6 μm).

As a result of the evaluation, as compared to Comparative Example 1, in all of the liquid crystal diffraction elements according to Examples 3, 4, and 8, a high diffraction efficiency (average value) was obtained.

In addition, as a result of the evaluation, as compared to Example 3, the average value of the diffraction efficiencies in Example 4 was improved, and the average value of the diffraction efficiencies in Example 8 was further improved.

It can be seen from the above results that, as the difference $\Delta n_{550}$ in refractive index of the liquid crystal layer of the liquid crystal diffraction element increases, the light utilization efficiency with respect to the different incidence angles is improved.

<Preparation of Circularly Polarizing Plate>

(Preparation of Retardation Plate)

A film including a cellulose acylate film, an alignment film, and an optically-anisotropic layer C was obtained using the same method as a positive A plate described in paragraphs “0102” to “0126” of JP2019-215416A.

The optically-anisotropic layer C was the positive A plate (retardation plate), and the thickness of the positive A plate was controlled such that Re(550) was 138 nm.

The prepared retardation plate was bonded to a linearly polarizing plate through a pressure sensitive adhesive to prepare a circularly polarizing plate. The retardation plate and the linearly polarizing plate were disposed such that a relative angle between a slow axis of the retardation plate and an absorption axis of the linearly polarizing plate was 45°.

<Preparation of Optical Element>

The prepared circularly polarizing plate was bonded to the liquid crystal diffraction element prepared in each of Examples 1 to 8 to prepare an optical element. The optical element was formed by disposing the liquid crystal diffraction element, the retardation plate, and the linearly polarizing plate in this order.

Evaluation

In a case where light was incident into the prepared optical element from the front (direction with an angle of 0° with respect to the normal line), the intensity of emitted light was evaluated.

Specifically, each of laser light components having output central wavelengths of 405 nm, 450 nm, 532 nm, and 650 nm was irradiated to be vertically incident into the prepared optical element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector. Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 1 to 7, before bonding the circularly polarizing plate, the intensity of zero-order light at any wavelength can be significantly reduced, and the contrast ratio (intensity ratio first-order light/zero-order light) can be improved. In Examples 5 to 7, the incident circularly polarized light and the arrangement of the retardation plate and the linearly polarizing plate in the circularly polarizing plate were appropriately changed to perform the evaluation. In addition, in Example 7, in the vicinity of the end part (the single period was 1 μm), the incidence angle of light into the liquid crystal diffraction element was 25° to perform the evaluation.

Evaluation

<Evaluation of Incidence Angle Dependence>

In a case where light was incident into the optical element including the liquid crystal diffraction element prepared in Comparative Example 1 and Examples 3, 4, and 8 while changing an incidence angle in a range of +40° (at an interval of 10°) from the front (direction with an angle of 0° with respect to the normal line), the intensity of emitted light was evaluated.

Specifically, each of laser light components having output central wavelengths of 405 nm, 450 nm, 532 nm, and 650 nm was irradiated to be incident into the prepared liquid crystal diffraction element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector.

The average value of the diffraction efficiencies with respect to the incidence angles was obtained from each of the measured values at the wavelengths of 405 nm, 450 nm, 532 nm, and 650 nm that were measured at different incidence angles.

In addition, in the liquid crystal alignment pattern of the prepared liquid crystal diffraction element, the evaluation was performed at three positions including the center portion of the concentric circle and the vicinity of the concentric circle (the single period was 10 μm), the vicinity of an end part (the single period was 1 μm), and the end part (the single period was 0.6 μm).

Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 3, 4, and 8, before bonding the circularly polarizing plate, the intensity of zero-order light at any wavelength can be significantly reduced, and the contrast ratio (intensity ratio first-order light/zero-order light) can be improved. In addition, as compared to the optical element including the liquid crystal diffraction element prepared in Comparative Example 1, in all of the optical elements including the liquid crystal diffraction elements prepared in Examples 3, 4, and 8, a high contrast ratio was obtained.

In addition, as a result of the evaluation, as compared to the optical element including the liquid crystal diffraction element prepared in Example 3, the average value of the contrast ratios with respect to the incidence angles in the optical element including the liquid crystal diffraction element prepared in Example 4 was improved, and the average value of the contrast ratios with respect to the incidence angles in the optical element including the liquid crystal diffraction element prepared in Example 8 was further improved.

It can be seen from the above results that, even in the optical element where the circularly polarizing plate is bonded to the liquid crystal diffraction element, as the difference $\Delta n_{550}$ in refractive index of the liquid crystal layer increases, the contrast ratio with respect to the different incidence angles is improved.

<Preparation of Circularly Polarizing Plate>

A circularly polarizing plate was prepared using the same method as that of preparing the above-described circularly polarizing plate, except that the linearly polarizing plate (polyvinyl alcohol layer type) was changed to an absorptive polarizing plate prepared as described above.

<Preparation of Optical Element>

A circularly polarizing plate prepared using the absorptive polarizing plate prepared as described below was bonded to the liquid crystal diffraction element prepared in each of Examples 1 to 8 to prepare an optical element. The optical element was formed by disposing the liquid crystal diffraction element, the retardation plate, and the linearly polarizing plate in this order.

[Preparation of Absorptive Polarizer]

<Preparation of Transparent Support 1>

A coating liquid PA1 for forming an alignment layer described below was continuously applied to a cellulose acylate film (TAC substrate having a thickness of 40 μm; TG 40, manufactured by Fujifilm Corporation) using a wire bar. The support on which the coating film was formed was dried with hot air at 140° C. for 120 seconds. Next, the coating film was irradiated with polarized ultraviolet rays (10 mJ/$cm^2$, using an ultra-high pressure mercury lamp) to form a photoalignment layer PA1. As a result, a TAC film with the photoalignment layer was obtained.

The film thickness was 0.3 μm.

| (Coating Liquid PA1 for Forming Alignment Layer) | |
|---|---|
| The following polymer PA-1 | 100.00 parts by mass |
| The following acid generator PAG-1 | 5.00 parts by mass |
| The following acid generator CPI-110TF | 0.005 parts by mass |
| Xylene | 1220.00 parts by mass |
| Methyl isobutyl ketone | 122.00 parts by mass |

Polymer PA-1

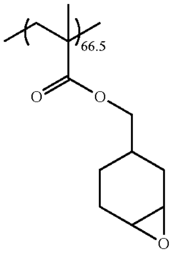

-continued (Coating Liquid PA1 for Forming Alignment Layer)

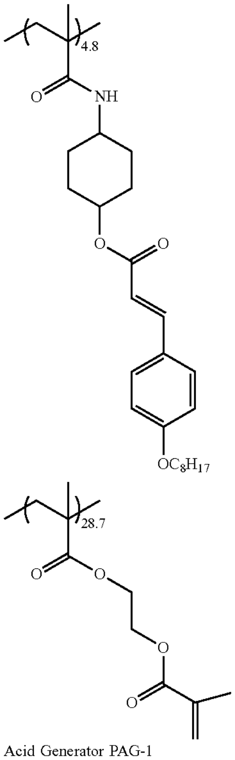

Acid Generator PAG-1

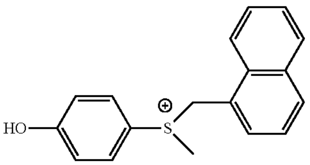 [SMILES: C[S+](Cc1cccc2ccccc12)c1ccc(O)cc1]

-continued (Coating Liquid PA1 for Forming Alignment Layer)

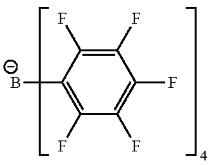

Acid Generator CPI-110TF

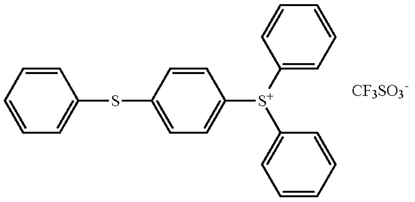

<Formation of Light-Absorption Anisotropic Layer P1>

A composition P1 for forming a light-absorption anisotropic layer described below was continuously applied to the obtained alignment layer PA1 using a wire bar to form a coating layer P1.

Next, the coating layer P1 was heated at 140° C. for 30 seconds and was cooled to room temperature (23° C.).

Next, the coating layer P1 was heated at 90° C. for 60 seconds and was cooled to room temperature.

Next, the coating layer P1 was irradiated with light using a LED light (central wavelength: 365 nm) for 2 seconds under irradiation conditions of an illuminance of 200 $mW/cm^2$ to form the light-absorption anisotropic layer P1 on the alignment layer PA1.

The film thickness was 1.6 μm.

As a result, a laminate 1B was obtained.

| Composition of Composition P1 for forming Light-Absorption Anisotropic Layer | |
|---|---|
| The following dichroic substance D-1 | 0.25 parts by mass |
| The following dichroic substance D-2 | 0.36 parts by mass |
| The following dichroic substance D-3 | 0.59 parts by mass |
| The following polymer liquid crystal compound P-1 | 2.21 parts by mass |
| The following low-molecular-weight liquid crystalline compound M-1 | 1.36 parts by mass |
| Polymerization Initiator IRGACURE OXE-02 (manufactured by BASF SE) | 0.200 parts by mass |
| The following surfactant F-1 | 0.026 parts by mass |
| Cyclopentanone | 46.00 parts by mass |
| Tetrahydrofuran | 46.00 parts by mass |
| Benzyl alcohol | 3.00 parts by mass |

D-1

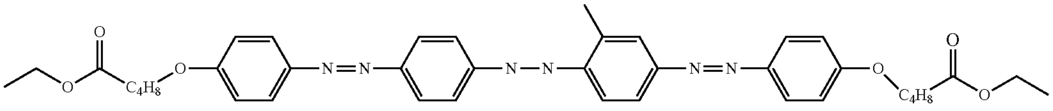

D-2

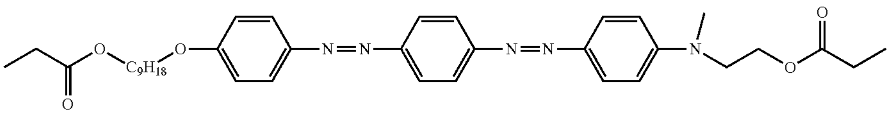

D-3

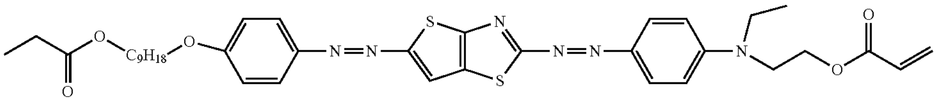

-continued

| Composition of Composition P1 for forming Light-Absorption Anisotropic Layer |
| --- |
| Polymer Liquid Crystal Compound P-1 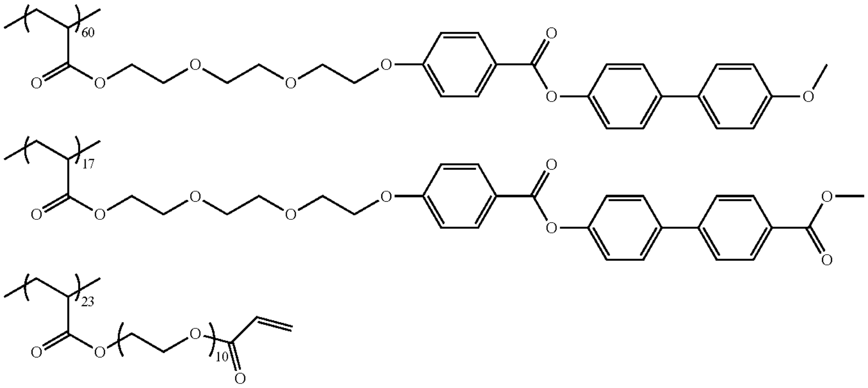 |
| Low-Molecular-Weight Liquid Crystalline Compound M-1 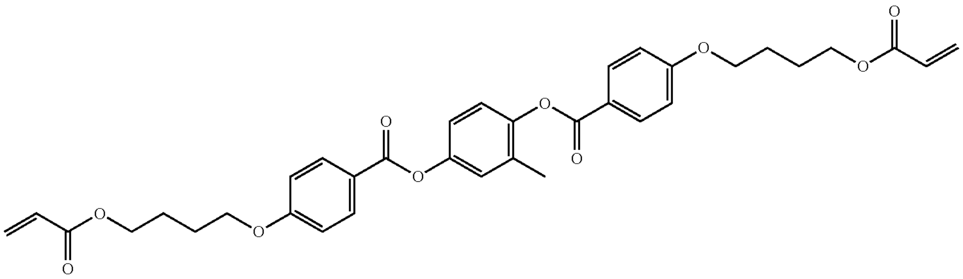 [SMILES: C=CC(=O)OCCCCOc1ccc(C(=O)Oc2ccc(OC(=O)c3ccc(OCCCCOC(=O)C=C)cc3)c(C)c2)cc1] |
| Surfactant F-1 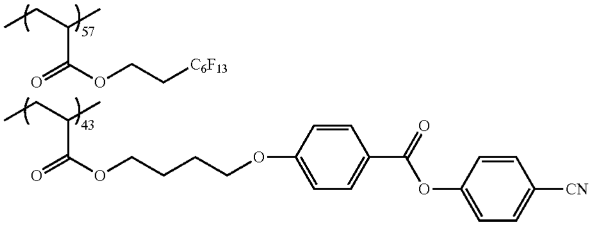 |

<Preparation of UV Adhesive>

The following UV adhesive composition was prepared.

| UV Adhesive Composition | |
| --- | --- |
| CEL2021P (manufactured by Daicel Corporation) | 70 parts by mass |
| 1,4-butanediol diglycidyl ether | 20 parts by mass |
| 2-ethylhexyl glycidyl ether | 10 parts by mass |
| CPI-100P | 2.25 parts by mass |

CPI-100P

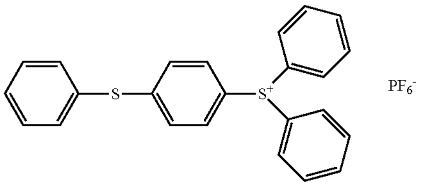

<Preparation of Absorptive Polarizing Film>

TECHNOLLOY S001G (methacrylic resin, thickness: 50 μm, tan δ peak temperature: 128° C., manufactured by Sumika Acryl Co., Ltd.) as a resin substrate S1 was bonded to the surface of the light-absorption anisotropic layer of the laminate 1B using the UV adhesive. Next, only the cellulose acylate film 1 was peeled off, and an absorptive polarizing film in which the resin substrate, the adhesive layer, the light-absorption anisotropic layer, and the alignment layer were disposed in this order was prepared. The thickness of the UV adhesive layer was 2 μm.

The arithmetic average roughness Ra of the obtained absorptive polarizing film was 10 nm or less. On the other hand, the arithmetic average roughness Ra of the linearly polarizing plate (polyvinyl alcohol layer type) was 20 nm or more.

As a result, in the prepared absorptive polarizing film, the deflection (for example, refraction or scattering) of light from the surface unevenness of the polarizing film can be reduced. In addition, in a case where the image display apparatus is used, the distortion of an image to be displayed can be suppressed.

The arithmetic average roughness Ra was measured using an interferometer "Vertscan" (manufactured by Mitsubishi Chemical Systems Inc.).

Evaluation

In a case where light was incident into the prepared optical element from the front (direction with an angle of 0° with respect to the normal line), the intensity of emitted light was evaluated.

Specifically, laser light components having output central wavelengths of 405 nm, 450 nm, 532 nm, and 650 nm were irradiated to be vertically incident into the prepared optical element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector. Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 1 to 7, before bonding the circularly polarizing plate, the intensity of zero-order light at any wavelength can be significantly reduced, and the contrast ratio (intensity ratio first-order light/zero-order light) can be improved. In Examples 5 to 7, the incident circularly polarized light and the arrangement of the retardation plate and the linearly polarizing plate in the circularly polarizing plate were appropriately changed to perform the evaluation. In addition, in Example 7, in the vicinity of the end part (the single period was 1 μm), the incidence angle of light into the liquid crystal diffraction element was 25° to perform the evaluation.

Evaluation

<Evaluation of Incidence Angle Dependence>

In a case where light was incident into the optical element including the liquid crystal diffraction element prepared in Comparative Example 1 and Examples 3, 4, and 8 while changing an incidence angle in a range of ±40° (at an interval of 10°) from the front (direction with an angle of 0° with respect to the normal line), the intensity of emitted light was evaluated.

Specifically, each of laser light components having output central wavelengths of 405 nm, 450 nm, 532 nm, and 650 nm was irradiated to be incident into the prepared liquid crystal diffraction element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector.

The average value of the diffraction efficiencies with respect to the incidence angles was obtained from each of the measured values at the wavelengths of 405 nm, 450 nm, 532 nm, and 650 nm that were measured at different incidence angles.

In addition, in the liquid crystal alignment pattern of the prepared liquid crystal diffraction element, the evaluation was performed at three positions including the center portion of the concentric circle and the vicinity of the concentric circle (the single period was 10 μm), the vicinity of an end part (the single period was 1 μm), and the end part (the single period was 0.6 μm).

Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 3, 4, and 8, before bonding the circularly polarizing plate, the intensity of zero-order light at any wavelength can be significantly reduced, and the contrast ratio (intensity ratio first-order light/zero-order light) can be improved. In addition, as compared to the optical element including the liquid crystal diffraction element prepared in Comparative Example 1, in all of the optical elements including the liquid crystal diffraction elements prepared in Examples 3, 4, and 8, a high contrast ratio was obtained.

In addition, as a result of the evaluation, as compared to the optical element including the liquid crystal diffraction element prepared in Example 3, the average value of the contrast ratios with respect to the incidence angles in the optical element including the liquid crystal diffraction element prepared in Example 4 was improved, and the average value of the contrast ratios with respect to the incidence angles in the optical element including the liquid crystal diffraction element prepared in Example 8 was further improved.

It can be seen from the above results that, even in the optical element where the circularly polarizing plate is bonded to the liquid crystal diffraction element, as the difference $\Delta n_{550}$ in refractive index of the liquid crystal layer increases, the contrast ratio with respect to the different incidence angles is improved.

<Change of Support>

Using a method described below, the support of the liquid crystal diffraction element can be appropriately changed depending on purposes. In addition, in the method described below, the thickness between the liquid crystal diffraction element and the changed support can be reduced, and the in-plane thickness of the liquid crystal diffraction element after changing the support can be made uniform with respect to, for example, a pressure sensitive adhesive (thickness: several micrometers to several tens of micrometers). This way, even in a case where the support of the liquid crystal diffraction element was changed, by making the in-plane thickness uniform, a direction of light emitted from the liquid crystal diffraction element can be accurately controlled in a plane.

The liquid crystal diffraction element and the new support may be laminated, for example, in the following procedure.

(1) A temporary support is bonded to the liquid crystal layer side of the support, the alignment film, and the liquid crystal diffraction element to be laminated. In this example, as the temporary support, MASTACK AS3-304 manufactured by Fujimori Kogyo Co., Ltd. was used.

(2) Next, the support and the alignment film present from the step of preparing the liquid crystal diffraction element are peeled off to expose the interface of the liquid crystal diffraction element on the alignment film side.

(3) A silicon oxide layer (SiOx layer) is formed on both of the interface of the liquid crystal diffraction element on the alignment film side and the interface of the newly prepared support. A method of forming the silicon oxide layer is not limited and, for example, vacuum deposition is preferably used. In this example, the formation of the silicon oxide layer was performed using a vapor deposition device (model number: ULEYES) manufactured by ULVAC, Inc. As a vapor deposition source, $SiO_2$ powder was used. The thickness of the silicon oxide layer is not limited and is preferably 50 nm or less. In this example, the thickness of the silicon oxide film was 50 nm or less.

(4) Next, plasma treatment is performed on both of the formed silicon oxide films, the formed silicon oxide layers are bonded to each other at 120° C., and the temporary support is peeled off.

Through the steps (1) to (4), a diffraction element where the liquid crystal diffraction element and the newly prepared support are laminated can be prepared. In addition, by changing the support to another liquid crystal diffraction element and repeating the steps (1) to (4), a diffraction element where two or three or more liquid crystal diffraction elements are laminated can be prepared.

Through the steps (1) to (4) the support of the liquid crystal diffraction element prepared in Example 1 was changed to a glass substrate having a thickness of 0.3 mm. As a comparison, using a pressure sensitive adhesive having a thickness of 25 μm, the support of the liquid crystal diffraction element prepared in Example 1 was changed to a glass substrate having a thickness of 0.3 mm (the liquid crystal diffraction element was bonded to the glass substrate through the pressure sensitive adhesive). In the liquid crystal diffraction element prepared through the steps (1) to (4), the in-plane thickness of the liquid crystal diffraction element was able to be made more uniform than that of the liquid crystal diffraction element prepared through the pressure sensitive adhesive.

<Preparation of Laminate>

Likewise, a laminate including the liquid crystal diffraction element and another optical member or the like can be prepared.

For example, a laminate including a liquid crystal diffraction element, a retardation plate, and a polarizing plate was prepared using the following method.

A silicon oxide layer (SiOx layer) was formed on a liquid crystal layer side of a liquid crystal diffraction element including a support, an alignment film, and a liquid crystal layer to be laminated and on a bonding surface side of a retardation plate to be bonded to the liquid crystal diffraction element. A method of forming the silicon oxide layer is not limited and, for example, vacuum deposition is preferably used. In this example, the formation of the silicon oxide layer was performed using a vapor deposition device (model number: ULEYES) manufactured by ULVAC, Inc. As a vapor deposition source, $SiO_2$ powder was used. The thickness of the silicon oxide layer is not limited and is preferably 50 nm or less. In this example, the thickness of the silicon oxide film was 50 nm or less. Plasma treatment was performed on both of the formed silicon oxide films, and the formed silicon oxide layers were bonded to each other at 120° C. As a result, the laminate including the liquid crystal diffraction element and the retardation plate was formed. Likewise, by bonding a polarizing plate to the retardation plate and peeling off the support and the alignment film, a laminate consisting of the liquid crystal layer (liquid crystal diffraction element), the retardation plate, and the polarizing plate was prepared.

As the liquid crystal diffraction element, the liquid crystal diffraction element prepared in each of Examples 1 to 7 was used. As the retardation plate, the retardation plate used for preparing the above-described circularly polarizing plate was used. As the polarizing plate, a laminate including each of the above-described linearly polarizing plate (polyvinyl alcohol layer type) and the absorptive polarizing plate was prepared.

It was verified that, in the optical element as the laminate including the liquid crystal diffraction element, the retardation plate, and the polarizing plate, before bonding the circularly polarizing plate (the laminate of the retardation plate and the polarizing plate), the intensity of zero-order light at any wavelength can be significantly reduced, and the contrast ratio (intensity ratio first-order light/zero-order light) can be improved.

As can be seen from the above results, the effects of the present invention are obvious.

EXPLANATION OF REFERENCES

10*a*, 10*b*: liquid crystal diffraction element
30: support
32: alignment film
36*a*, 36*b*: optically-anisotropic layer
37*a* to 37*g*: region
40: liquid crystal compound
40A: optical axis
42: bright portion
44: dark portion
60, 80: exposure device
62, 82: laser
64, 84: light source
65: λ/2 plate
68: beam splitter
70A, 70B, 90A, 90B: mirror
72A, 72B, 96: λ/4 plate
86, 94: polarization beam splitter
92: lens
$\Lambda$, $\Lambda_1$, $\Lambda_2$: single period
D, $A_1$ to $A_3$: arrangement axis
R: region
M: laser light
MA, MB: beam
MP: P polarized light
MS: S polarized light
$P_0$: linearly polarized light
$P_R$: right circularly polarized light
$P_L$: left circularly polarized light
α: intersecting angle
$L_1$, $L_2$, $L_3$ to $L_{15}$: light

What is claimed is:

1. A liquid crystal diffraction element comprising:

an optically-anisotropic layer that is formed of a liquid crystal composition including a liquid crystal compound, wherein the optically-anisotropic layer has a liquid crystal alignment pattern in which a direction of an optical axis derived from the liquid crystal compound changes while continuously rotating in at least one in-plane direction, in a case where a length over which the direction of the optical axis derived from the liquid crystal compound rotates by 180° in a plane is set as a single period, a length of the single period in the liquid crystal alignment pattern gradually changes in the one in-plane direction, in a cross-sectional image of the optically-anisotropic layer obtained by observing a cross-section taken in a thickness direction parallel to the one in-plane direction with a scanning electron microscope, the optically-anisotropic layer has bright portions and dark portions extending from one surface to another surface and each of the dark portions has two or more inflection points of angle, the number of inflection points where the tilt direction of the dark portion is folded is four, the optically-anisotropic layer has regions where tilt directions of the dark portions are different from each other in the thickness direction, and an average tilt angle of the dark portion gradually changes in the one in-plane direction.

2. The liquid crystal diffraction element pattern according to claim 1, wherein as the length of the single period in the liquid crystal alignment pattern decreases, the average tilt angle of the dark portion increases.

3. The liquid crystal diffraction element according to claim 1, wherein the liquid crystal alignment pattern of the optically-anisotropic layer is a concentric circular pattern having a concentric circular shape where the one in-plane direction in which the direction of the optical axis derived from the liquid crystal compound changes while continuously rotating moves from an inner side toward an outer side.

4. The liquid crystal diffraction element according to claim 3, wherein in the optically-anisotropic layer, shapes of the bright portions and the dark portions in a cross-section of a center portion of the concentric circular shape are symmetrical with respect to a center line of the optically-anisotropic layer in the thickness direction, and shapes of the bright portions and the dark portions in a cross-section of an end part of the concentric circular shape are asymmetrical with respect to the center line of the optically-anisotropic layer in the thickness direction.

5. The liquid crystal diffraction element according to claim 3, wherein in the optically-anisotropic layer, shapes of the bright portions and the dark portions in a cross-section of a center portion of the concentric circular shape are asymmetrical with respect to a center line of the optically-anisotropic layer in the thickness direction, and shapes of the bright portions and the dark portions in a cross-section of an end part of the concentric circular shape are asymmetrical with respect to the center line of the optically-anisotropic layer in the thickness direction.

6. The liquid crystal diffraction element according to claim 1, wherein a difference $\Delta n_{550}$ in refractive index generated by refractive index anisotropy of the optically-anisotropic layer is 0.2 or more.

7. The liquid crystal diffraction element according to claim 1, wherein a region where the length of the single period in the liquid crystal alignment pattern is 1.0 μm or less is provided in a plane.

8. An optical element comprising:

the liquid crystal diffraction element according to claim 1; and a circularly polarizing plate.

9. The optical element according to claim 8, wherein the circularly polarizing plate consists of a retardation plate and a polarizer, and the liquid crystal diffraction element, the retardation plate, and the polarizer are disposed in this order.

10. The optical element according to claim 9, wherein the retardation plate is a λ/4 plate.

11. The optical element according to claim 9, wherein the retardation plate has reverse wavelength dispersibility.

12. An optical element comprising, in the following order:

the liquid crystal diffraction element according to claim 1;

a silicon oxide layer; and a support.

13. An optical element comprising:

at least one liquid crystal diffraction element according to claim 1; and at least one phase modulation element.

14. An image display unit comprising:

the liquid crystal diffraction element according to claim 1.

15. A head-mounted display comprising:

the image display unit according to claim 14.

16. A beam steering comprising:

the liquid crystal diffraction element according to claim 1.

17. A sensor comprising:

the liquid crystal diffraction element according to claim 1.

* * * * *